United States Patent
Kahn et al.

(10) Patent No.: US 6,424,444 B1
(45) Date of Patent: Jul. 23, 2002

(54) TRANSMISSION AND RECEPTION OF DUOBINARY MULTILEVEL PULSE-AMPLITUDE-MODULATED OPTICAL SIGNALS USING FINITE-STATE MACHINE-BASED ENCODER

(75) Inventors: Joseph Mardell Kahn, San Carlos; Keangpo Ho, San Jose, both of CA (US)

(73) Assignee: StrataLight Communications, Inc., Campbell, CA (US)

( * ) Notice: Subject to any disclaimer, the term of this patent is extended or adjusted under 35 U.S.C. 154(b) by 26 days.

(21) Appl. No.: 09/774,288

(22) Filed: Jan. 29, 2001

(51) Int. Cl.[7] ........................... H04B 10/12; H04B 10/04
(52) U.S. Cl. ....................................... 359/173; 359/181
(58) Field of Search .............................. 359/181, 182, 359/183, 184, 185, 186, 191, 192, 173

(56) References Cited

U.S. PATENT DOCUMENTS

| | | | | |
|---|---|---|---|---|
| 5,007,106 A | * | 4/1991 | Kahn et al. ................. | 455/619 |
| 5,008,957 A | | 4/1991 | Kiyono ........................ | 455/618 |
| 5,510,919 A | | 4/1996 | Wedding ...................... | 359/115 |
| 5,543,952 A | | 8/1996 | Yonenaga et al. ............ | 359/181 |
| 5,867,534 A | | 2/1999 | Price et al. .................. | 375/286 |
| 5,892,858 A | | 4/1999 | Vaziri et al. ................. | 385/2 |
| 5,917,638 A | | 6/1999 | Franck et al. ............... | 359/181 |
| 5,917,642 A | | 6/1999 | O'Donnell et al. .......... | 359/245 |
| 5,920,416 A | | 7/1999 | Beylat et al. ................ | 385/181 |
| 5,999,297 A | | 12/1999 | Penninckx .................... | 359/154 |
| 5,999,300 A | | 12/1999 | Davies et al. ................ | 359/183 |
| 6,002,816 A | | 12/1999 | Penninckx et al. .......... | 385/3 |
| 6,094,151 A | * | 7/2000 | Schwartz et al. ............ | 341/107 |
| 6,097,525 A | | 8/2000 | Ono et al. .................... | 359/181 |

FOREIGN PATENT DOCUMENTS

| | | |
|---|---|---|
| EP | 1 026 863 A2 | 8/2000 |
| WO | WO99/09682 | 2/1999 |

OTHER PUBLICATIONS

Ono, Yano, Fukuchi, Ito, Yamazaki, Yamaguchi & Emura, "Characteristics of Optical Duobinary Signals in Terabit/s Capacity, High–Spectral Efficiency WDM Systems", Journal of Lightwave Technology, vol. 16, No. 5, IEEE/OSA, May 1998.

(List continued on next page.)

*Primary Examiner*—Leslie Pascal
*Assistant Examiner*—Dalzid Singh
(74) *Attorney, Agent, or Firm*—David R. Gildea

(57) ABSTRACT

Methods and apparatus to transmit and receive information bits encoded in duobinary, multilevel pulse-amplitude-modulated (PAM) optical signals are described. The transmitted optical signal has a narrow optical spectrum and a low symbol rate. Information bits are encoded in a M-ary PAM symbol sequence, where $M \geq 2$. The PAM symbol sequence is input to a finite-state machine, which yields an encoded sequence that changes sign between two symbol intervals when the encoded sequence takes on a nominally zero value during an odd number of intervening symbol intervals. The encoded sequence is lowpass filtered and modulated onto an optical electric field. The receiver processes a received optical electric field to obtain an electrical signal proportional to the received optical intensity, and performs M-ary symbol-by-symbol decisions to recover the transmitted information bits, without potential error propagation.

40 Claims, 27 Drawing Sheets-

OTHER PUBLICATIONS

Sieben, Conradi & Dodds, "Optical Single Sideband Transmission at 10 Gb/s Using Only Electrical Dispersion Compensation", Journal of Lightwave Technology, vol. 17, No. 10, IEEE/OSA, Oct. 1999.

Walklin & Conradi, "Multilevel Signaling for Increasing the Reach of 10 Gb/s Lightwave Systems", Journal of Lightwave Technology, vol. 17, No. 11 IEEE/OSA, Nov. 1999.

May, Solheim & Conradi, "Extended 10 Gb/s Fiber Transmission Distance at 1538 nm Using a Duobinary Receiver", IEEE Photonics Technology Letters, vol. 6, No. 5, IEEE, May 1994.

Price, Pierre, Uhel & Havard, "210 k Repeaterless 10 Gb/s Transmission Experiment Through Nondispersion–Shifted Fiber Using Partial Response Scheme", IEEE Photonics Technology Letters, vol. 7, No. 10, IEEE, Oct. 1995.

Penninckx, Chbat, Pierre & Thiery, "The Phase–Shaped Binary Transmission (PSBT): A New Technique to Transmit Far Beyond the Chromatic Dispersion Limit", IEEE Photonics Technology Letters, vol. 9, No. 2, IEEE, Feb. 1997.

Shtaif & Gnauck, "The Relation Between Optical Duobinary Modulation and Spectral Efficiency in WDM Systems", IEEE Photonics Technology Letters, vol. 11, No. 6, IEEE, Jun. 1999.

Walklin & Conradi, "Multilevel Signaling for Extending the Dispersion–Limited Transmission Distance in High Speed, Fiber Optic Communication Systems", Conference Paper at 1996 Canadian Conference on Electrical and Computer Engineering, Glimpse into the 21st Century, Cat. No.96TH8157, Calgary, Alta. Canada, May 26–29, 1996, published New York, NY, USA, 1996, p.233–6, vol. 1.

Walklin & Conradi, "A10 Gb/s4–ary ASK Lightwave System" Conference Paper at IOOC_ECOC 97 (Conf. Publ No. 448), 11th International Conference on Integrated Optics and Optical Fibre Communications, Edinburgh, UK, Sep. 1997, London UK: IEE, 1997, p. 255–8, vol.3.

Stark, Mazo & Laroia, "Phased Amplitude–Shift Signaling (PASS) Codes: Increasing the Spectral Efficiency of DWDM Transmission", Conference Paper at 24th European Conference on Optical Communication ECOC '98, IEEE Cat. No. 98TH8398, Madrid, Spain, Sep. 20–24, 1998, published Madrid, Spain: Telefonica, 1998, p. 373–4 vol. 1.

Stark, Mazo & Laroia, "Line Coding for Dispersion Tolerance and Spectral Efficiency: Duobinary and Beyond", Conference Paper at OFC/IOOC'99 Optical Fiber Communication Conference and the International Conference on Integrated Optics and Optical Fiber Communications, Cat. No. 99CH36322, San Diego, CA, USA, Feb. 21–26, 1999, published Piscataway, NJ, USA, 1999, p.331–3 vol. 2.

Price & Mercier, "Reduced Bandwidth Optical Digital Intensity Modulation with Improved Chromatic Dispersion Tolerance", Electronic Letters, vol. 31, No. 1, IEE, Jan. 5th, 1995, pp 58–59.

Kuwano, Yonenaga & Iwashita, "10 Gbit/s Repeaterless Transmission Experiment of Optical Duobinary Modulated Signal", Electronic Letters, vol. 31, No. 16, IEE, Aug. 3rd, 1995, pp 1359–1361.

Sieben, Conradi, Dodds, Davies & Walkin, "10 Gbit/s Optical Single Sideband System", Electronic Letters, vol. 33, No. 11, IEE, May 22nd, 1997, pp 971–973.

Penninckx, "Enhanced–Phase–Shaped Binary Transmission", Electronic Letters, vol. 36, No. 5, IEE, Mar. 2nd, 2000, pp 478–480.

* cited by examiner

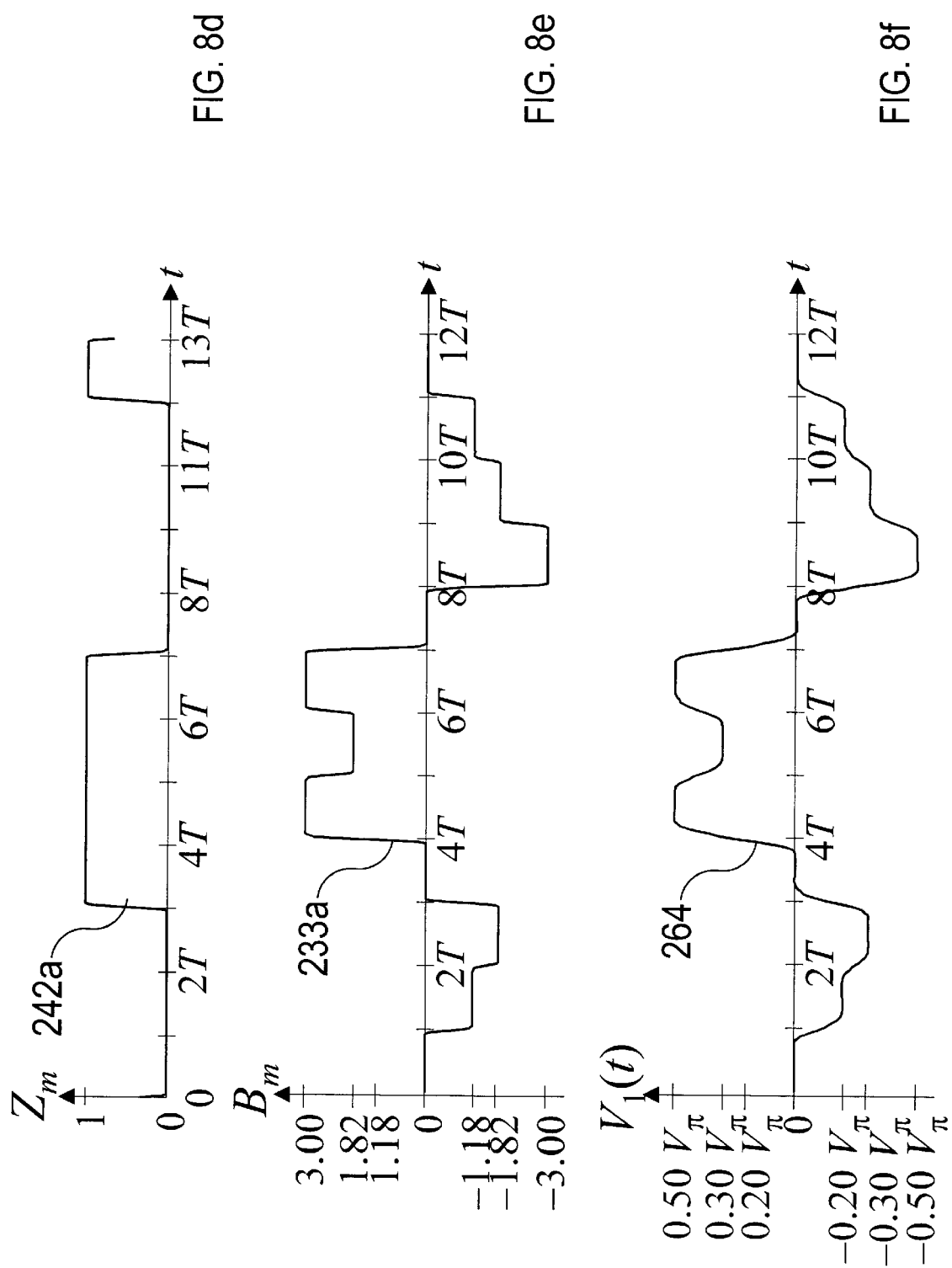

TRANSMISSION AND RECEPTION OF DUOBINARY MULTILEVEL PULSE-AMPLITUDE-MODULATED OPTICAL SIGNALS USING FINITE-STATE MACHINE-BASED ENCODER

BACKGROUND OF THE INVENTION

1. Field of the Invention

The invention relates generally to optical communication systems and, more particularly, to transmission and reception of digital information bits encoded in duobinary, multilevel pulse-amplitude modulation optical signals which, for a given bit rate, have a narrow optical spectrum and low symbol rate, and enable the information bits to be recovered from the intensity of the received optical signal without potential error propagation.

2. Description of the Prior Art

It is well known that in optical communication systems conveying digital information, whether they transmit a single signal at a single carrier wavelength or transmit multiple signals at different carrier wavelengths (i.e., employ wavelength-division multiplexing), for a fixed bit rate per carrier wavelength, it is beneficial to design the transmitted signal to have a narrow optical spectrum and to use a long symbol interval. Throughout this patent, the term "optical spectrum" refers to the power spectral density of the transmitted optical electric field.

Furthermore, implementation of optical communication systems is simplified greatly if the transmitted signal is designed so that the transmitted information bits can be recovered at the receiver simply by extracting from the received optical signal an electrical signal proportional to the intensity of the received optical signal (i.e., the absolute square of the received optical electric field), and performing symbol-by-symbol decisions. Currently, almost all practical optical communication systems use direct detection, in which a photodetector generates a photocurrent proportional to the received optical signal intensity. It is also possible to extract an electrical signal proportional to the received optical signal intensity through other means, e.g., asynchronous homodyne or asynchronous heterodyne detection.

Single-sideband amplitude modulation is a traditional means to narrow the spectrum of a modulated signal by a factor of two, and involves modulation of a signal and its Hilbert transform onto quadrature carriers at the same carrier frequency. A few prior works have described single-sideband modulation of optical signals, but the single-sideband optical modulation schemes proposed to date are very difficult to implement in practice. Vestigial-sideband amplitude modulation is essentially an imperfect practical implementation of single-sideband amplitude modulation. Optical vestigial-sideband amplitude modulation can be implemented by first generating an amplitude-modulated optical signal and then filtering it with an optical filter having a sharp cutoff centered at the optical carrier frequency but, in practice, it is difficult to fabricate filters having sufficiently sharp cutoff and to match the optical carrier frequency and filter cutoff frequency with sufficient accuracy.

Multiple-subcarrier modulation (also called subcarrier multiplexing) represents a well-known approach to increasing the symbol interval. In this approach, the information bit stream is divided into multiple substreams at lower bit rates, and each substream is modulated onto an electrical subcarrier at a different. subcarrier frequency. The modulated subcarriers are summed to form a frequency-division-multiplexed electrical signal, which is then modulated onto an optical carrier, usually by intensity modulation. While multiple-subcarrier modulation lengthens the interval of symbols transmitted on individual subcarriers, it does not necessarily reduce the total optical bandwidth of the transmitted signal. Multiple-subcarrier modulation offers poor average optical-power efficiency (e.g., compared to on-off keying, which is the same as 2-ary pulse-amplitude modulation), and this efficiency decreases further as the number of subcarriers is increased. Multiple-subcarrier modulation requires transmitters and receivers significantly more complicated than those required by baseband modulation techniques, such as on-off keying and M-ary pulse-amplitude modulation.

Modulation of information bits onto optical signals using M-ary phase-shift keying (for $M \geq 3$) or using M-ary quadrature-amplitude modulation (for $M \geq 4$) represent other well-known means to narrow the optical spectrum and lengthen the symbol interval of the transmitted signal. However, very complicated phase-sensitive detection techniques are required to recover the transmitted bits, such as synchronous homodyne or synchronous heterodyne detection.

It is well-known that M-ary pulse-amplitude modulation, in which information bits are encoded in one of M intensity levels during each symbol interval, where $M \geq 3$, represents a means to narrow the optical spectrum and lengthen the symbol interval as compared to on-off keying (which is equivalent to 2-ary pulse-amplitude modulation). It is well-known that for a given information bit rate, as M is increased, the spectrum narrows and the symbol interval increases. A key drawback of M-ary pulse-amplitude modulation is that for a given M, it does not offer the maximal spectral narrowing that can be achieved.

M-ary pulse-amplitude modulation with duobinary encoding is a well-known modulation technique that has been widely studied for a variety of communication media. For reasons to be described below, to date, only M=2 has been chosen in optical communication systems. In this technique, a sequence of M-ary pulse-amplitude modulation symbols, $I_m$, where m is a time index of symbol intervals, is encoded to yield a duobinary symbol sequence $B_m = I_m + I_{m-1}$, which is transmitted. Duobinary encoding narrows the spectrum of the transmitted signal, and choosing M>2 provides additional spectral narrowing and lengthens the symbol interval. A duobinary M-ary pulse-amplitude modulation signal takes on 2M−1 possible levels, including M−1 negative levels, M−1 positive levels, and zero. Optimal detection of duobinary M-ary pulse-amplitude modulation signals requires maximum-likelihood sequence detection, but at high bit rates, this is difficult to implement, so that symbol-by-symbol detection is typically performed, and the symbol sequence $I_m$ is precoded to avoid error propagation in the recovered information bits.

Numerous patents and research papers have documented the use of 2-ary pulse-amplitude modulation (which is equivalent to on-off keying) with duobinary encoding in optical communication systems. To our knowledge, all of these works have utilized precoding to permit symbol-by-symbol detection without error propagation. While these works have described many different techniques to implement precoding, duobinary encoding and modulation of the duobinary signal onto the optical carrier, all of these techniques result in transmission of equivalent optical signals, which take on one of three possible electric-field amplitude values, e.g., $\{-\alpha, 0, \alpha\}$. Using precoded, 2-ary pulse-amplitude modulation with duobinary encoding, it is possible to recover the transmitted information bits by performing symbol-by-symbol detection on a signal proportional to the received optical intensity, such as the photocurrent in a direct-detection receiver. 2-ary pulse-amplitude modulation with duobinary encoding offers essentially the same average optical-power efficiency as on-off keying. While this technique narrows the optical spectrum by about a factor of two (as compared to on-off keying), it does not provide the narrowing that would be possible for M>2, nor does it lengthen the symbol interval (as compared to on-off keying).

It is highly desirable to employ duobinary M-ary pulse-amplitude modulation, M>2, in optical communication systems, to achieve both a narrower optical spectrum and a longer symbol interval. However, with all previously known precoding techniques, it is not possible to recover the transmitted information bits using symbol-by-symbol detection on a signal proportional to the received optical intensity, such as the photocurrent in a direct-detection receiver, without potential error propagation. Using all previously known precoding techniques, for M>2, it would be necessary to employ a complicated, phase-sensitive detection technique to receive the optical signal, e.g., synchronous homodyne or synchronous heterodyne detection. Hence, to date, it has not been possible to use duobinary M-ary pulse-amplitude modulation, for M>2, in practical optical communication systems using direct-detection receivers.

There is a need for methods and apparatus to transmit and receive duobinary M-ary pulse-amplitude-modulated signals in optical communication systems, for any choice of M>2, and for any choice of the M intensity levels, where the signals are precoded such that the transmitted information bits can be recovered using symbol-by-symbol detection on a signal proportional to the received optical intensity, e.g., by using a simple direct-detection receiver, without potential error propagation.

SUMMARY OF THE INVENTION

It is therefore an object of the present invention to provide methods and apparatus to transmit and receive duobinary M-ary pulse-amplitude-modulated optical signals, for M>2, in optical communication systems.

Another object is to provide methods and apparatus to precode duobinary M-ary pulse-amplitude-modulated optical signals, for M>2, such that the transmitted information bits can be recovered using symbol-by-symbol detection on a signal proportional to the received optical intensity, e.g., by using a simple direct-detection receiver, without the potential for error propagation.

Briefly, in a preferred embodiment of a duobinary M-ary pulse-amplitude modulation optical transmission system, information bits to be transmitted are formed into blocks of k bits, where $k \leq \log_2 M$. Blocks of k bits are input to a M-ary pulse-amplitude modulation symbol encoder, which encodes each block into a pulse-amplitude modulation symbol taking on one of M levels $D^{(0)}, \ldots, D^{(M-1)}$, where $M \geq 2$. The level $D^{(0)}$ is nominally zero, and the remaining M-1 levels, $D^{(1)}, \ldots, D^{(M-1)}$, are nonzero and all of the same sign. This encoding is performed using Gray coding. The encoder output is a M-ary pulse-amplitude modulation symbol sequence $D_m$, where m is a time index counting symbol intervals. When M>2, for a given information bit rate, the duration of each symbol interval is longer than the symbol interval using 2-ary pulse-amplitude modulation (which is equivalent to on-off keying).

The M-ary pulse-amplitude modulation symbol sequence $D_m$ is input to a finite-state machine, which effectively performs two functions. The finite-state machine effectively precodes the symbol sequence so that at the receiver, the transmitted information bits can be recovered from the received optical signal using symbol-by-symbol detection on a signal proportional to the received optical intensity, e.g., by using a simple direct-detection receiver, without the potential for error propagation. At the same time, the finite-state machine effectively performs duobinary encoding, which introduces temporal correlation in the symbol sequence for the purpose of narrowing the spectrum of the transmitted optical signal by approximately a factor of two as compared to a M-ary pulse-amplitude modulation signal that has not been duobinary encoded.

Within the finite-state machine, the M-ary pulse-amplitude modulation symbol sequence $D_m$ is input to a subsequence decomposer, which forms a logical subsequence $S_{m,0}$, which is a binary sequence having symbol interval T, and is associated with the level $D^{(0)}$. During each symbol interval, the logical subsequence $S_{m,0}$ takes on a logical 0 unless the sequence $D_m$ takes on the level $D^{(0)}$, in which case, the logical subsequence $S_{m,0}$ takes on a logical 1.

The logical subsequence $S_{m,0}$ is input to a logical subsequence precoder, which includes an exclusive-OR gate and a one-symbol delay interconnected in a feedback arrangement. The output of the logical subsequence precoder is the logical precoded subsequence $Z_m$, which is related to $S_{m,0}$ by $Z_m = S_{m,0} - Z_{m-1}$, (mod2). The pulse-amplitude modulation symbol sequence $D_m$ and the logical precoded subsequence $Z_m$ are input to a selective inverter, which yields the duobinary precoded pulse-amplitude modulation symbol sequence $B_m$. During each symbol interval, $B_m = D_m$ if $Z_m$ takes on a logical 1, and $B_m = -D_m$ if $Z_m$ takes on a logical 0.

During each symbol interval, the sequence $B_m$ takes on one of a set of 2M-1 levels, which include the nominally zero level $D^{(0)}$, the M-1 positive levels $D^{(1)}, \ldots, D^{(M-1)}$, and the M-1 negative levels $-D^{(1)}, \ldots, -D^{(M-1)}$. The sequence $B_m$ takes on nonzero levels of opposite signs during two distinct symbol intervals if and only if the sequence $B_m$ takes on the nominally zero level $D^{(0)}$ during an odd number of symbol intervals between these two symbol intervals. The sequence $B_m$ is lowpass filtered, resulting in the duobinary precoded pulse-amplitude modulation signal s(t). Like the sequence $B_m$, the signal s(t) takes on a set of 2M-1 levels, including one nominally zero level, M-1 positive levels, and M-1 negative levels which are, respectively, the negatives of the M-1 positive levels. Moreover, like $B_m$, s(t) changes sign between two symbol intervals if and only if it takes on a nominally zero value during an odd number of intervening symbol intervals.

The duobinary precoded pulse-amplitude modulation signal s(t) is then modulated onto an optical carrier using a modulation subsystem. In the modulation subsystem, a laser or other light source generates an unmodulated optical carrier, which is input to a dual-drive, push-pull, Mach-Zehnder interferometric intensity modulator. The intensity modulator is driven by complementary drive signals $V_1(t) = Gs(t)$ and $V_2(t) = -Gs(t)$, each of which takes on values between $-V_\pi/2$ and $V_\pi/2$, where $V_\pi$ is the drive voltage required to produce a phase shift of $\pi$. The intensity modulator is biased by a d.c. bias chosen so that the modulator output is approximately zero when the drive signals $V_1(t)$ and $V_2(t)$ are zero. The modulator output is a duobinary M-ary pulse-amplitude-modulated optical signal described by the transmitted optical electric field $E_{trans}(t)$. Like the sequence $B_m$ and the signal s(t), $E_{trans}(t)$ takes on a set of 2M-1 levels, including one nominally zero level, M-1 positive levels, and M−1 negative levels which are, respectively, the negatives of the M-1 positive levels. Moreover, like $B_m$ and s(t), $E_{trans}(t)$ changes sign between two symbol intervals if and only if it takes on a nominally zero value during an odd number of intervening symbol intervals. The transmitted optical electric field $E_{trans}(t)$ is launched into the optical transmission medium, which may be a fiber or free-space optical medium.

At the output of the optical transmission medium, the received duobinary M-ary pulse-amplitude-modulated optical signal is described by the received optical electric field $E_{rec}(t)$. The transmitted information bits can be recovered from the received optical electric field $E_{rec}(t)$ using a direct-detection receiver, an asynchronous homodyne receiver, or an asynchronous heterodyne receiver. While each of these three receiver designs is implemented differently, each extracts from the received optical electric field $E_{rec}(t)$ a M-ary pulse-amplitude modulation signal v(t), which depends on $E_{rec}(t)$ only through the received optical intensity $I_{rec}(t)=|E_{rec}(t)|^2$. Accordingly, the M-ary pulse-amplitude modulation signal v(t) takes on M−1 positive levels and one level that is approximately zero. The M-ary pulse-amplitude modulation signal v(t) is input to a M-ary pulse-amplitude modulation decision device, which performs M-ary symbol-by-symbol decisions by comparing the M-ary pulse-amplitude modulation signal v(t) to a set of M−1 thresholds. Because the M-ary pulse-amplitude modulation decision device does not perform decisions by comparing values of the M−1 level pulse-amplitude modulation signal v(t) in successive symbol intervals, decisions are not subject to error propagation. The M-ary pulse-amplitude modulation decision device yields at its output blocks of k recovered information bits, which are converted to a serial sequence of recovered information bits by a parallel-to-serial converter.

An advantage of the present invention is that the transmitted optical signal has a narrow optical spectrum, so that in wavelength-division-multiplexed systems, which utilize some form of optical or electrical filters to select the desired signal at the receiver, the spacing between carrier frequencies can be reduced subject to some constraints on the tolerable distortion to the desired signal caused by these filters and the tolerable crosstalk from undesired signals not rejected by these filters, thereby increasing the spectral efficiency of the system.

Another advantage of the present invention is that the transmitted optical signal has a narrow optical spectrum, reducing pulse spreading caused by chromatic dispersion in systems using single-mode fiber as the transmission medium.

Another advantage of the present invention is that the transmitted optical signal has a long symbol interval, improving the receiver's ability to recover the transmitted information bits in the presence of dispersion (i.e., pulse spreading) originating from several sources, including chromatic dispersion or polarization-mode dispersion in single-mode fiber, modal dispersion in multi-mode fiber, and multipath propagation in free-space links.

Another advantage of the present invention is that the transmitted optical signal has a long symbol interval, reducing the electrical bandwidth required of electrical-to-optical converters, optical-to-electrical converters and electrical components in the transmitter and receiver.

Another advantage of the present invention is that the transmitted optical signal has a long symbol interval, reducing the clock speed required in the transmitter and receiver.

Another advantage of the present invention is that the transmitted information bits can be recovered using symbol-by-symbol detection on a signal proportional to the received optical intensity, such as the photocurrent in a direct-detection receiver.

These and other objects and advantages of the present invention will no doubt become obvious to those of ordinary skill in the art after having read the following detailed description of the preferred embodiments, which are illustrated in the various figures.

BRIEF DESCRIPTION OF THE DRAWINGS

FIG. 5c is a block diagram of a duobinary 4-ary pulse-amplitude modulation signal encoder for the embodiment of FIG. 5a;

FIGS. 8a–8i are waveforms of electrical and optical signals in a duobinary 4-ary pulse-amplitude modulation transmitter and receiver of the present invention;

FIG. 9c is a block diagram of a duobinary 4-ary pulse-amplitude modulation signal encoder for the embodiment of FIG. 9a;

DETAILED DESCRIPTION OF THE PREFERRED EMBODIMENTS

Figure 1:
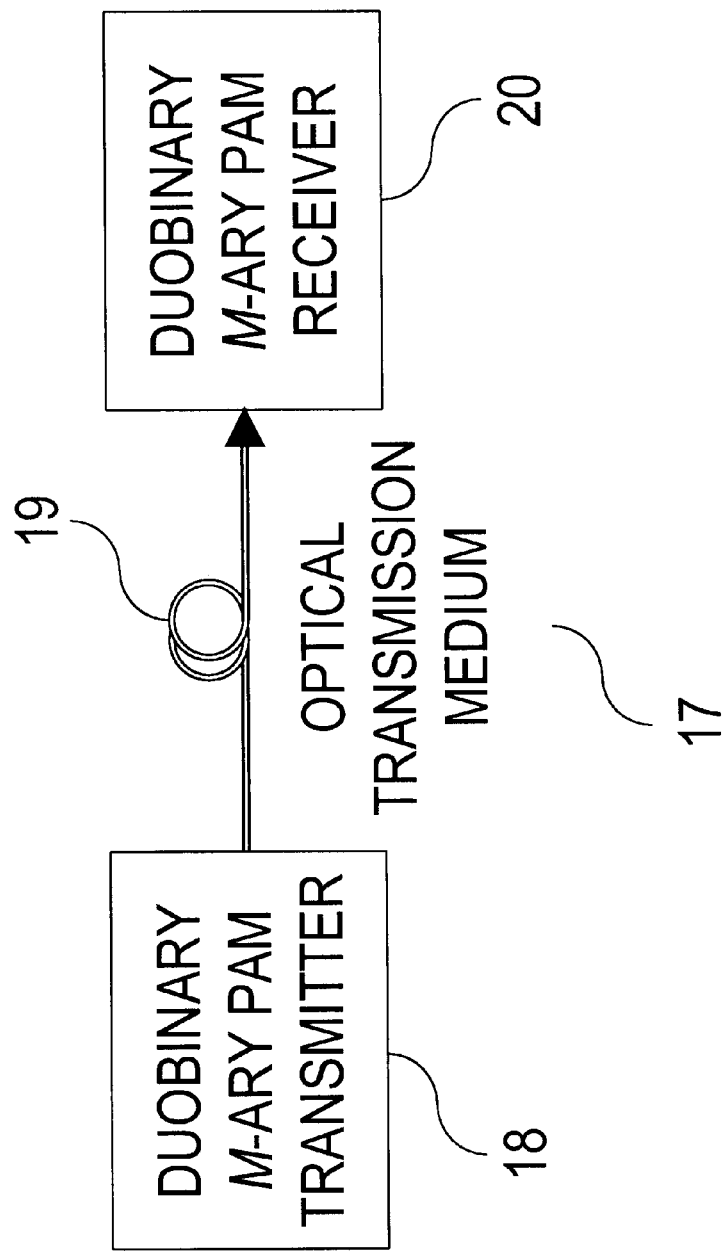
FIG. 1 is an optical communication system using a duobinary M-ary pulse-amplitude modulation transmitter and a duobinary M-ary pulse-amplitude modulation receiver of the present invention.

FIG. 1 is a block diagram of a system for conveying information bits through an optical transmission medium following the present invention, and is given a general reference number 17. A duobinary M-ary pulse-amplitude modulation transmitter 18 encodes the information bits into an optical signal, and transmits the optical signal into the optical transmission medium 19. The optical signal received through 19 is decoded by a duobinary M-ary pulse-amplitude modulation receiver 20, which recovers the information bits.

Figure 2:
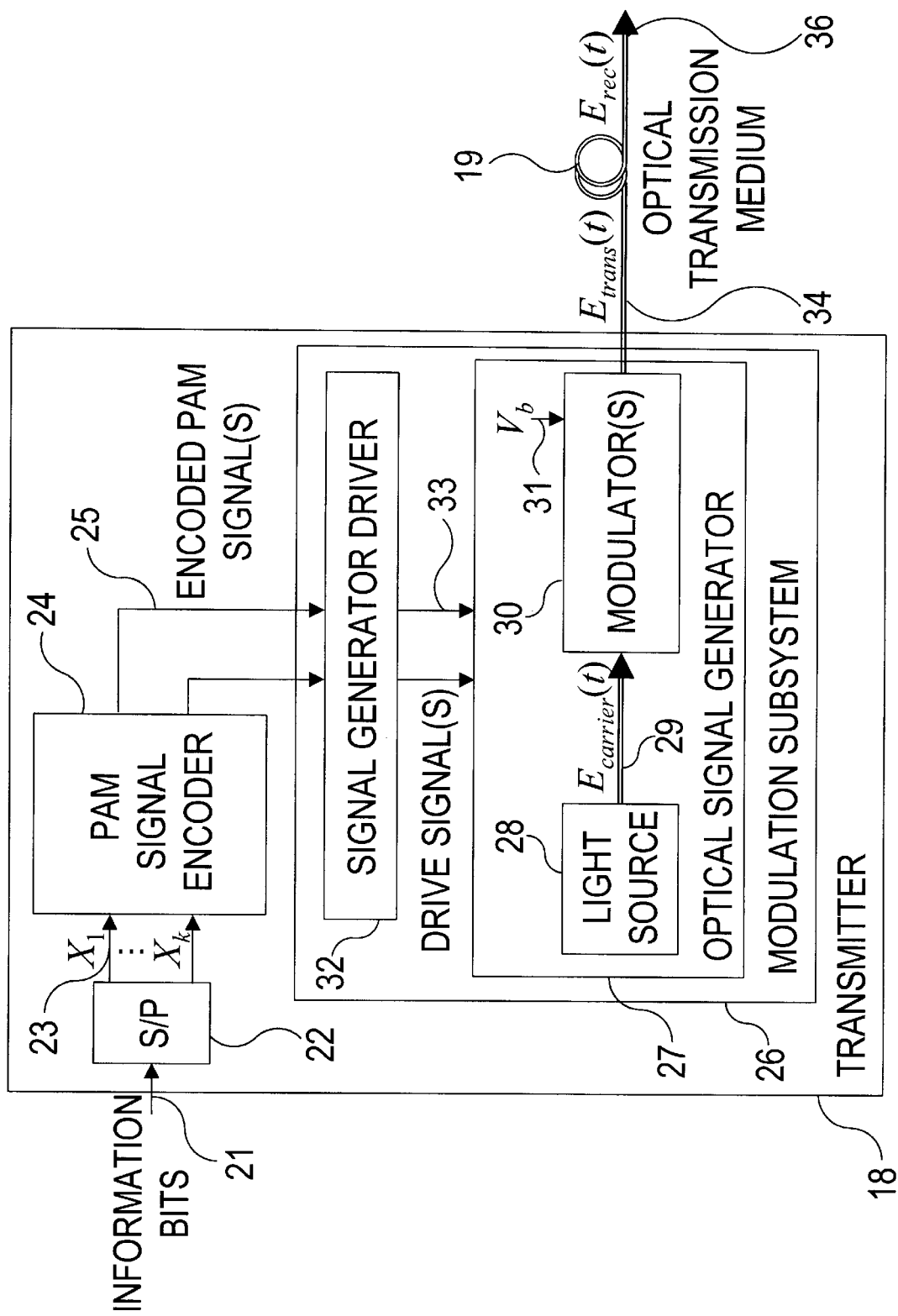
FIG. 2 is a block diagram of a duobinary M-ary pulse-amplitude modulation transmitter of the present invention.

FIG. 2 is a block diagram of the duobinary M-ary pulse-amplitude modulation transmitter of the present invention, referred to by the general reference number 18. Information bits 21 to be transmitted, if in serial form, are passed to a serial-to-parallel converter 22, which forms parallel blocks of k bits, denoted by 23. Alternatively, if information bits are already in the form of parallel blocks 23, the serial-to-parallel converter 22 may be omitted. Throughout this patent, the term "information bits" denotes the bits that are presented to the transmitter 18 to be encoded into an optical signal. These information bits may directly correspond to the output(s) of one or more information sources. Alternatively, these information bits may have been scrambled, encoded (either by a line coder or error-correction coder) or otherwise modified prior to being presented to the transmitter. A pulse-amplitude modulation signal encoder 24 includes a M-ary pulse-amplitude modulation symbol encoder, a finite-state machine, and a lowpass filter. All of these components within 24 may be implemented using an appropriate combination of special purpose hardware and general-purpose hardware, the latter in conjunction with the appropriate software. As described in detail below, in some embodiments of the invention, the order of one or more of these components may be interchanged, one or more of these components may be omitted, one or more of these components may be combined into a single element, or one or more of these component may be included implicitly in a component not contained in 24. For the purposes of making clear the general nature of the invention, we will describe the functions performed by these components assuming they are all present in 24 in separate, explicit form. Within 24, the M-ary pulse-amplitude modulation symbol encoder encodes each block of k information bits into a pulse-amplitude modulation symbol taking on one of M levels, where $M \geq 2$. The number of levels, M, must satisfy $M \geq 2^k$, with $M=2^k$ being encountered most often in practice. The sequence of M-ary pulse-amplitude modulation symbols passes into a finite-state machine, which effectively performs two functions simultaneously. It effectively precodes the M-ary pulse-amplitude modulation symbol sequence so that at the receiver, the transmitted information bits can be recovered from the received optical signal using symbol-by-symbol detection on a signal proportional to the received optical intensity, e.g., by using a simple direct-detection receiver, without the potential for error propagation. At the same time, it effectively performs duobinary encoding, which introduces temporal correlation in the M-ary pulse-amplitude modulation symbol sequence for the purpose of narrowing its spectrum. The output of the finite-state machine is the duobinary precoded pulse-amplitude modulation symbol sequence.

We can describe the duobinary precoded pulse-amplitude modulation symbol sequence as follows. During each symbol interval, this sequence takes on one of a set of 2M−1 levels. This set of levels includes one level that is nominally zero, M−1 positive levels and M−1 negative levels which are, respectively, approximately the negatives of the positive levels. The duobinary precoded pulse-amplitude modulation symbol sequence takes on nonzero levels of opposite signs during two distinct symbol intervals if and only if this sequence takes on the nominally zero level during an odd number of symbol intervals between these two symbol intervals.

The duobinary precoded pulse-amplitude modulation symbol sequence is fed into a lowpass filter, which further narrows the spectrum of the duobinary precoded pulse-amplitude modulation symbol sequence, yielding the duobinary precoded pulse-amplitude modulation signal. Note that although it represents a lowpass-filtered version of the duobinary precoded pulse-amplitude modulation symbol sequence, the duobinary precoded pulse-amplitude modulation signal also conforms to the description given in the previous paragraph. In particular, the duobinary precoded pulse-amplitude modulation signal takes on a set of 2M−1 levels, and it changes sign from one symbol interval to another if and only if it takes on a nominally zero level during an odd number of intervening symbol intervals.

While all of the embodiments of the invention described here explicitly describe the use of one or more lowpass filter(s), it should be emphasized that this(these) filter(s) may be implicitly included in one or more elements of the transmitter. The output of 24 comprises one or more encoded pulse-amplitude modulation signal(s) that convey the duobinary precoded pulse-amplitude modulation signal.

Throughout this patent, we will describe optical signals in terms of their electric fields and their intensities (i.e., instantaneous powers). To define our notation, we consider an abstract optical signal X. In reality, the electric field of X is a real, passband signal at an optical carrier frequency $\omega_0$. We denote this real, passband electric field by $E_{X,rp}(t)$:

$$E_{X,rp}(t)=E_X(t)\cos(\omega_0 t+\phi_0+\phi_X(t)),$$

where $\phi_0$ is the real optical carrier phase, and where $E_X(t)$ and $\phi_X(t)$ are the real, non-negative magnitude and the real phase of the optical signal X, respectively. We will find it convenient to represent the optical signal X by a complex, baseband electric field $E_{X,cb}(t)$:

$$E_{X,cb}(t)=E_X(t)e^{j\phi_X(t)}.$$

Note that the complex, baseband electric field $E_{X,cb}(t)$ completely describes the modulation impressed on the signal X (in the form of $E_X(t)$ and $\phi_X(t)$), but does not describe the carrier frequency $\omega_0$, nor the carrier phase $\phi_0$. Given $E_{X,cb}(t)$, the carrier frequency $\omega_0$ and the carrier phase $\phi_0$, we can recover $E_{X,rp}(t)$ as follows:

$$E_{X,rp}(t)=Re[E_{X,cb}(t)e^{j(\omega_0 t+\phi_0)}].$$

In this patent, we will frequently consider an optical signal X such that $E_{X,cb}(t)$ takes on real values that are zero, positive or negative. Note that when $E_{X,cb}(t)$ is positive, then $\phi_X(t)=0$ (alternatively, we can say that $\phi_X(t)$ is equal to any even integral multiple of $\pi$). When $E_{X,cb}(t)$ is negative, then $\phi_X(t)=\pi$ (alternatively, we can say that $\phi_X(t)$ is equal to any odd integral multiple of $\pi$, such as $-\pi$). Given $E_{X,cb}(t)$, we can compute the intensity of the optical signal X:

$$I_X(t)=|E_{X,cb}(t)|^2.$$

Hereafter in this patent, we will always refer to the electric field of an optical signal X in terms of the complex, baseband electric field $E_{X,cb}(t)$, and we will omit the subscript "cb".

The encoded pulse-amplitude modulation signal(s) are input to a modulation subsystem 26, which modulates onto an optical carrier electric field. The modulation subsystem 26 includes an optical signal generator 27. Within 27, a laser or other light source 28 generates an optical carrier described by an optical carrier electric field $E_{carrier}(t)$, denoted by 29. The optical carrier electric field 29 is passed into one or more modulator(s) 30, which are biased by one or more suitable d.c. bias signals 31. Within 26, the encoded pulse-amplitude modulation signal(s) is(are) passed to a signal generator driver 32, which may include one or more element(s) to process the signal(s) 25, as well as one or more driver(s) to generate drive signal(s) 33. The drive signal(s) 33 is(are) passed into the optical signal generator 27 for driving the modulator(s) 30. In some embodiments, 33 also drives the light source 28. The encoded pulse-amplitude modulation signal(s) are thereby modulated onto the optical carrier electric field 29, yielding a transmitted optical electric field $E_{trans}(t)$, denoted by 34.

The transmitted optical electric field 34 can be described as a duobinary M-ary pulse-amplitude-modulated optical signal, which can be described in terms of a sequence of encoded symbols, each having interval T. In the present invention, the symbol interval T is longer than the symbol interval in systems using 2-ary pulse-amplitude modulation or duobinary 2-ary pulse-amplitude modulation by a factor $\log_2 M$, assuming $M=2^k$. For example, when M=4, the symbol interval is lengthened by a factor of 2.

During a given symbol interval, the transmitted optical electric field 34 takes on one of a set of 2M−1 levels, which we denote as $\{E^{(i)}, i=-(M-1), \ldots, 0, \ldots, M-1\}$. This set of levels includes one level that is nominally zero, $E^{(0)} \approx 0$, which may be nonzero in practice because of a finite extinction ratio in the optical modulator(s), and/or because of imperfections in the modulator d.c. bias 31 and/or the drive signal(s) 33. The set of levels taken on by the transmitted optical electric field 34 includes a set of M−1 positive levels $\{E^{(i)}>0, i=1, \ldots, M-1\}$, and a set of M−1 negative levels $\{E^{(i)} \approx -E^{(-i)}<0, i=-(M-1), \ldots, -1\}$ which are, respectively, approximately the negatives of the positive levels. We recall that the transmitted optical intensity $I_{trans}(t)$ is given by the absolute square of the transmitted optical electric field 34, i.e., $I_{trans}(t)=|E_{trans}(t)|^2$. Hence, during a given symbol interval, the transmitted optical intensity $I_{trans}(t)$ takes on one of a set of M non-negative levels, which we denote as $\{I^{(i)}, i=0, \ldots, M-1\}$, where one of the levels is nominally zero $I^{(0)}=|E^{(0)}|^2 \approx 0$, and where the remaining nonzero levels are given by $I^{(i)}=|E^{(i)}|^2>0, i=1, \ldots, M-1$. For example, if the transmitted optical electric field 34 takes on the levels $\{-\sqrt{3}, -\sqrt{3}, -1, 0, 1, \sqrt{2}, \sqrt{3}\}$, then the transmitted optical intensity $I_{trans}(t)$ takes on the levels $\{0, 1, 2, 3\}$. The temporal properties of the transmitted optical electric field 34, which are key to narrowing the optical spectrum of 34, can be described as follows. The transmitted optical electric field 34 takes on nonzero levels of opposite signs during two distinct symbol intervals if and only if 34 takes on the nominally zero level $E^{(0)}$ during an odd number of symbol intervals between these two symbol intervals.

Figure 3A:
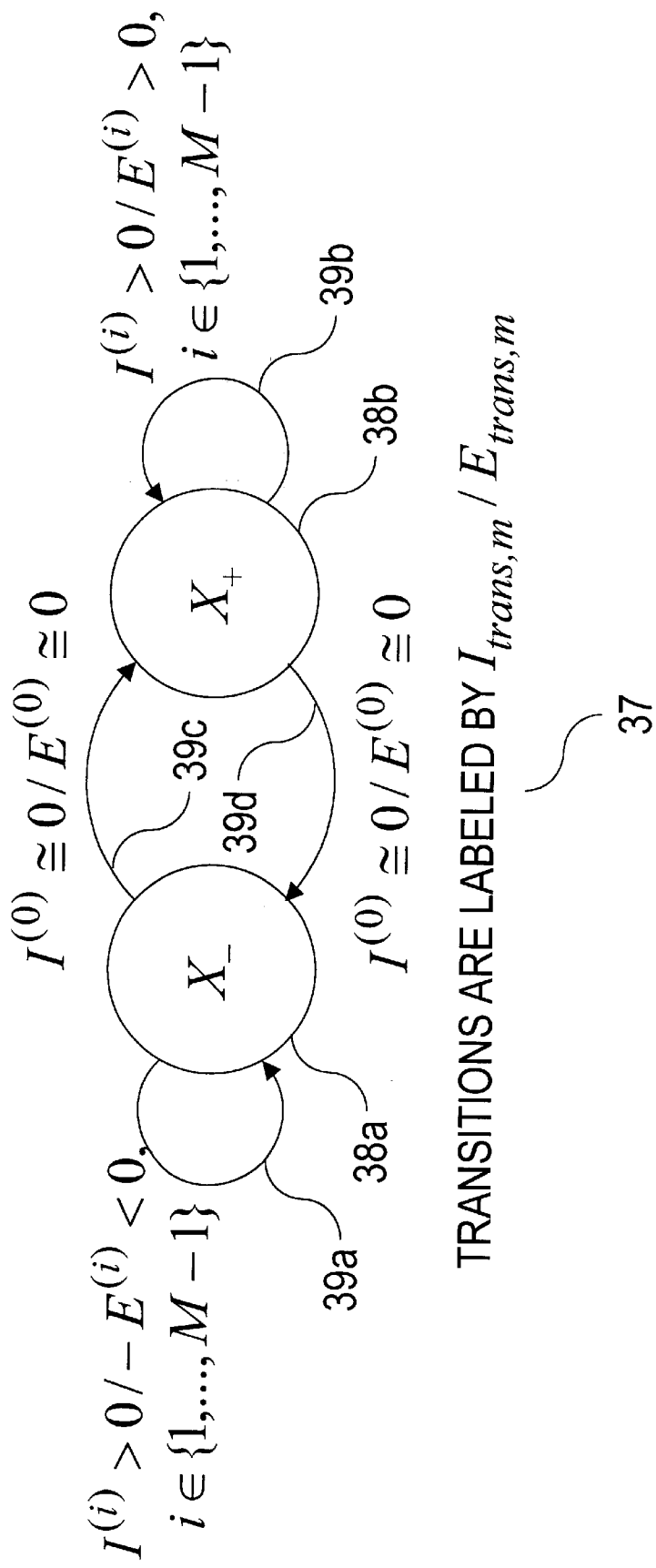
FIG. 3a is a state transition diagram describing the sequence of transmitted optical electric field levels under the present invention.

A sequence of levels of the transmitted electric field 34 under the present invention can be described in terms of a sequence of transitions of a finite-state machine. A state-transition diagram for such finite-state machine is shown in FIG. 3a, and is given a general reference number 37. In the state-transition diagram 37, circles 38a and 38b denote the two states $X_-$ and $X_+$, respectively, of the finite-state machine. The finite-state machine makes a transition from one of the states to the other of the states for each symbol interval during which the nominally zero electric field level $E^{(0)}$ is transmitted. If, at symbol interval m, the finite-state machine is in the state $X_-(38a)$, then at symbol interval m, the transmitted electric field 34 will take on either the zero level or a negative level. Similarly, if, at symbol interval m, the finite-state machine is in the state $X_+(38b)$, then at symbol interval m, the transmitted electric field 34 will take on either the zero level or a positive level. (Later, we will see that in a typical preferred embodiment of the invention, the state corresponds to a value of a bit stored in the delay element (e.g., shift register) within a physical finite-state machine.)

In order to describe mathematically how the transitions of the finite-state machine govern the sequence of transmitted electric field levels, we define $E_{trans,m}$ to be the value of the transmitted optical electric field $E_{trans}(t)$ (34) at symbol interval m. Similarly, we define $I_{trans,m}=|E_{trans,m}|^2$ to be the value of the transmitted optical intensity $I_{trans}(t)=|E_{trans}(t)|^2$ at symbol interval m. The state-transition diagram 37 has four possible transitions 39a, 39b, 39c and 39d, which are indicated by arcs. Each state transition 39a, 39b, 39c and 39d proceeds in the direction indicated by the arrow. For a transition occurring at symbol interval m, the starting state is the result of a transition that occurred at symbol interval m−1, and this starting state governs $E_{trans,m}$, the electric field level transmitted at symbol interval m. For a transition occurring at symbol interval m, the ending state is the result of the transition occurring at symbol interval m, and this ending state will govern $E_{trans,m+1}$, the electric field level transmitted at symbol interval m+1. Each of the transitions 39a, 39b, 39c and 39d is labeled by the corresponding values of $E_{trans,m}$ and $I_{trans,m}$ (we follow a convention common in state-transition diagrams and separate these values by a "/" symbol).

The transition 39a has starting state $X_-(38a)$ and ending state $X_-(38a)$; at symbol interval m, the information bits are to be encoded in one of the M−1 positive intensity levels $I_{trans,m}=I^{(i)}$, $i \in \{1, \ldots, M-1\}$, and the transmitted electric field takes on the specific negative level whose absolute square equals $I_{trans,m}$, i.e., $E_{trans,m}=-E^{(i)}$, $i \in \{1, \ldots, M-1\}$. Note that for transition 39a, the starting and ending states are identical because $I_{trans,m}$ is nonzero (i.e., $E_{trans,m}$ is nonzero). Similarly, the transition 39b has starting state $X_+(38b)$ and ending state $X_+(38b)$; at symbol interval m, the information bits are to be encoded in one of the M−1 positive intensity levels $I_{trans,m}=I^{(i)}$, $i \in \{1, \ldots, M-1\}$, and the transmitted electric field takes on the specific positive level whose absolute square equals $I_{trans,m}$, i.e., $E_{trans,m}=E^{(i)}$, $i \in \{1, \ldots, M-1\}$. The transition 39c has starting state $X_-(38a)$ and ending state $X_+(38b)$; at symbol interval m, the information bits are to be encoded in the nominally zero intensity level $I^{(0)} \approx 0$, and the transmitted electric field takes on the nominally zero level $E^{(0)} \approx 0$. Note that for transition 39c, the starting and ending states are distinct because $I_{trans,m}$ is zero (i.e., $E_{trans,m}$ is zero). Similarly, the transition 39d has starting state $X_+(38b)$ and ending state $X_-(38a)$; at symbol interval m, the information bits are to be encoded in the nominally zero intensity level $I^{(0)} \approx 0$, and the transmitted electric field takes on the nominally zero level $E^{(0)} \approx 0$.

The finite-state machine described by the state-transition diagram 37 is the simplest finite-state machine capable of describing the sequence of transmitted electric field levels under the present invention, in that this finite-state machine has the minimum required number of states, which is two. Since the finite-state machine described by 37 has only two states, the storage of only a single bit is required to keep track of the state, which facilitates implementation. Nonetheless, it is possible to describe the sequence of transmitted electric field levels using another finite-state machine having more than two states. In order to describe correctly a sequence of transmitted electric field levels under the present invention, a finite-state machine must have at least two types of states. The finite-state machine must make a transition from a state of one of these two types to a state of the other of these two types for each symbol interval in which the transmitted electric field takes on the zero level. Moreover if the finite-state machine is in a state of one of these two types, the transmitted electric field level should be either zero or positive; if the finite-state machine is in a state of the other of these two types, the transmitted electric field level should be either zero or negative.

Our description of a sequence of transmitted electric field levels in terms of a sequence of transitions of the finite-state machine is equivalent to the description of the sequence of transmitted field levels given previously, i.e., that the transmitted optical electric field 34 takes on nonzero levels of opposite signs during two distinct symbol intervals if and only if 34 takes on the nominally zero level $E^{(o)}$ during an odd number of symbol intervals between these two symbol intervals.

The optical spectrum of the transmitted optical electric field 34 depends on the design of the symbol encoder, the lowpass filter, and other elements within 24. The optical spectrum also depends on the design of the modulation subsystem 26. Accordingly, the optical spectrum is different for the various embodiments of the invention described below. Nonetheless, for all of the embodiments of duobinary M-ary pulse-amplitude modulation following the present invention, the optical spectrum is narrowed by a factor of approximately 2 as compared to M-ary pulse-amplitude modulation, by a factor of approximately $\log_2 M$ as compared to duobinary 2-ary pulse-amplitude modulation, and by a factor of approximately $2\log_2 M$ as compared to 2-ary pulse-amplitude modulation (on-off keying).

The transmitted optical electric field 34 is launched into the optical transmission medium 19, which may be a fiber or free-space optical medium. In the former case, the optical transmission medium may include single- and/or multi-mode fiber, one or more optical amplifier(s), one or more optical multiplexer(s) and/or demultiplexer(s), and one or more optical filter(s). If present, some of these optical components, such as multiplexers or filters, may serve to further narrow the optical spectrum of the transmitted optical signal. At the output of the optical transmission medium 19, the received duobinary M-ary pulse-amplitude-modulated optical signal is a received optical electric field $E_{rec}(t)$, denoted by 36. We recall that the received optical intensity is given by $I_{rec}(t)=|E_{rec}(t)|^2$.

Figure 4A:
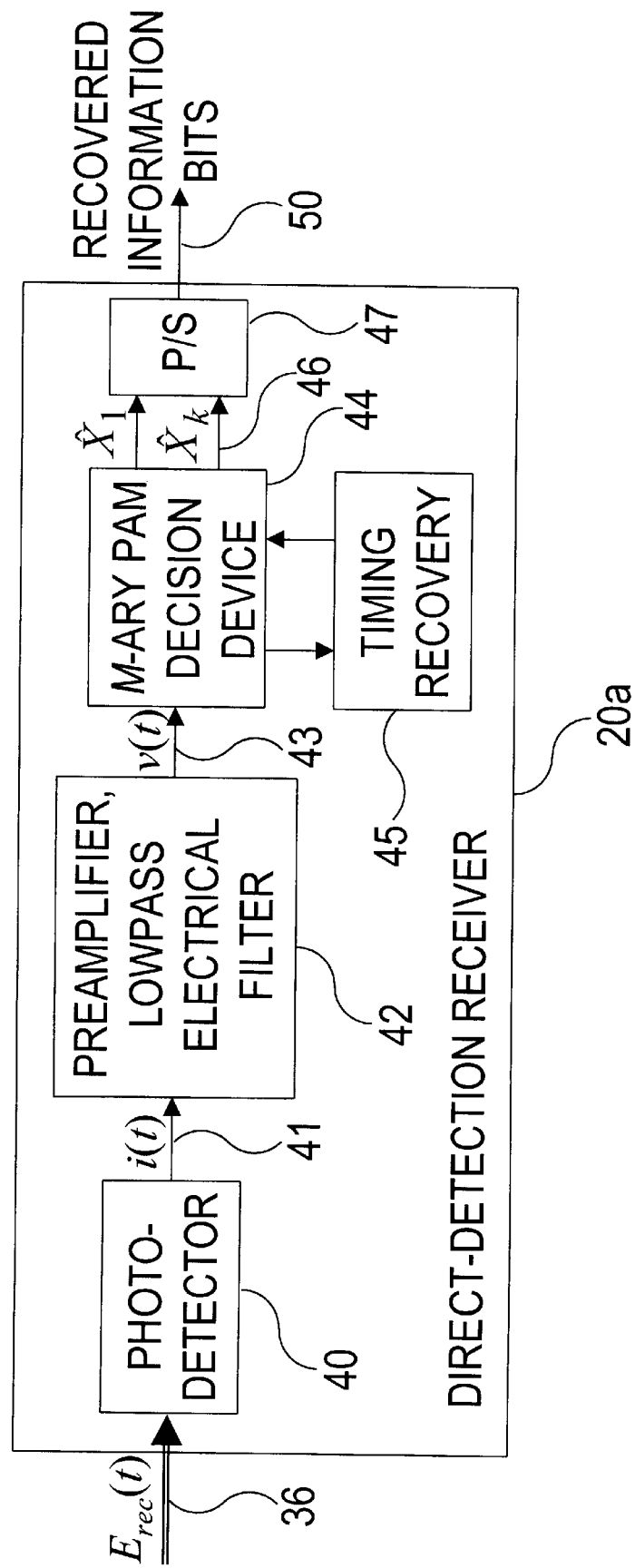
FIGS. 4a, 4b, and 4c are block diagrams of direct detection, homodyne, and heterodyne receivers, respectively, for duobinary M-ary pulse-amplitude-modulated optical signals of the present invention.
Figure 4B:
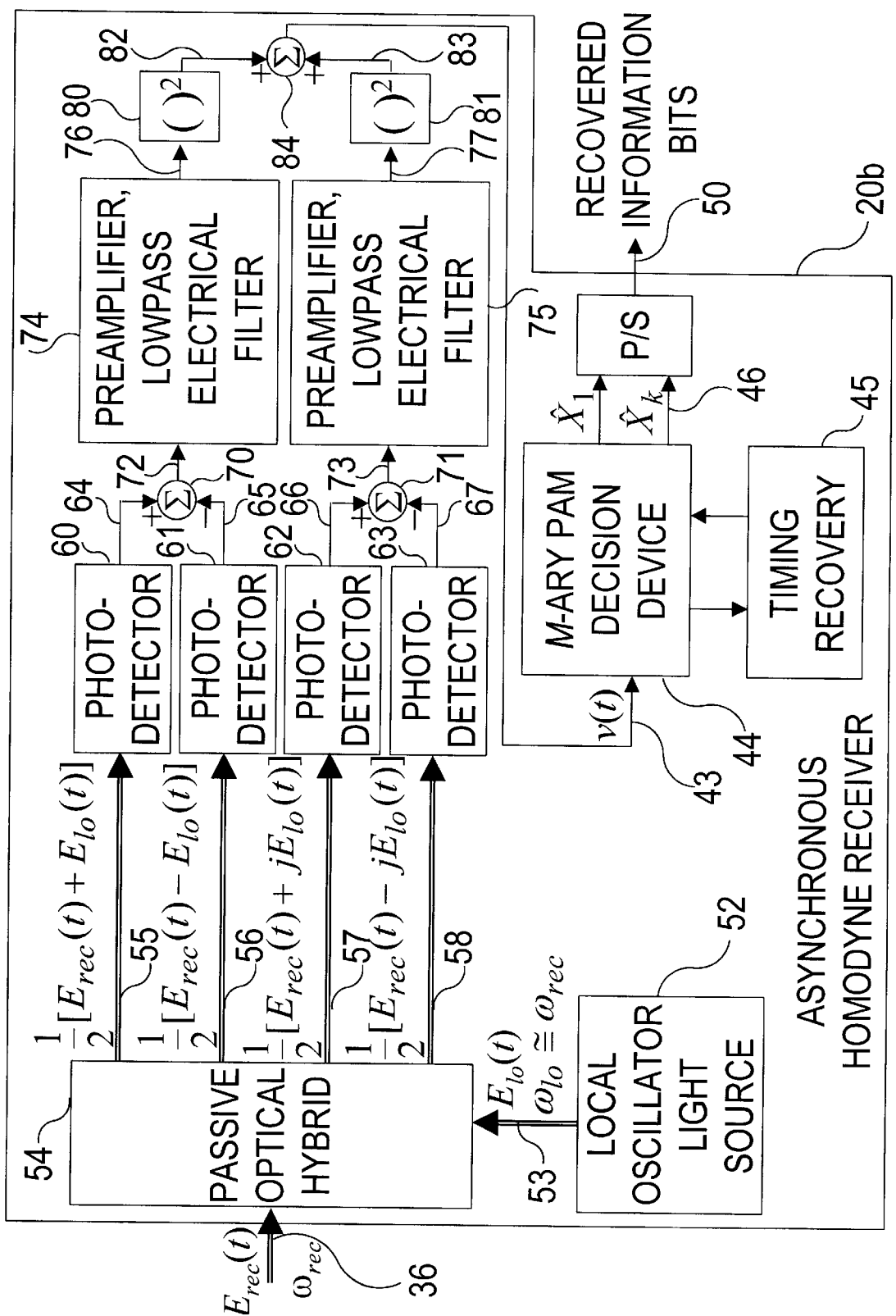
Figure 4C:
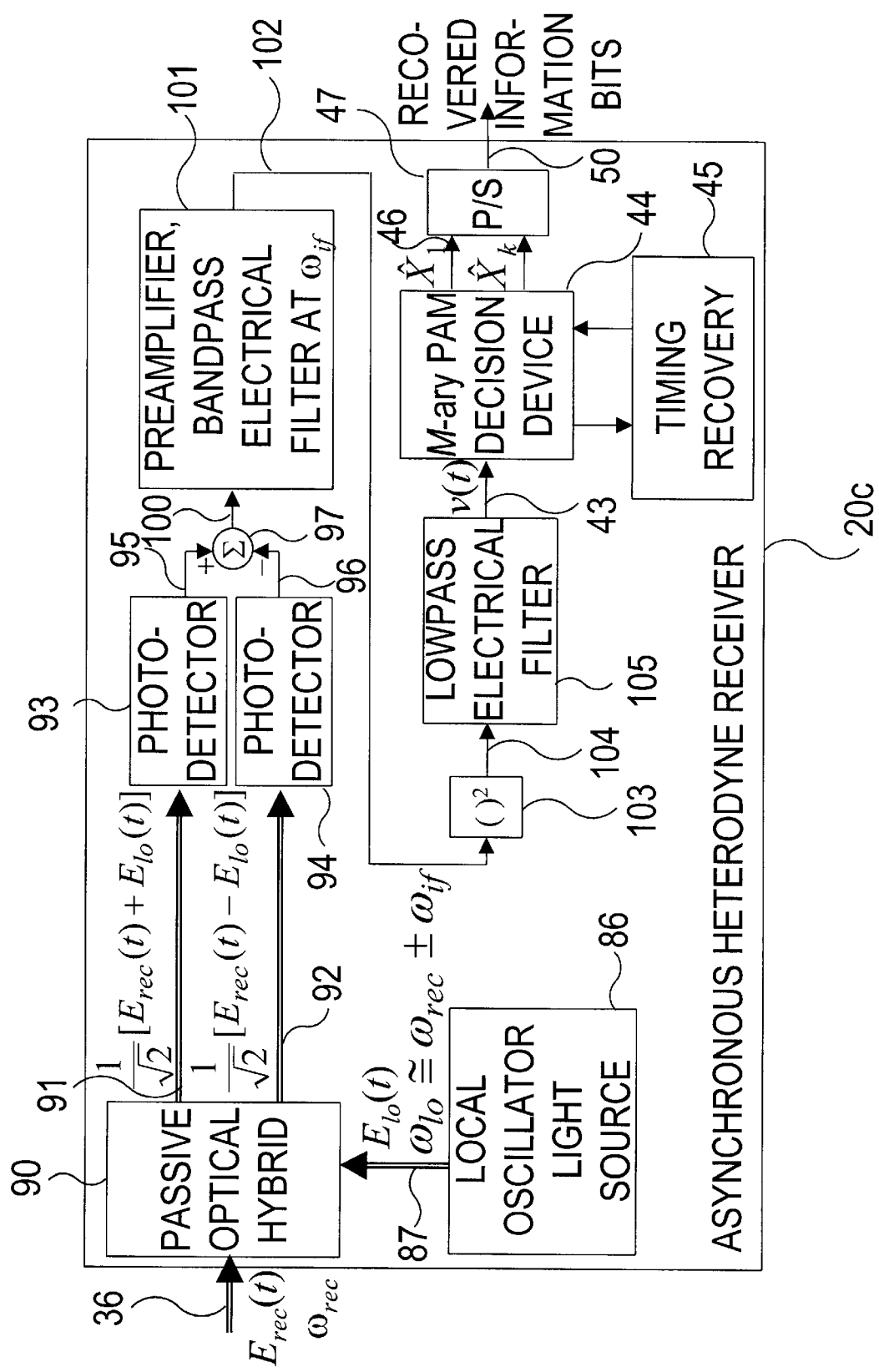

FIGS. 4a, 4b, and 4c are block diagrams of embodiments of receivers for duobinary M-ary pulse-amplitude-modulated optical signals of the present invention. Each of these receivers extracts from the received optical electric field 36 an electrical signal that is proportional to the received optical intensity $I_{rec}(t)$ and performs M-ary symbol-by-symbol decisions to recover the transmitted information bits, without the potential for error propagation.

FIG. 4a is a block diagram of a direct-detection receiver for duobinary M-ary pulse-amplitude-modulated optical signals of the present invention, and is referred to by a general reference number 20a. The optical electric field 36 illuminates a photodetector 40, such as a positive-intrinsic-negative photodiode or an avalanche photodiode, and produces a photocurrent i(t), denoted by 41. The photocurrent 41 is proportional to the received optical intensity $I_{rec}(t)$, and hence the photocurrent 41 can be described as a M-level pulse-amplitude modulation signal. The photocurrent 41 is passed into a block 42, which includes a preamplifier to amplify the photocurrent 41 and a lowpass filter to reduce noise and to shape the received pulses. In practice, the lowpass filter may not be present as a separate element, but may be included in the preamplifier. The output of the block 42 is the M−1 level pulse-amplitude modulation signal v(t), denoted by 43. The M-level pulse-amplitude modulation signal 43 is passed to the M-ary pulse-amplitude modulation decision device 44, which performs M-ary symbol-by-symbol decisions, e.g., by comparing the M−1 level pulse-amplitude modulation signal 43 to a set of M−1 thresholds. We note that because the M-ary pulse-amplitude modulation decision device 44 does not perform decisions by comparing values of the M−1 level pulse-amplitude modulation signal 43 in successive symbol intervals, decisions made by 44 are not subject to error propagation. A timing recovery device 45 generates a recovered clock signal that is used to clock the M-ary pulse-amplitude modulation decision device 44. The timing recovery device 45 may obtain its input from the M-ary pulse-amplitude modulation decision device 44, as shown in FIG. 4a or, alternatively, may obtain its input directly from the M−1 level pulse-amplitude modulation signal 43. The M-ary pulse-amplitude modulation decision device 44 yields at its output a block of k recovered information bits, denoted by 46. A parallel-to-serial converter 47 yields the recovered information bits in a serial stream of recovered output information bits, denoted by 50.

FIG. 4b is a block diagram of an asynchronous homodyne receiver for duobinary M-ary pulse-amplitude-modulated optical signals of the present invention, and is referred to by a general reference number 20b. The asynchronous homodyne receiver 20b may be referred to variously as a phase-diversity homodyne receiver, a non-coherent homodyne receiver, or an incoherent homodyne receiver. The asynchronous homodyne receiver 20b includes a local oscillator laser or other light source 52, which emits a local oscillator optical electric field $E_{/O}(t)$, denoted by 53, whose frequency, $\omega_{/O}$, is approximately equal to the frequency of the received optical electric field 36, which is $\omega_{rec}$. The received optical electric field 36 and the local oscillator optical electric field 53 are combined in a passive optical hybrid 54, whose four outputs comprise in-phase linear combinations $\frac{1}{2}[E_{rec}(t)+E_{/O}(t)]$ and $\frac{1}{2}[E_{rec}(t)-E_{/O}(t)]$, denoted by 55 and 56, respectively, and quadrature linear combinations $\frac{1}{2}[E_{rec}(t)+jE_{/O}(t)]$ and $\frac{1}{2}[E_{rec}(t)-jE_{/O}(t)]$, denoted by 57 and 58, respectively. In a practical implementation, an asynchronous homodyne receiver typically includes some means to match the polarizations of the received optical electric field 36 and the local oscillator optical electric field 53, but this polarization-matching means is omitted from FIG. 4b for simplicity. Each of the four electric-field combinations 55, 56, 57, 58 is passed to one of four photodetectors, numbered 60, 61, 62 and 63, respectively. The photodetectors 60 and 61 issue in-phase photocurrents 64 and 65, respectively. The photodetectors 62 and 63 issue quadrature photocurrents 66 and 67, respectively. The in-phase photocurrents 64 and 65 are fed into a subtraction device 70, while the quadrature photocurrents 66 and 67 are fed into a subtraction device 71. The outputs of the subtraction devices 70 and 71 are an in-phase difference current signal 72 and a quadrature difference current signal 73, respectively. The difference current signals 72 and 73 are passed into the blocks 74 and 75, respectively, each of which includes a preamplifier and a lowpass electrical filter. The block 74 and 75 issue lowpass-filtered, preamplified difference current signals 76 and 77, respectively, which are passed into squarers 80 and 81, respectively. The squarers 80 and 81 issue squared, lowpass-filtered, preamplified difference current signals 82 and 83, respectively, which are summed in a summer 84. The asynchronous homodyne receiver 20b is, up to and including the summer 84, identical to asynchronous homodyne receivers that are employed for 2-ary pulse-amplitude modulation (on-off keying). It is well-known that the output of the subtraction device 84 is a signal proportional to the received optical intensity $I_{rec}(t)=|E_{rec}(t)|^2$. Hence, in the present instance, the output of the summer 84 is the M-level pulse-amplitude modulation signal v(t), denoted by 43. The remainder of the asynchronous homodyne receiver of FIG. 4b, which acts upon the M−1 level pulse-amplitude modulation signal 43, is identical to the corresponding portion of the direct-detection receiver of FIG. 4a, and operates in an identical fashion to yield the recovered information bits 50 without the potential for error propagation. The embodiment of the asynchronous homodyne receiver 20b shown in FIG. 4b is only one of many possible embodiments of an asynchronous homodyne receiver that generates the M−1 level pulse-amplitude modulation signal 43 that is proportional to the received optical intensity $I_{rec}(t)$ and performs symbol-by-symbol M-ary decisions to yield the recovered information bits 50. FIG. 4c is a block diagram of an asynchronous heterodyne receiver for duobinary M-ary pulse-amplitude-modulated optical signals of the present invention, and is referred to by a general reference number 20c. The asynchronous heterodyne receiver 20c may be referred to variously as a non-coherent heterodyne receiver, or an incoherent heterodyne receiver, or simply a heterodyne receiver. The asynchronous heterodyne receiver 20c includes a local oscillator laser or other light source 86, which emits a local oscillator optical electric field $E_{lo}(t)$, denoted by 87, whose frequency, $\omega_{lo}$, is approximately equal to $\omega_{rec}+\omega_{if}$ or $\omega_{rec}-\omega_{if}$, where $\omega_{rec}$ is the frequency of the received optical electric field 36, and where $\omega_{if}$ is a suitably chosen intermediate frequency. The received optical electric field 36 and the local oscillator optical electric field 87 are combined in a passive optical hybrid 90, whose two outputs are the linear combinations $$\frac{1}{\sqrt{2}}[E_{rec}(t) + E_{lo}(t)]$$

and $$\frac{1}{\sqrt{2}}[E_{rec}(t) - E_{lo}(t)],$$

denoted by 91 and 92, respectively. In a practical implementation, an asynchronous heterodyne receiver typically includes some means to match the polarizations of the received optical electric field 36 and the local oscillator optical electric field 87, but this polarization-matching means is omitted from FIG. 4c for simplicity. The electric-field combinations 91 and 92 illuminate photodetectors 93 and 94, respectively, whose outputs are photocurrents 95 and 96, respectively. The photocurrents 95 and 96 are fed to a subtraction device 97, whose output is a difference current signal 100. The difference current signal 100 contains desired components at the intermediate frequency $\omega_{if}$, as well as undesired components at baseband. The difference current signal 100 is fed to a block 101, which contains a preamplifier and a bandpass electrical filter, centered at the intermediate frequency $\omega_{if}$, which serves to removed the undesired baseband components. The output of 101 is an intermediate-frequency signal 102, which is fed to a squarer 103. The squarer 103 issues a squarer output signal 104 having desired components at baseband and undesired components at $2\omega_{if}$, which is twice the intermediate frequency. While 103 is a squarer in the embodiment shown in FIG. 4c, we note that 103 can be replaced by any nonlinear device whose output includes the desired baseband components. The output signal 104 is passed to a lowpass electrical filter 105, which rejects the undesired components and passes only the desired baseband components. The asynchronous heterodyne receiver 20c is, up to and including the lowpass electrical filter 105, identical to asynchronous heterodyne receivers that are employed for 2-ary pulse-amplitude modulation (on-off keying). It is well-known that the output of the lowpass electrical filter 105 is a signal proportional to the received optical intensity $I_{rec}(t)=|E_{rec}(t)|^2$. Hence, in the present instance, the output of the lowpass electrical filter 105 is the M−1 level pulse-amplitude modulation signal v(t), denoted by 43. The remainder of the asynchronous heterodyne receiver of FIG. 4c, which acts upon the M−1 level pulse-amplitude modulation signal 43, is identical to the corresponding portion of the direct-detection receiver of FIG. 4a, and operates in an identical fashion to yield the recovered information bits 50 without the potential for error propagation. The embodiment of the asynchronous heterodyne receiver 20c shown in FIG. 4c is only one of many possible embodiments of an asynchronous heterodyne receiver that generates the M−1 level pulse-amplitude modulation signal 43 that is proportional to the received optical intensity $I_{rec}(t)$ and performs symbol-by-symbol M-ary decisions to yield the recovered information bits 50.

As we have seen, each of the three receiver embodiments 20a, 20b and 20c, extracts from the received optical electric field 36 the M−1 level pulse-amplitude modulation signal 43 that is proportional to the received optical intensity $I_{rec}(t)=|E_{rec(t)}|^2$. In other words, the M−1 level pulse-amplitude modulation signal 43 is essentially equivalent in each of the three receiver embodiments 20a, 20b and 20c. Having extracted the M−1 level pulse-amplitude modulation signal 43, each of the three receiver embodiments 20a, 20b and 20c acts in an identical fashion to perform performs symbol-by-symbol M-ary decisions to yield the recovered information bits 50, without the potential for error propagation.

We will now describe in detail various embodiments of the duobinary M-ary pulse-amplitude modulation transmitter 18, including various embodiments of 24 and various embodiments of 26. For these various embodiments of 18, we will describe the transmitted optical electric field 34, the received optical electric field 36 and the M−1 level pulse-amplitude modulation signal 43; and we will describe how the M-ary pulse-amplitude modulation decision device 44 can make symbol-by-symbol M-ary decisions to obtain the recovered information bits 50 without potential error propagation.

Figure 5A:
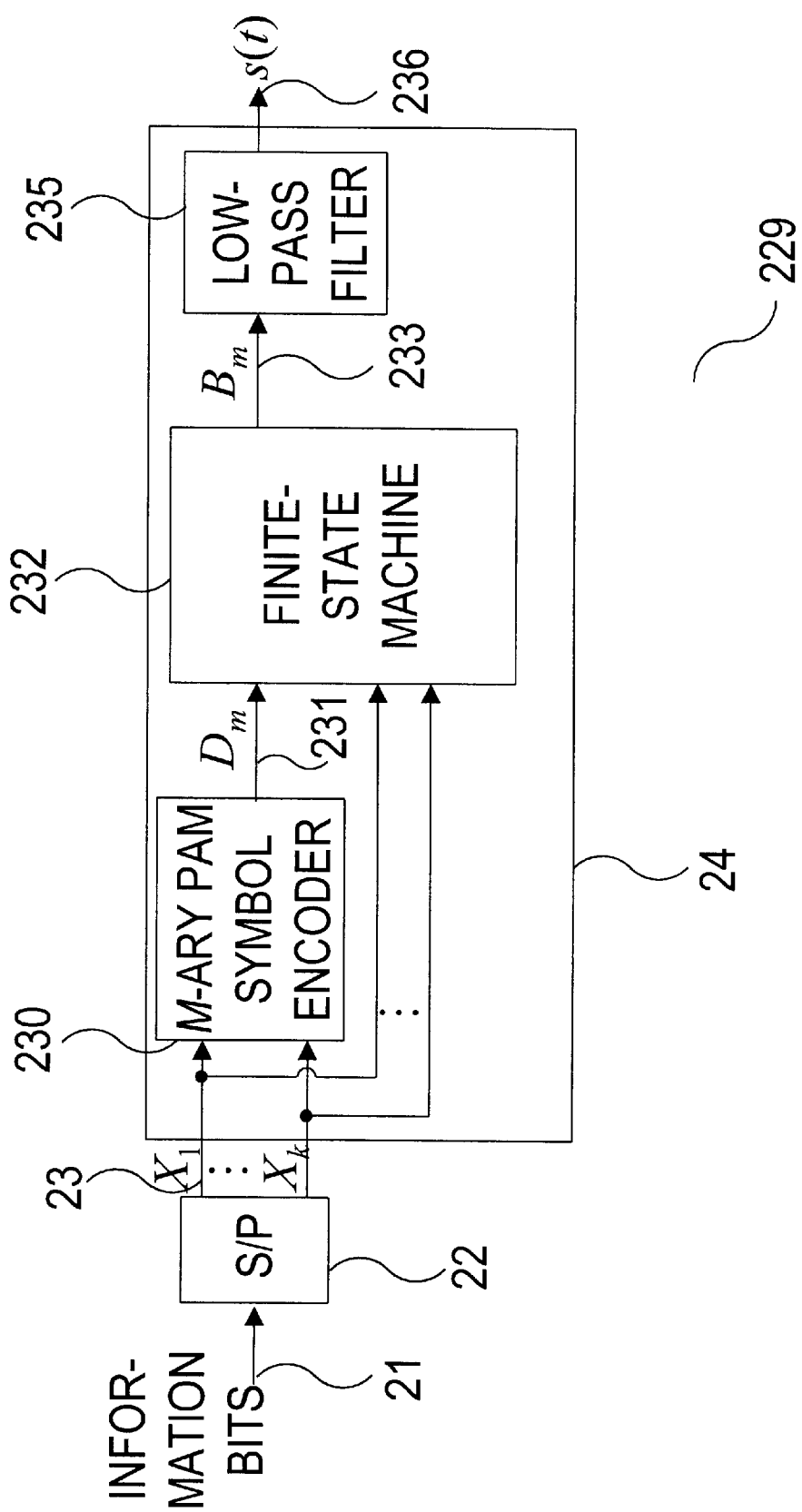
FIGS. 5a and 5b are block diagrams of first and second embodiments of a duobinary M-ary pulse-amplitude modulation signal encoder of the present invention.

FIG. 5a is a block diagram of an embodiment of a duobinary M-ary pulse-amplitude modulation signal encoder of the present invention, referred to by a general reference number 229. Information bits 21 to be transmitted, if in serial form, are passed to the serial-to-parallel converter 22, which forms parallel blocks of k bits, denoted by 23. Alternatively, if information bits are already in the form of parallel blocks 23, the serial-to-parallel converter 22 may be omitted. Blocks of k information bits 23 are input to the pulse-amplitude modulation signal encoder 24, which corresponds to 24 in FIG. 2. Within 24, the blocks of k information bits 23 enter the M-ary pulse-amplitude modulation symbol encoder 230, which encodes each block of k information bits into a pulse-amplitude modulation symbol taking on one of a set of M levels $\{D^{(i)}, i=0, \ldots, M-1\}$, where M>2. The number of levels, M, must satisfy $M>2^k$, with $M=2^k$ being encountered most often in practice. The level $D^{(0)}$ is nomninally zero, and the set of remaining M−1 levels, $\{D^{(i)}, i-1, \ldots, M-1\}$, are nonzero and all of the same sign. In the remainder of the description of the invention, for concreteness, we will assume that the set of remaining M−1 levels are all positive, i.e., $\{D^{(i)}>0, i=1, \ldots, M-1\}$, although the invention would function in a fully equivalent manner if these M−1 levels were all negative. In some cases, it may be desirable for the encoder 230 to perform its encoding using Gray coding, i.e., so that blocks of k information bits 23 encoded into adjacent levels (e.g., $D^{(i)}$ and $D^{(i+1)}$) differ by only one information bit. Gray coding insures that at the receiver, the most likely M-ary symbol-decision errors result in only one information bit error. The output of the encoder 230 is a M-ary pulse-amplitude modulation symbol sequence $D_m$, denoted by 231. In the sequence 231, each symbol has interval T, and m is a time index counting symbol intervals.

The sequence 231 is input to a finite-state machine, denoted by 232. In some embodiments of 229, the block of k information bits (23) is also input to the finite-state machine 232, as indicated in 229. In some cases, having direct access to the information bits 23 may simplify the implementation of the finite state machine 232. The finite-state machine 232 performs two functions simultaneously. The finite-state machine 232 effectively precodes the symbol sequence so that at the receiver, the transmitted information bits can be recovered from the received optical signal using symbol-by-symbol detection on a signal proportional to the received optical intensity, e.g., by using a simple direct-detection receiver, without the potential for error propagation. At the same time, the finite state machine 232 effectively performs duobinary encoding, which introduces temporal correlation in the symbol sequence for the purpose of narrowing its spectrum. The finite state machine 232 issues the duobinary precoded pulse-amplitude modulation symbol sequence $B_m$, denoted by 233.

We can describe the sequence $B_m$ (233) as follows. During each symbol interval the sequence 233 takes on one of a set of 2M−1 levels $\{D^{(i)}, i=-(M-1), \ldots, 0, \ldots, M-1\}$. This set of levels includes the nominally zero level $D^{(0)}$, the set of M−1 positive levels $\{D^{(i)}>0, i=1, \ldots, M-1\}$, and the set of M−1 negative levels $\{D^{(1)}\approx-D^{(-i)}<0, i=-(M-1), \ldots, -1\}$, which are, respectively, the negatives of the positive levels. The sequence 233 takes on nonzero levels of opposite signs during two distinct symbol intervals if and only if the sequence 233 takes on the nominally zero level $D^{(0)}$ during an odd number of symbol intervals between these two symbol intervals. The above description of the sequence $B_m$ (233) is analogous to the description of the sequence of levels of the transmitted optical electric field (34), i.e., that 34 takes on nonzero levels of opposite signs during two distinct symbol intervals if and only if 34 takes on the nominally zero level $E^{(0)}$ during an odd number of symbol intervals between these two symbol intervals. Therefore, the finite-state machine 232, which governs the sequence 233, is analogous to the finite-state machine governing 34. The finite-state machine 232 can be described in terms of a state-transition diagram shown in FIG. 3b, which is given a general reference number 234, and which is analogous to the state-transition diagram 37, shown in FIG. 3a. In the state-transition diagram 234, circles 234a and 234b denote the two states $X_-$ and $X_+$, respectively, of the finite-state machine 232. The finite-state machine 232 makes a transition from one of the states to the other of the states for each symbol interval at which the sequence 233 takes on the nominally zero level $D^{(0)}$. If, at symbol interval m, the finite-state machine 232 is in the state $X_-$(234a), then at symbol interval m, the sequence 233 will take on either the zero level or a negative level. Similarly, if, at symbol interval m, the finite-state machine 232 is in the state $X_+$(234b), then at symbol interval m, the sequence 233 will take on either the zero level or a positive level.

The state-transition diagram 234 has four possible transitions 234c, 234d, 234e and 234f, which are indicated by arcs. Each of the transitions 234c, 234d, 234e and 234f is labeled by the corresponding values of $D_m$ (231) and $B_m$ (233). (In the state-transition diagram 234, we have also labeled the states 234a and 234b by corresponding values of $Z_{m-1}$ (243, FIG. 5b, 243a, FIG. 5c), and have also labeled the transitions 234c–234f by corresponding values of $S_{m,0}$ (238, FIG. 5b, 238a, FIG. 5c) and $Z_m$ (242, FIG. 5b, 242a, FIG. 5c). It should be emphasized that these labels are not relevant to the general encoder 229 using the general finite-state machine 232, but pertain only to specific encoder embodiments (229a, FIG. 5b and 247, FIG. 5c) using specific finite-state machine embodiments (232a, FIG. 5b and 232b, FIG. 5c, respectively), which we discuss below.) The transition 234c has starting state $X_-$(234a) and ending state $X_-$(234a); at symbol interval m, the information bits are to be encoded in one of the M−1 positive levels of $D_m$ (231), i.e., in $D_{(i)}$, $i\in\{1, \ldots, M-1\}$, and the sequence $B_m$ (233) takes on the negative level $-D^{(i)}$, $i\in\{1, \ldots, M-1\}$. Similarly, the transition 234d has starting state $X_+$(234b) and ending state $X_+$(234b); at symbol interval m, the information bits are to be encoded in one of the M−1 positive levels of $D_m$ (231), i.e., in $D^{(i)}$, $i\in\{1, \ldots, M-1\}$, and the sequence $B_m$ (233) takes on the positive level $D^{(i)}$, $i\in\{1, \ldots, M-1\}$. The transition 234e has starting state $X_-$(234a) and ending state $X_+$(234b); at symbol interval m, the information bits are to be encoded in the nominally zero level of $D_m$ (231), i.e., in $D^{(0)}$, and the sequence $B_m$ (233) takes on the zero level $D^{(0)}$. Similarly, the transition 234f has starting state $X_+$(234b) and ending state $X_-$(234a); at symbol interval m, the information bits are to be encoded in the nominally zero level of $D_m$ (231), i.e., in $D^{(0)}$, and the sequence $B_m$ (233) takes on the zero level $D^{(0)}$.

The finite-state machine 232, which is described by the state-transition diagram 234, is the simplest finite-state machine capable of governing the sequence 233, in that 232 has the minimum required number of states, which is two. It is also possible to govern the sequence 233 using a finite-state machine having more than two states, although this would complicate implementation of the finite-state machine. In order to govern the sequence 233, a finite-state machine must have at least two types of states. The finite-state machine must make a transition from a state of one of these two types to a state of the other of these two types for each symbol interval at which the sequence 233 on the zero level. Moreover if the finite-state machine is in a state of one of these two types, $B_m$ (233) should be either zero or positive; if the finite-state machine is in a state of the other of these two types, $B_m$ (233) should be either zero or negative.

The sequence 233 passes into a lowpass filter 235, whose output is a duobinary precoded pulse-amplitude modulation signal s(t), denoted by 236. Note that 236 corresponds to in FIG. 2. Since the lowpass filter 235 is a linear system, the levels taken on by the signal 236 are proportional to the levels taken on by the sequence 233. Accordingly, the signal 236 conforms to the description of the sequence 233 given above. Specifically, the signal 236 takes on a set of 2M−1 levels, and the signal 236 takes on nonzero levels of opposite sign during two distinct symbol intervals if and only if the signal 236 takes on the nominally zero level during an odd number of symbol intervals between these two symbol intervals. Although in the embodiment 229 we show the lowpass filter 235 as a separate component, the lowpass filter may not be present as a separate component, and the lowpass filtering function may be performed by one or more other components in the duobinary M-ary pulse-amplitude modulation signal encoder or in the modulation subsystem that follows it.

In practice, the choice of the M levels that are to be taken on by the sequence 231, which determines the 2M−1 levels taken on by the sequence 233 and the signal 236, depends on the characteristics of the modulation subsystem 26 used to modulate the signal 236 onto the optical carrier electric field 29 to produce the transmitted optical electric field 34, and also depends on the set of levels that are to be taken on by the transmitted optical electric field 34, and thus the transmitted optical intensity $I_{trans}(t)$. We will provide a detailed example after we have described the transfer characteristics of typical embodiments of the modulation subsystem 26.

Figure 5B:
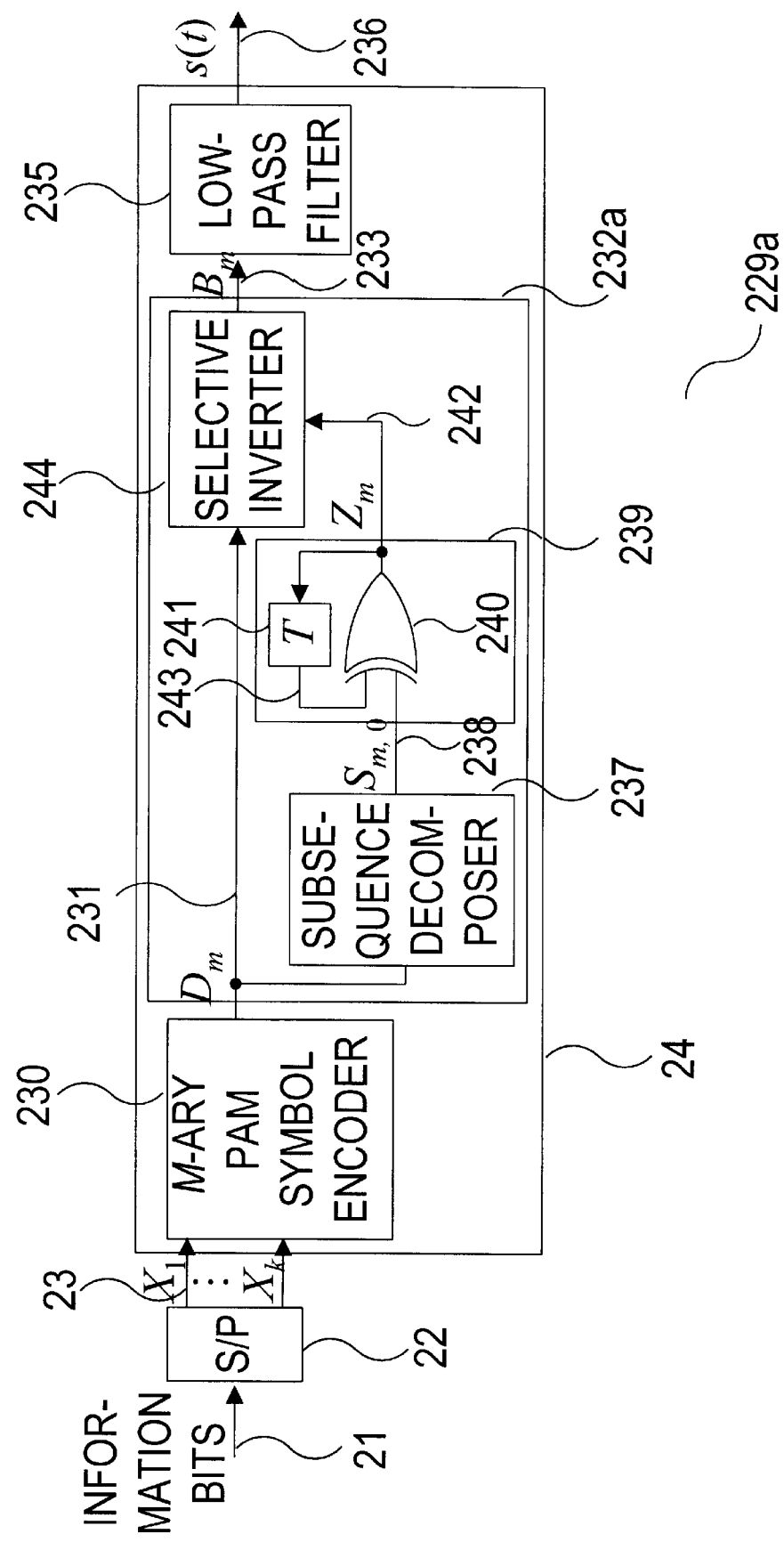

FIG. 5b is a block diagram of an embodiment of a duobinary M-ary pulse-amplitude modulation signal encoder of the present invention, referred to by the general reference number 229a. The encoder 229a performs the same functions as the encoder 229. The encoder 229a includes a finite state machine 232a that is a particular embodiment of the more general finite-state machine 232 that is present in 229. In the case of the encoder 229a, the descriptions of 21, 22, 23, 230, 231, 233, 235 and 236 are equivalent to those for the more general embodiment for the encoder 229. In particular, given a sequence of input information bits 21, the encoder 229a generates an output, in the form of 236, equivalent to that generated by 229. Therefore, we will confine ourselves to describing the finite-state machine 232a that is present in 229a.

In the encoder 229a, the sequence 231 enters the finite-state machine 232a, within which 231 is input to a subsequence decomposer 237, which forms the logical subsequence $S_{m,0}$, denoted by 238. The subsequence 238 is a binary sequence having symbol interval T, and is associated with the level $D^{(0)}$. During each symbol interval, the logical subsequence 238 takes on a logical 0 unless the sequence 231 takes on the level $D^{(0)}$, in which case, the logical subsequence 238 takes on a logical 1. Mathematically, during the mth symbol interval, $S_{m,0}=0$ if $D_m \neq D^{(0)}$ and $S_{m,0}=1$ if $D_m=D^{(0)}$.

The logical subsequence 238 is input to a logical subsequence precoder, which is denoted by 239. The precoder 239 includes an exclusive-OR gate (modulo-2 subtractor), denoted by 240, as well as a one-symbol delay, denoted by 241, interconnected in a feedback arrangement. The output of the logical subsequence precoder 239 is a logical precoded subsequence $Z_m$, denoted by 242. The logical precoded subsequence 242 is related to the logical subsequence 238 by the rule that, during the mth symbol interval, $Z_m=S_{m,0}-Z_{m-1} \pmod 2$, where $Z_{m-1}$ (243) is the value of the logical precoded subsequence $Z_m$ (242) during the previous symbol interval, m−1. We note that the precoder 239 is itself a finite-state machine with input $S_{m,0}$ (238), output $Z_m$ (242), and two states, corresponding to the two possible values of $Z_{m-1}$ (243). The operation of 239 is described by the state-transition diagram 234, shown in FIG. 3b. As described above, the state-transition diagram 234 describes the finite-state machine 232 and for this purpose, each transition is labeled by corresponding values of the sequences $D_m$ (231) and $B_m$ (233). In order to allow the state-transition diagram 234 to describe the precoder 239 as a finite-state machine, in 234, we have labeled the two states 234a and 234b with the corresponding values of $Z_{m-1}$ (243), and have labeled the transitions 234c–234f with the corresponding values of $S_{m,0}$ (238) and $Z_m$ (242) (these labels are given in parentheses). While we have described here an implementation of the precoder 239 based on the exclusive-OR gate 240, it is possible to implement equivalent precoders using other logical gates to perform the function of "comparing" 243 to 238.

Within the encoder 229a, the pulse-amplitude modulation symbol sequence $D_m$, denoted by 231, and the logical precoded subsequence $Z_m$, denoted by 242, are input to a selective inverter 244, which yields the duobinary precoded pulse-amplitude modulation symbol sequence $B_m$, denoted by 233. During each symbol interval, $B_m=D_m$ if $Z_m$ takes on a logical 1, and $B_m=-D_m$ if $Z_m$ takes on a logical 0. We observe that since the sequence $D_m$ (231) takes on non-negative levels, the sequence $D_m$ (231) is the magnitude of the sequence $B_m$ (233) and the sequence $Z_m$ (242) provides a logical indication of the sign of the sequence $B_m$ (233). These observations will help explain the design of an alternate embodiment of the encoder, which is described below. In the encoder 229a, the sequence $B_m$ (233) is input to the lowpass filter 235, whose output is the signal s(t) (236). Although in the embodiment of the encoder 229a we show the lowpass filter 235 as a separate component, the lowpass filter may not be present as a separate component, and the lowpass filtering function may be performed by one or more other components in the duobinary M-ary pulse-amplitude modulation signal encoder or in the modulation subsystem that follows it.

Figure 5C:
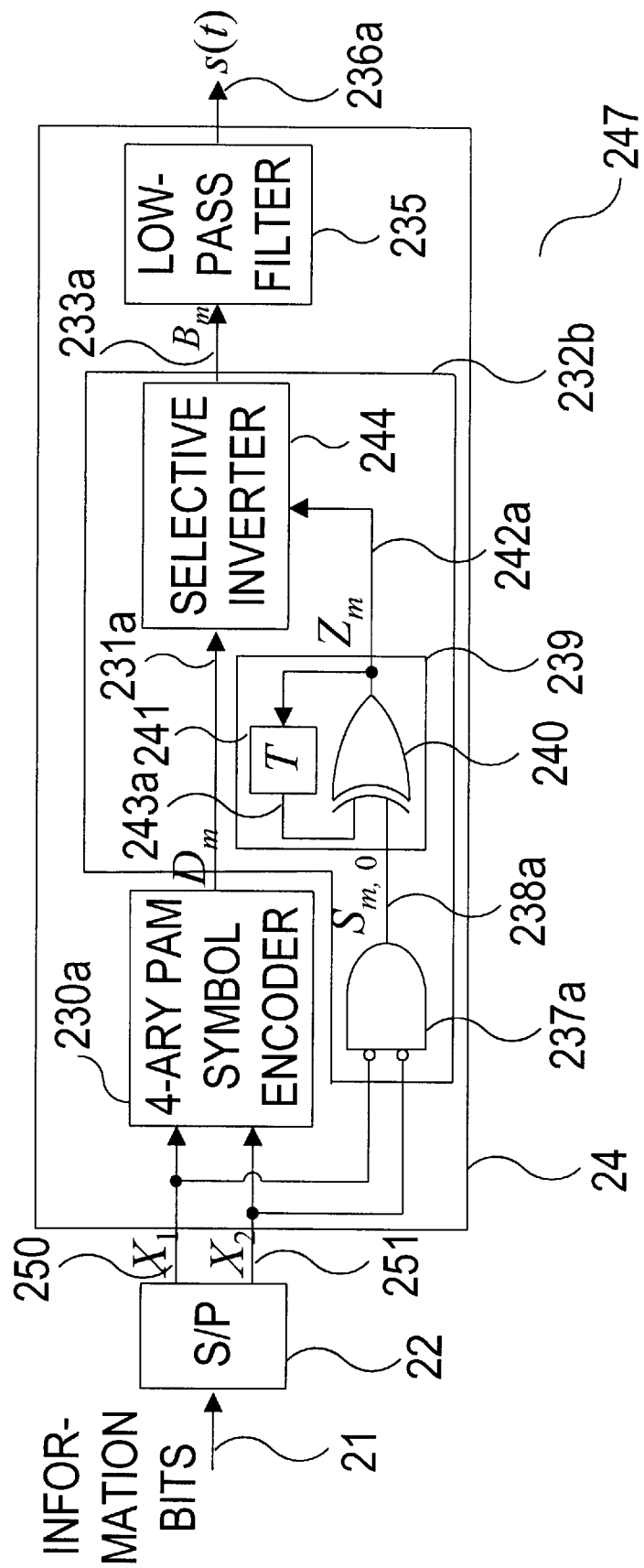

We now provide an example of a specific embodiment of the duobinary M-ary pulse-amplitude modulation signal encoder 229 for the specific case of M=4, assuming a specific mapping between information bits and 4-ary pulse-amplitude modulation symbols. This embodiment of a duobinary 4-ary pulse-amplitude modulation signal encoder is shown in FIG. 5c, and is given a general reference number 247. Information bits 21 to be transmitted, if in serial form, are passed to the serial-to-parallel converter 22, which forms parallel blocks of 2 bits $X_1$ and $X_2$, denoted by 250 and 251, respectively. Alternatively, if information bits are already in the form of parallel blocks of 2 bits, the serial-to-parallel coverter 22 may be omitted. Blocks of 2 information bits 250 and 251 are input to the pulse-amplitude modulation signal encoder 24, which corresponds to 24 in FIG. 2. Within 24, the blocks of 2 information bits 250 and 251 enter a 4-ary pulse-amplitude modulation symbol encoder 230a, which encodes each block of 2 information bits 250 and 251 into a 4-ary pulse-amplitude modulation symbol sequence $D_m$, denoted by 231a. The encoding implemented by the encoder 230a is specified in a table 1, below. For our present purposes, we observe that $D^{(0)}=0$ and that $D^{(0)}<D^{(1)}<D^{(2)}<D^{(3)}$, so that this encoding implements Gray coding. Recall that the logical subsequence $S_{m,0}$ (238) takes on a logical 1 when $D_m=D^{(20)}$, and takes on a logical 0 otherwise. Similarly, the logical subsequences $S_{m,0}$ (238a) takes on a logical 1 when $D_m=D^{(0)}$, and takes on a logical 0 otherwise. As indicated in the table 1, for the particular encoding implemented by the encoder 230a, the logical subsequence $S_{m,0}$ (238a) takes on the values $S_{m,0}=1$ when $(X_1,X_2)=(0,0)$ and $S_{m,0}=0$ otherwise.

TABLE 1

| $X_1$ | $X_2$ | $D_m$ | $S_{m,0}$ |
|---|---|---|---|
| 0 | 0 | $D^{(0)} = 0.00$ | 1 |
| 0 | 1 | $D^{(1)} = 1.18$ | 0 |
| 1 | 1 | $D^{(2)} = 1.82$ | 0 |
| 1 | 0 | $D^{(3)} = 3.00$ | 0 |

Figure 3B:
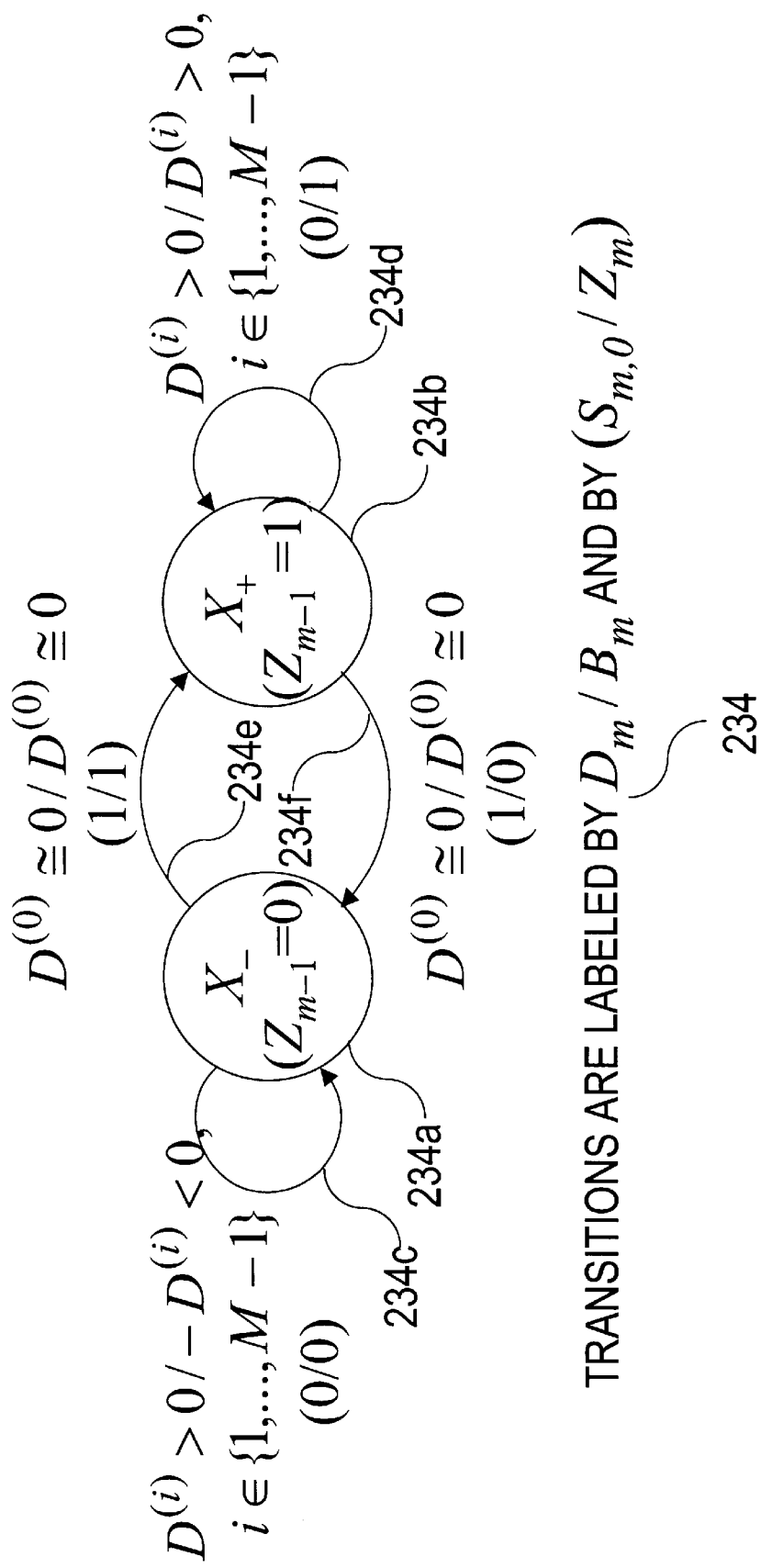
FIG. 3b is a state transition diagram describing the duobinary precoded pulse-amplitude modulation symbol sequence under the present invention.

In the encoder 247, the 4-ary pulse-amplitude modulation symbol sequence $D_m$, denoted by 231a, is input to a finite-machine, denoted by 232b. The blocks of 2 information bits 250 and 251 are also input to 232b. Within 232b, 250 and 251 are input to a subsequence decomposer 237a, which is implemented using an AND gate with inverters on the inputs. The output of 237a is the logical subsequence $S_{m,0}$, which is denoted by 238a. The logical subsequence 238a is input to a logical subsequence precoder, which is denoted by 239. The precoder 239 includes the exclusive-OR gate (modulo-2 subtractor), denoted by 240, as well as the one-symbol delay, denoted by 241, interconnected in a feedback arrangement. The output of the logical subsequence precoder 239 is a logical precoded subsequence $Z_m$, denoted by 242a. The logical precoded subsequence 242a is related to the logical subsequence 238a by the rule that, during the mth symbol interval, $Z_m = S_{m,0} - Z_{m-1}$ (mod2), where $Z_{m-1}$ (243a) is the value of $Z_m$ (242a) during the previous symbol interval, m−1. The precoder 239 is itself a finite-state machine with input $S_{m,0}$ (238a), output $Z_m$ (242a), and two states, corresponding to the two possible values of $Z_{m-1}$ (243a), and is described by the state-transition diagram 234, which is shown in FIG. 3b. In order to describe the precoder 239, the state-transition diagram 234 should be interpreted using the labels given in parentheses. While we have described here an implementation of the precoder 239 based on the exclusive-OR gate 240, it is possible to implement equivalent precoders using other logical gates to perform the function of "comparing" 243a to 238a. The 4-ary pulse-amplitude modulation symbol sequence $D_m$, denoted by 231a, and the logical precoded subsequence $Z_m$, denoted by 242a, are input to the selective inverter 244, which yields at its output a duobinary precoded pulse-amplitude modulation symbol sequence $B_m$, denoted by 233a. During each symbol interval, $B_m = D_m$ if $Z_m$ takes on a logical 1, and $B_m = D_m$ if $Z_m$ takes on a logical 0. The sequence 233a passes into a lowpass filter 235, whose output is a duobinary precoded pulse-amplitude modulation signal s(t), denoted by 236a. Note that 236a corresponds to in FIG. 2. Although in the embodiment 247 we show the lowpass filter 235 as a separate component, the lowpass filter may not be present as a separate component, and the lowpass filtering function may be performed by one or more other components in the duobinary M-ary pulse-amplitude modulation signal encoder or in the modulation subsystem that follows it.

We will now describe the transfer characteristics of typical embodiments of the modulation subsystem 26.

FIGS. 6a, 6b, 6c and 6d are block diagrams of embodiments of subsystems for modulating the signal 236, 236a onto the optical carrier electric field 29 to produce the transmitted optical electric field 34.

Figure 6A:
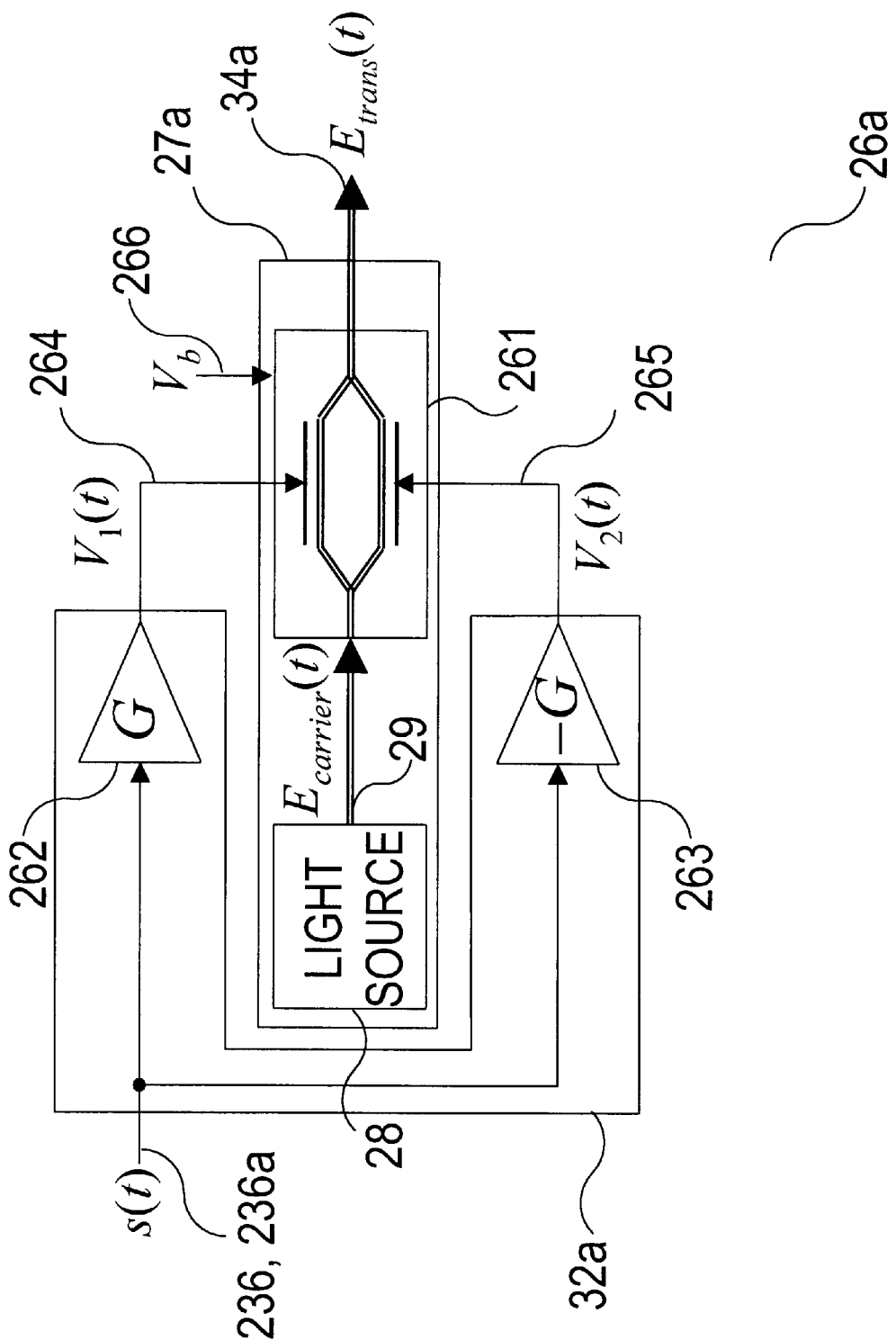
FIGS. 6a, 6b, 6c and 6d are block diagrams of first, second, third and fourth embodiments of modulation subsystems for modulating an electrical signal from the encoders of FIGS. 5a–c onto an optical electric field for the present invention.

FIG. 6a is a modulation subsystem that uses an unmodulated laser, or other light source, and a dual-drive, push-pull, Mach-Zehnder interferometric intensity modulator, and is given a general reference number 26a. The modulation subsystem 26a includes an optical signal generator 27a and the signal generator driver 32a. Within 27a, a laser or other light source, designated by 28, generates an unmodulated optical carrier described by the optical carrier electric field $E_{carrier}(t)$, denoted by 29. The optical carrier electric field 29 is passed into a dual-drive, push-pull, Mach-Zehnder interferometric intensity modulator 261. Within 32a, the signal 236, 236a is passed to a driver amplifier 262, which has gain G, as well as a driver amplifier 263, which has gain−G. The outputs of 262 and 263 are complementary modulator drive signals $V_1(t) = Gs(t)$ and $V_2(t) = -Gs(t)$, which are denoted by 264 and 265, respectively. The drive signals 264 and 265 are input to the modulator 261. Note that 264 and 265 correspond to 33 in FIG. 2. The output of the modulator 261 is a transmitted optical electric field $E_{trans}(t)$, denoted by 34a. The modulator 261 is biased by a d.c. bias $V_b$, denoted by 266, which is chosen so that the transmitted optical electric field 34a is approximately zero when the signals $V_1(t)$ and $V_2(t)$ are zero.

Figure 6B:
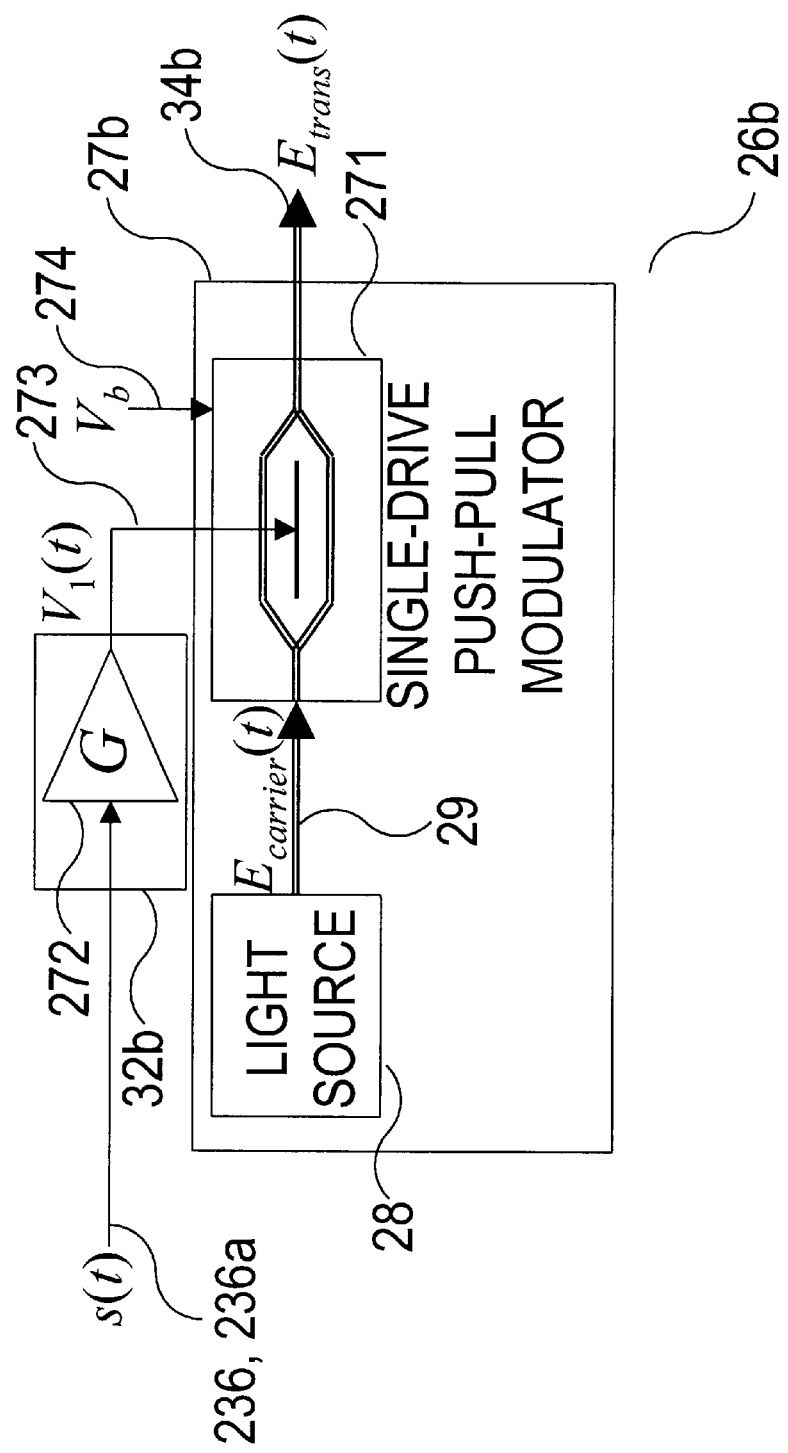

FIG. 6b is a modulation subsystem that uses an unmodulated laser, or other light source, and a single-drive, push-pull, Mach-Zehnder interferometric intensity modulator, and is given a general reference number 26b. The modulation subsystem 26b includes an optical signal generator 27b and a signal generator driver 32b. Within 27b, a laser or other light source, designated 28, generates an unmodulated optical carrier described by the optical carrier electric field $E_{carrier}(t)$, denoted by 29. The optical carrier electric field 29 is passed into a single-drive, push-pull, Mach-Zehnder interferometric intensity modulator 271. Within 32b, the signal 236, 236a is passed into a driver amplifier 272, which has gain G. The output of 272 is a modulator drive signal $V_1(t) = Gs(t)$, which is denoted by 273, and which is input to the modulator 271. Note that 273 corresponds to 33 in FIG. 2. The output of the modulator 271 is a transmitted optical electric field $E_{trans}(t)$, denoted by 34b. The modulator 271 is biased by a d.c. bias $V_b$, denoted by 274, which is chosen so that the transmitted optical electric field 34b is approximately zero when the signal $V_1(t)$ is zero.

Figure 6C:
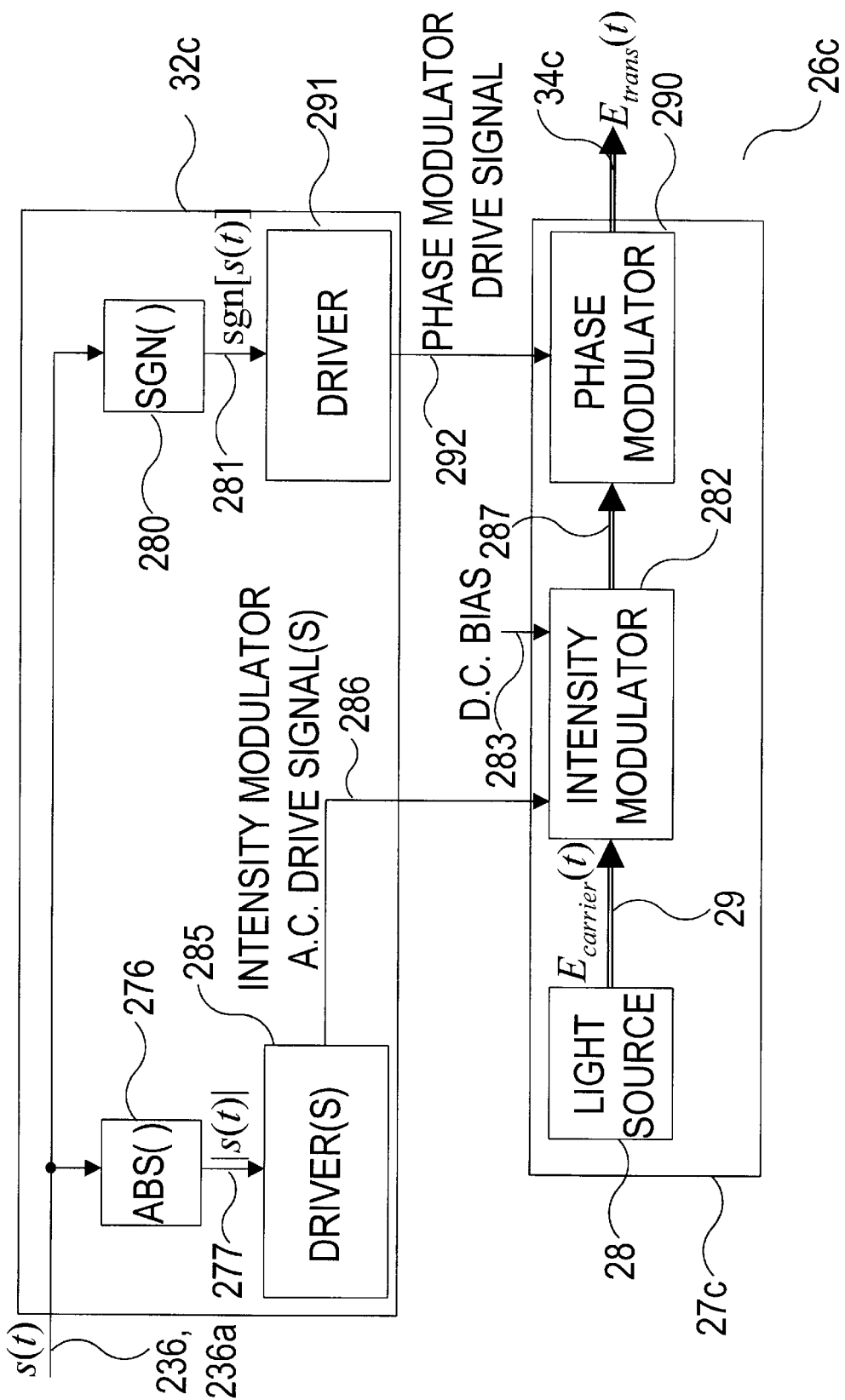

FIG. 6c is a modulation subsystem that uses an unmodulated laser, or other light source, an intensity modulator, and a phase modulator, and is given a general reference number 26c. The modulation subsystem 26c includes an optical signal generator 27c and the signal generator driver 32c. Within 32c, the signal s(t), denoted by 236, 236a is passed into a magnitude computing device 276, whose output 277 is proportional to |s(t)|, the magnitude of s(t). Within 32c, the signal 236, 236a is also fed into a sign computing device 280, whose output 281 is representative of sgn[s(t)], the sign of s(t). Within 27c, a laser or other light source, designated 28, generates an unmodulated optical carrier described by the optical carrier electric field $E_{carrier}(t)$, denoted by 29. The optical carrier electric field 29 is passed into an intensity modulator 282, which may be an interferometric intensity modulator, an electroabsorption intensity modulator, or may be of some other design. The intensity modulator 282 is biased by a suitable intensity modulator d.c. bias 283. Within 32c, the signal |s(t)|, denoted by 277, is passed into an intensity modulator driver 285, which generates one or more intensity modulator a.c. drive signal(s), denoted by 286. The drive signal(s) 286 drive(s) the intensity modulator 282, causing 282 to modulate 277 onto the optical carrier electric field 29, resulting in a modulated optical signal 287 at the output of 282. The modulated optical signal 287 is passed into a phase modulator 290. Within 32c, the signal sgn[s(t)], denoted by 281, is passed into a phase modulator driver 291, which generates a phase modulator drive signal 292. The drive signal 292 drives the phase modulator 290, causing 290 to modulate the sign of 287 by sgn[s(t)], denoted by 281, by selectively introducing phase shifts of π. Note that 286 and 292 correspond to 33 in FIG. 2. The output of the phase modulator 290 is the transmitted optical electric field $E_{trans}$(t), denoted by 34c.

Figure 6D:
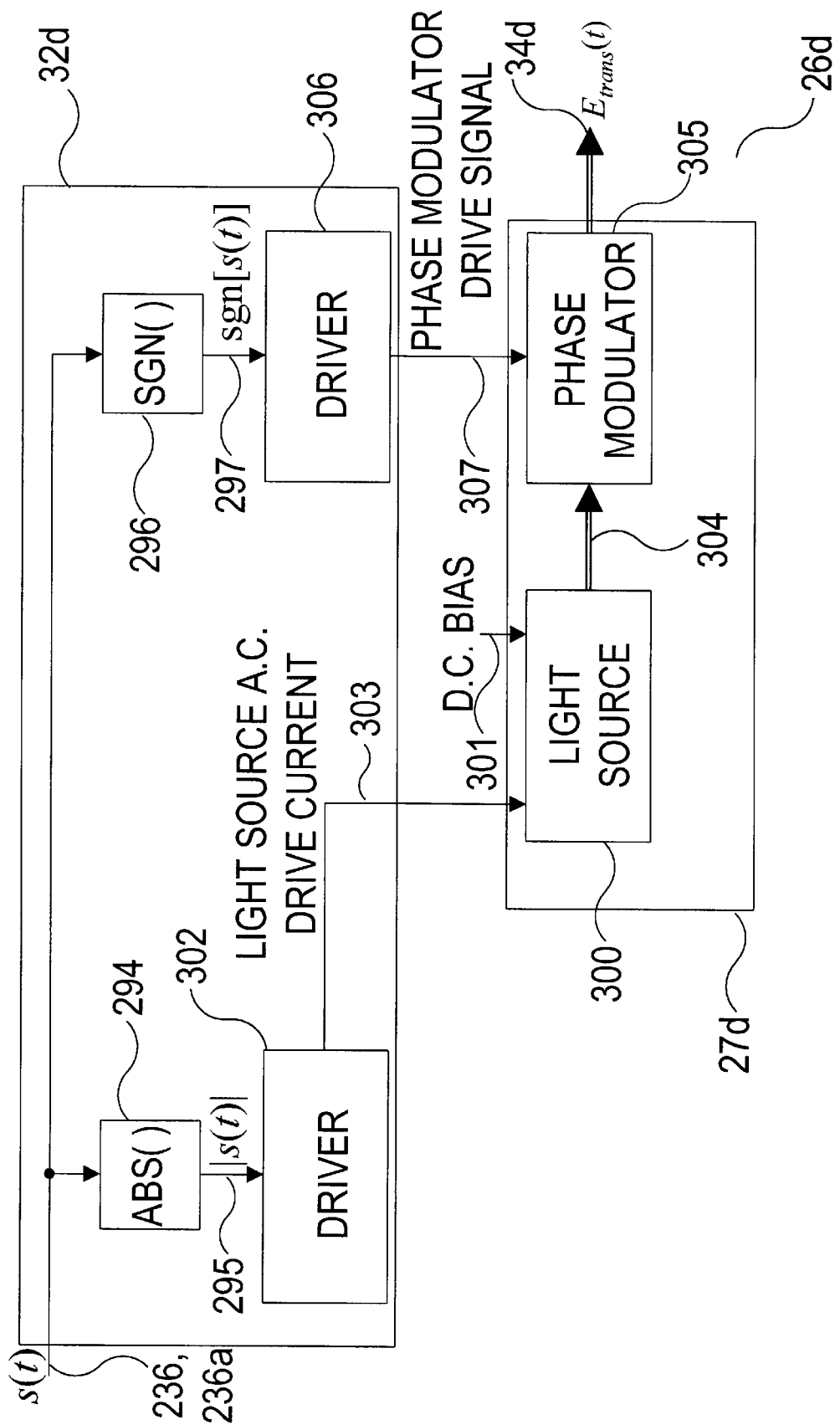

FIG. 6d is a modulation subsystem that uses a directly modulated laser, or other light source, an intensity modulator, and a phase modulator, and is given a general reference number 26d. The modulation subsystem 26d includes an optical signal generator 27d and a signal generator driver 32d. Within 32d, the signal s(t), denoted by 236, 236a is passed into a magnitude computing device 294, whose output 295 is proportional to |s(t)|, the magnitude of s(t). Within 32d, the signal 236, 236a is also fed into a sign computing device 296, whose output 297 is representative of sgn[s(t)], the sign of s(t). Within 27d, a laser, or other light source, designated 300, is biased by a suitable d.c. bias current 301. Within 32d, the signal |s(t)|, denoted by 295, is passed into a light source driver 302, which generates a light source a.c. drive current, denoted by 303. The drive current 303 drives 300, causing 300 to emit a modulated optical signal 304, whose amplitude is modulated by |s(t)|, denoted by 295. The modulated optical signal 304 is passed into a phase modulator 305. Within 32d, the signal sgn[s(t)], denoted by 297, is passed into a phase modulator driver 306, which generates a phase modulator drive signal 307. The drive signal 307 drives the phase modulator 305, causing 305 to modulate the sign of 304 by sgn[s(t)], denoted by 297, by selectively introducing phase shifts of π. Note that 303 and 307 correspond to 33 in FIG. 2. The output of the phase modulator 305 is a transmitted optical electric field $E_{trans}$(t), denoted by 34d.

FIGS. 7a–7h are the input-output transfer characteristics of optical modulators used in embodiments of the present invention.

Figure 7A:
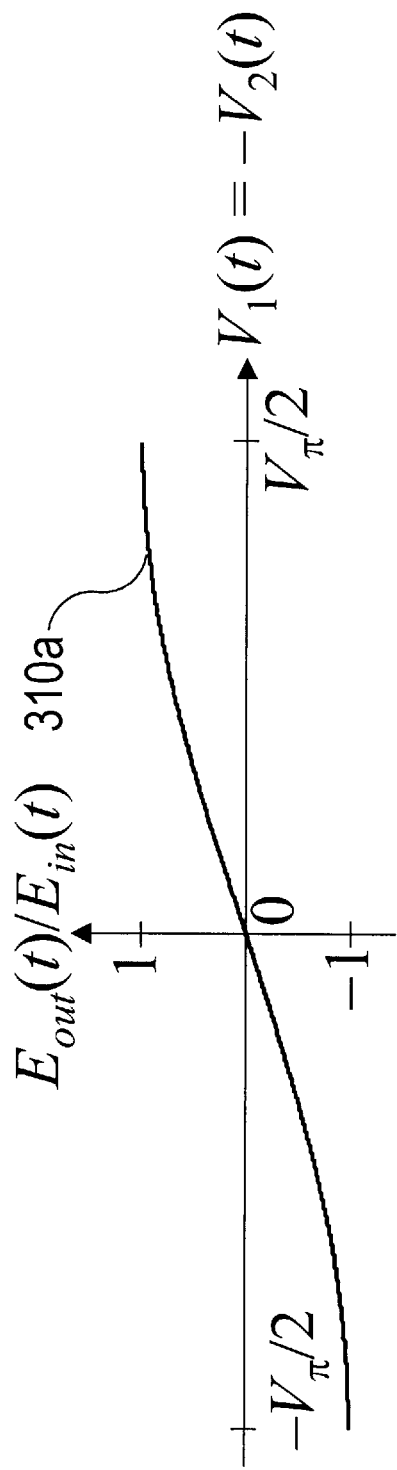
FIGS. 7a–7h are input-output transfer characteristics of optical modulators for providing the optical electric field for the present invention.
Figure 7B:
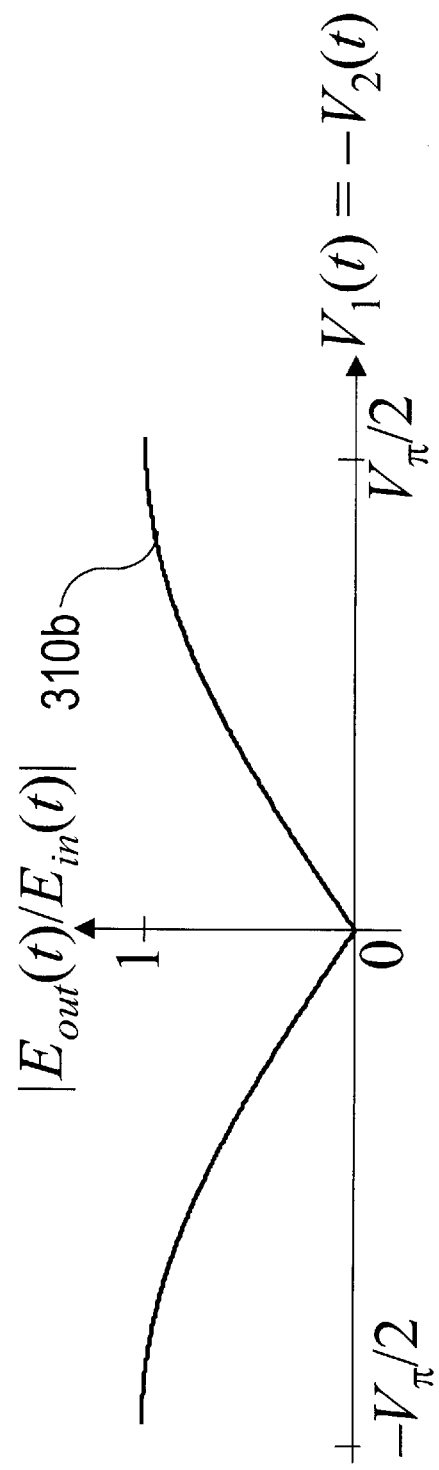
Figure 7C:
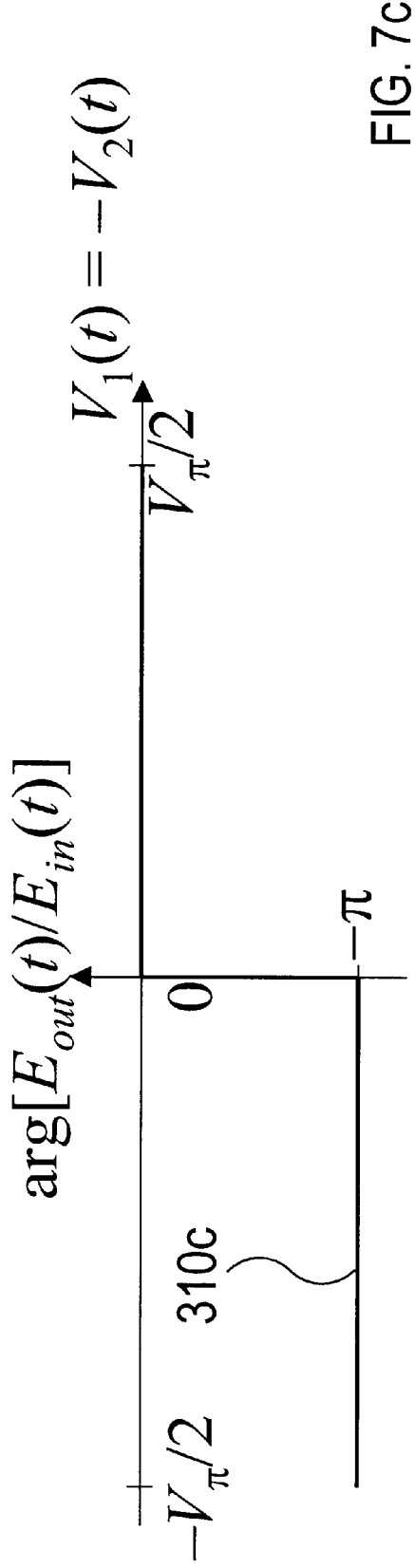

FIGS. 7a–7c present the input-output transfer characteristic of a dual-drive, push-pull, Mach-Zehnder interferometric intensity modulator, such as 261 in FIG. 6a. In FIGS. 7a–7c, $E_{in}$(t) and $E_{out}$(t) denote the optical electric fields at the modulator input and output, respectively, which correspond to 29 and 34a, respectively, in FIG. 6a. The transfer characteristic in FIGS. 7a–7c assumes that, as in the subsystem of FIG. 6a, the modulator is driven by complementary drive signals $V_1$(t) and $V_2$(t)=−$V_1$(t), and is biased by a d.c. bias $V_b$ such that $E_{out}$(t) is approximately zero when $V_1$(t) and $V_2$(t) are zero. Ignoring the modulator insertion loss and a constant phase shift of the output electric field, the transfer characteristic of FIGS. 7a–7c is described by:

$$\frac{E_{out}(t)}{E_{in}(t)} = \sin\left(\pi \frac{V_1(t)}{V_\pi}\right),$$

where $V_\pi$ is the drive voltage required to cause a phase shift of π. In FIG. 7a, the modulator transfer characteristic is shown by a graph line 310a. The graph line 310a shows that $E_{out}$(t) is modulated by positive values when $V_1$(t) is positive, and by negative values when $V_1$(t) is negative, provided that $V_1$(t) lies within the range [−$V_\pi$/2, $V_\pi$/2]. In FIG. 7b, a graph line 310b shows the magnitude of the modulator transfer characteristic. In FIG. 7c, a graph line 310c shows the phase of the modulator transfer characteristic. Examining the graph line 310c, we see that $E_{out}$(t) is subject to a phase shift of 0 when $V_1$(t) is positive, and is subject to a phase shift of −π (which is equivalent to a phase shift of π) when $V_1$(t) is negative, provided that $V_1$(t) lies within the range [−$V_\pi$/2, $V_\pi$/2].

Figure 7D:
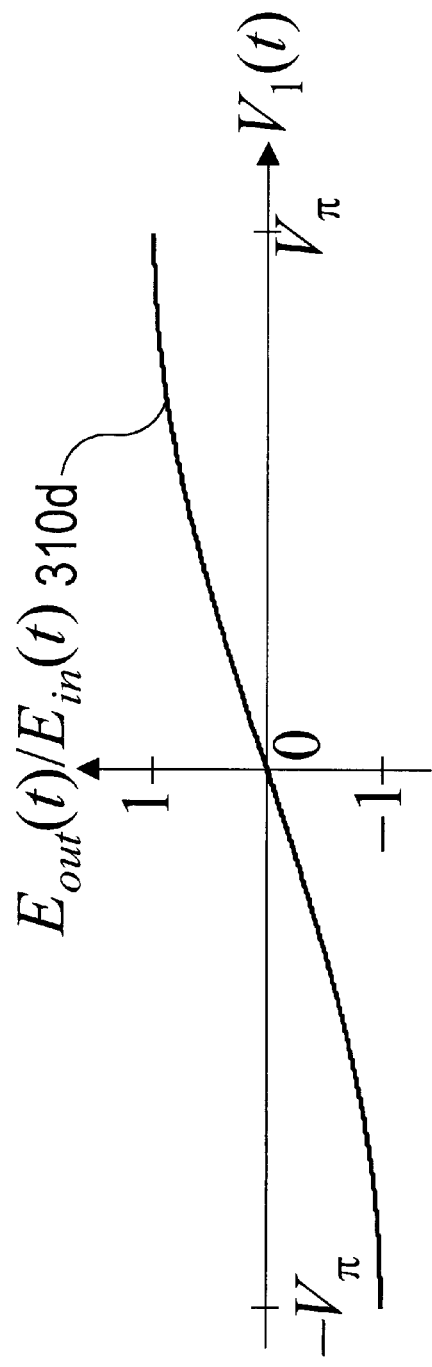
Figure 7E:
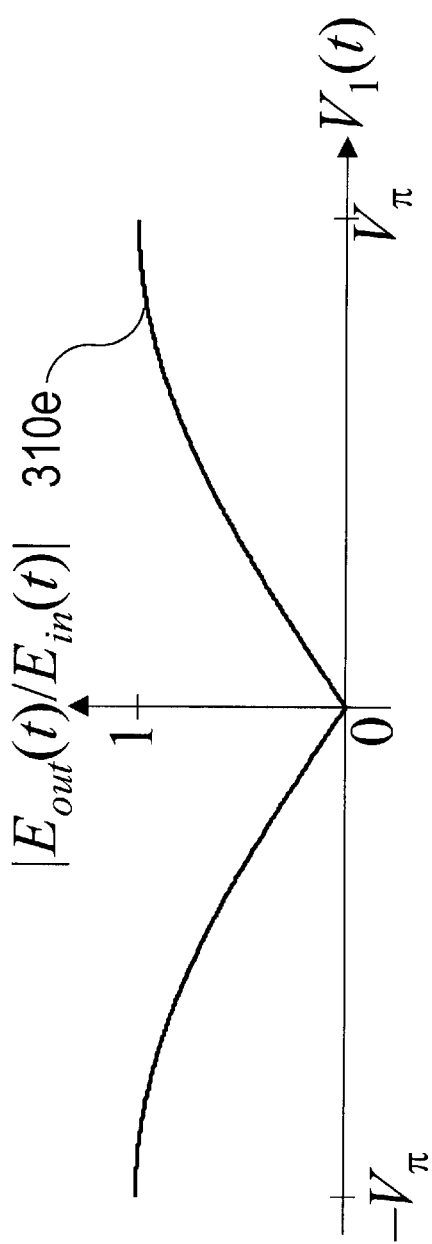
Figure 7F:
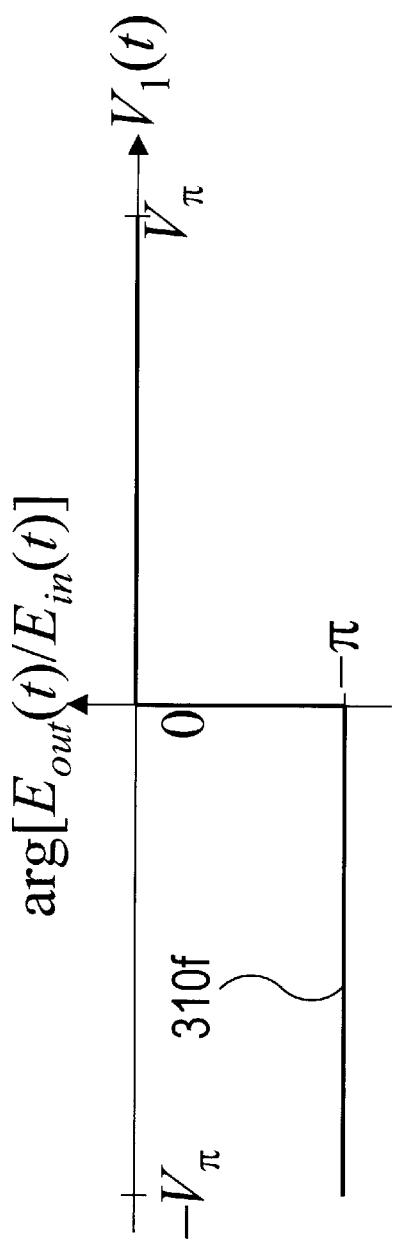

FIGS. 7d–7f present the input-output transfer characteristic of a single-drive, push-pull, Mach-Zehnder interferometric intensity modulator, such as 271 in FIG. 6b. In FIGS. 7d–7f, $E_{in}$(t) and $E_{out}$(t) denote the optical electric fields at the modulator input and output, respectively, which correspond to 29 and 34b, respectively, in FIG. 6b. The transfer characteristic in FIGS. 7d–7f assumes that, as in the subsystem of FIG. 6b, the modulator is driven by the drive signal $V_1$(t), and is biased by a d.c. bias $V_b$ such that $E_{out}$(t) is approximately zero when $V_1$(t) is zero. Ignoring the modulator insertion loss and a constant phase shift of the output electric field, the transfer characteristic of FIGS. 7d–7f is described by:

$$\frac{E_{out}(t)}{E_{in}(t)} = \sin\left(\pi \frac{V_1(t)}{2V_\pi}\right),$$

where $V_\pi$ is the drive voltage required to cause a phase shift of π. In FIG. 7d, the modulator transfer characteristic is shown by a graph line 310d, which shows that $E_{out}$(t) is modulated by positive values when $V_1$(t) is positive, and by negative values when $V_1$(t) is negative, provided that $V_1$(t) lies within the range [−$V_\pi$, $V_\pi$]. In FIG. 7e, a graph line 310e shows the magnitude of the modulator transfer characteristic. In FIG. 7f, a graph line 310f shows the phase of the modulator transfer characteristic. Examining the graph line 310f, we see that $E_{out}$(t) is subject to a phase shift of 0 when $V_1$(t) is positive, and is subject to a phase shift of −π (which is equivalent to a phase shift of π) when $V_1$(t) is negative, provided that $V_1$(t) lies within the range [−$V_\pi$, $V_\pi$].

Figure 7G:
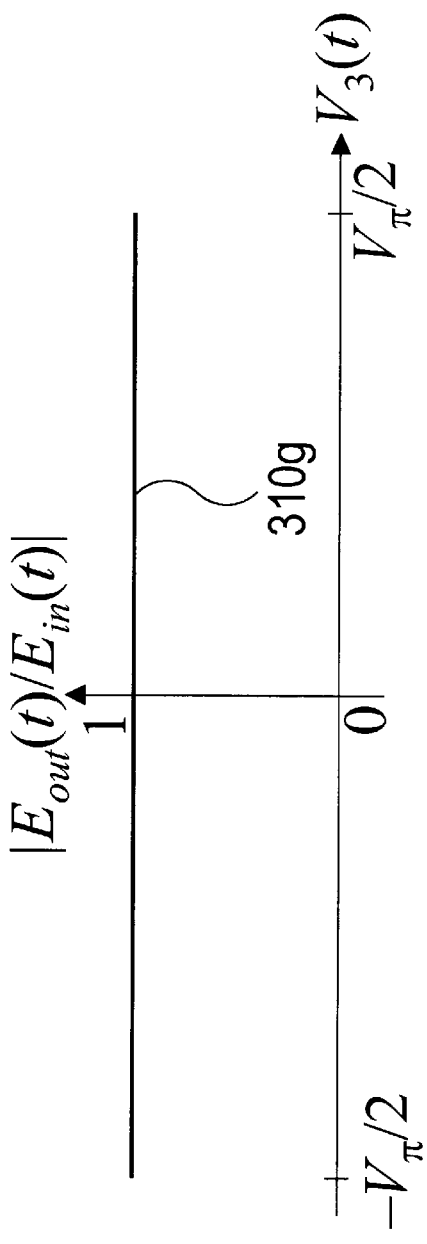
Figure 7H:
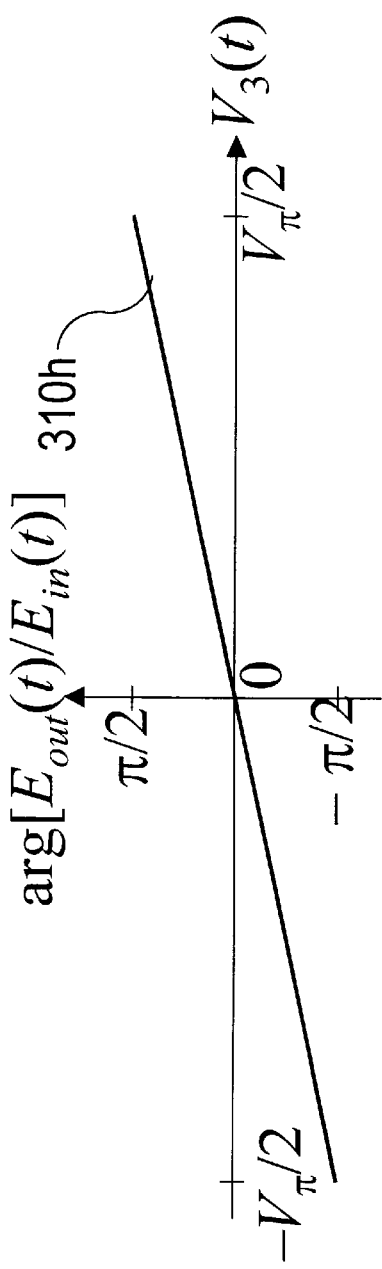

FIGS. 7g–7h present the input-output transfer characteristic of a phase modulator, such as 290 in FIG. 6c or 305 in FIG. 6d. In FIGS. 7g–7h, $E_{in}$(t) denotes the optical electric field at the modulator input, which corresponds to 287 in FIG. 6c and 304 in FIG. 6d. $E_{out}$(t) denotes the optical electric field at the modulator output, which corresponds to 34c in FIG. 6c and 34d in FIG. 6d. Ignoring the modulator insertion loss, the transfer characteristic of FIGS. 7g–7h is described by:

$$\frac{E_{out}(t)}{E_{in}(t)} = e^{j\pi \frac{V_3(t)}{V_\pi}},$$

where $V_\pi$ is the drive voltage required to cause a phase shift of π. The drive voltage $V_3$(t) corresponds to 292 in FIG. 6c or 307 in FIG. 6d. In FIG. 7g, a graph line 310g is the magnitude of the phase modulator transfer characteristic, which shows that the phase modulator does not modulate the magnitude of the optical electric field. In FIG. 7h, a graph line 310h is the phase of the phase modulator transfer characteristic, which shows that $E_{out}$(t) is subject to a phase shift that is linearly proportional to $V_3$(t). In particular, a step change of $V_\pi$ in $V_3$(t) induces a π phase shift in $E_{out}$(t), i.e., changes the sign of $E_{out}$(t).

In order to illustrate the operation of the present invention, we consider the example of a preferred embodiment that uses the encoder 247, which is shown in FIG. 5c, in conjunction with the modulation subsystem 26a, which is based on a dual-drive, push-pull, Mach-Zehnder interferometric intensity modulator, and is shown in FIG. 6a. This embodiment can use any of the three receiver embodiments that are shown in FIGS. 4a, 4b and 4c, including the direct-detection receiver 20a, the asynchronous homodyne receiver 20b, or the asynchronous heterodyne receiver 20c. The design of the encoder 247 has been described in detail above. Recall that the encoder 247 is designed assuming k=2 and M=$2^k$=4. Recall also that the encoder 247 implements the mapping between blocks of 2 information bits ($X_1$, $X_2$)

and 4-ary pulse-amplitude modulation symbols $D_m$ that is shown in the table 1, above.

The duobinary precoded pulse-amplitude modulation symbol sequence $B_m$, denoted by 233a, takes on the $2M-1=7$ levels indicated in a table 2, below. We assume that in the modulation subsystem 26a, the driver amplifiers 262 and 263 have gains G and −G, respectively, where $G=V_\pi/6$, so that the signal $V_1(t)$, denoted by 264, takes on the levels shown in the table 2. We assume that the transmitted optical electric field $E_{trans}(t)$, denoted by 34a, has a peak value of $\sqrt{3}$, corresponding to a peak intensity of 3, so that the transmitted optical electric field 34a takes on the levels shown in the table 2. Finally, we assume that the receiver, whether it be 20a, 20b, or 20c, has gain such that the signal v(t), denoted by 43, has a peak value of 3, so that the signal 43 takes on the levels shown in the table 2. In order to simplify this example, we have assumed that the signal v(t) (43) is subject to negligible noise and/or intersymbol interference.

TABLE 2

| $B_m$ | $V_1(t)$ | $E_{trans}(t)$ | v(t) |
|---|---|---|---|
| −3.00 | −0.50 $V_\pi$ | −$\sqrt{3}$ | 3 |
| −1.82 | −0.30 $V_\pi$ | −$\sqrt{2}$ | 2 |
| −1.18 | −0.20 $V_\pi$ | −1 | 1 |
| 0 | 0 | 0 | 0 |
| 1.18 | 0.20 $V_\pi$ | 1 | 1 |
| 1.82 | 0.30 $V_\pi$ | $\sqrt{2}$ | 2 |
| 3.00 | 0.50 $V_\pi$ | $\sqrt{3}$ | 3 |

Figure 8A:
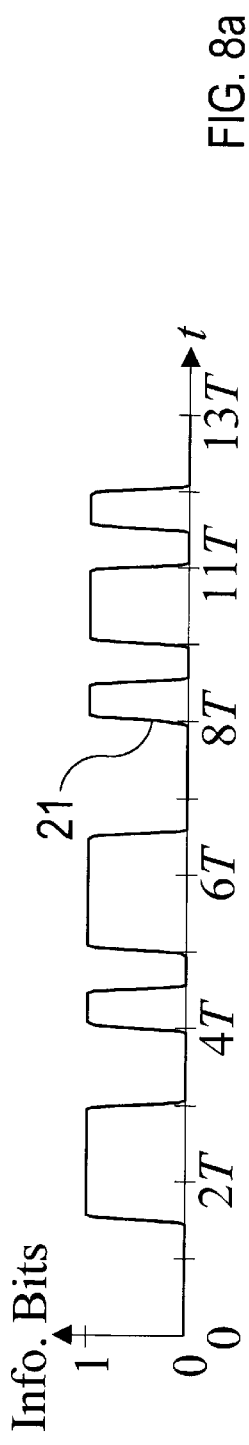
Figure 8B:
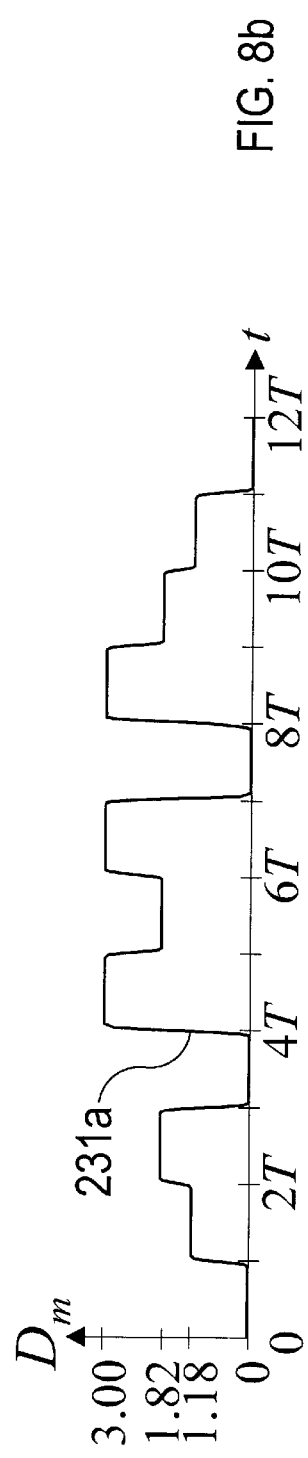
Figure 8C:
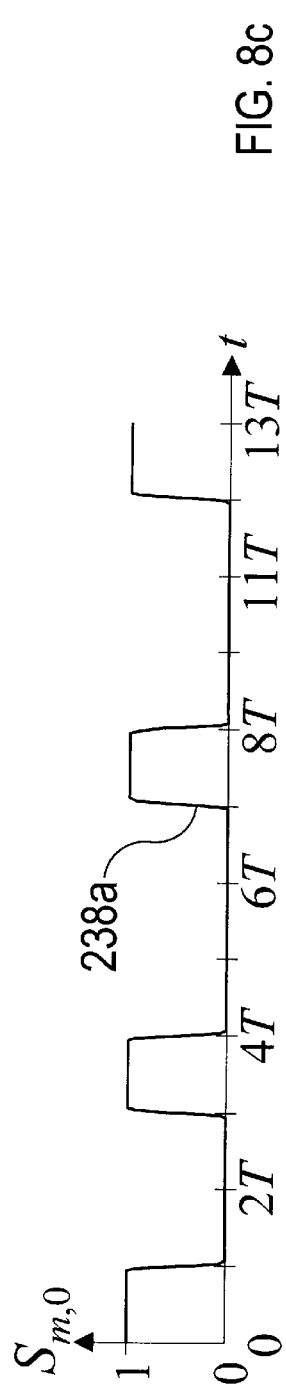
Figure 8G:
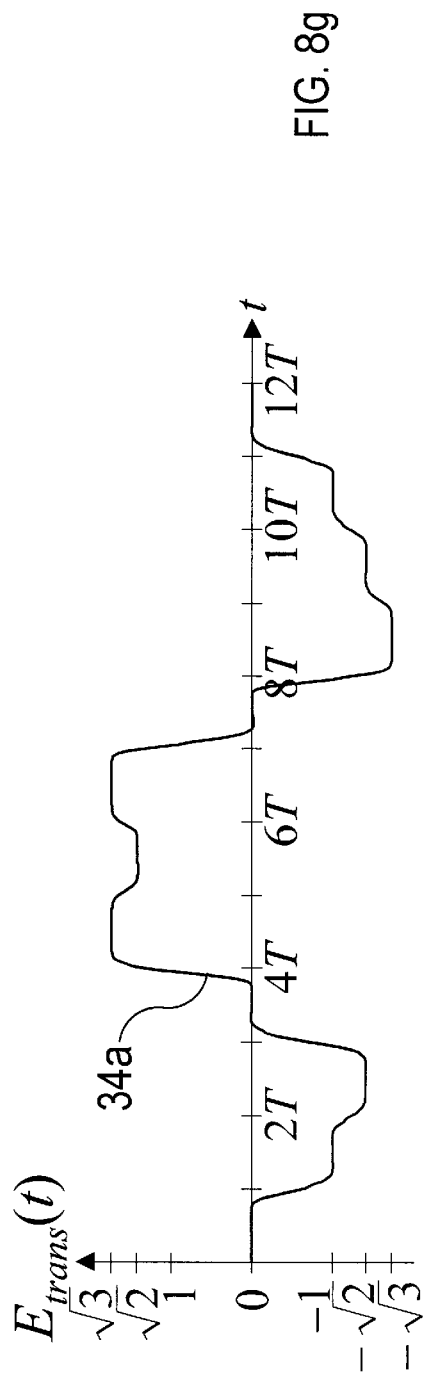
Figure 8H:
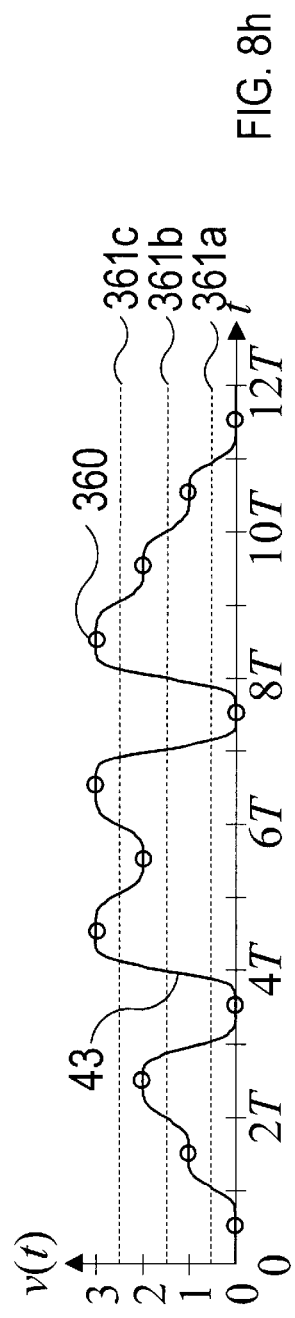
Figure 8I:
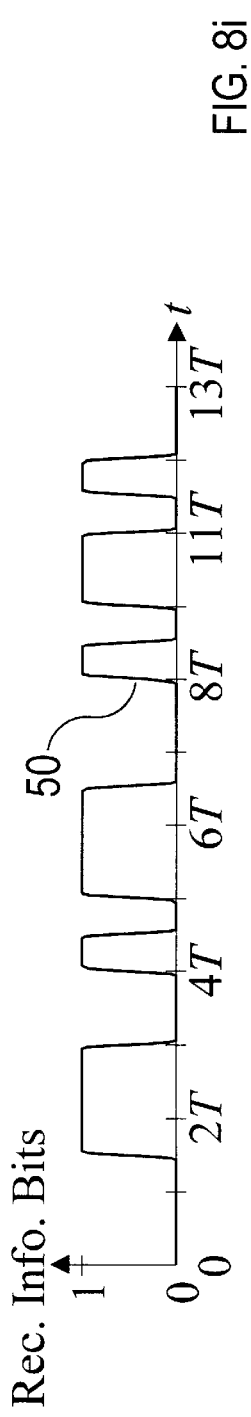

FIGS. 8a–8i display waveforms of electrical and optical signals for an exemplary sequence for the information bits 21. In these figures, the time axis is measured in units of the symbol interval T. In FIG. 8a, 21 denotes the exemplary sequence of information bits to be conveyed. Note that since k=2 in this example, the duration of each information bit is T/2. In FIG. 8b, shows the 4-ary pulse-amplitude modulation symbol sequence $D_m$ 231a corresponding to the information bit sequence 21 in FIG. 8a. In FIG. 8c, 238a denotes the logical subsequence $S_{m,0}$. In FIG. 8d, 242a denotes the logical precoded subsequence $Z_m$. In FIG. 8e, 233a denotes the duobinary precoded pulse-amplitude modulation symbol sequence $B_m$. In FIG. 8f, 264 denotes the intensity modulator drive signal $V_1(t)$. In FIG. 8g, 34a denotes the transmitted optical electric field $E_{trans}(t)$. In FIG. 8h, 43 denotes the 4-ary pulse-amplitude modulation signal v(t) at the receiver, whether the receiver embodiment is 20a, 20b, or 20c. Comparing FIG. 8h and FIG. 8b, we see that, during a sequence of symbol intervals, the sequence of levels taken on by the 4-ary pulse-amplitude modulation signal v(t), denoted by 43, are in a one-to-one correspondence with the sequence of levels taken on by the transmitted 4-ary pulse-amplitude modulation symbol sequence $D_m$, denoted by 231a. Specifically, 43 takes on the values 0, 1, 2, 3 when 231a takes on the values 0, 1.18, 1.82, 3.00, respectively. This implies that it should be possible for a receiver to perform 4-ary symbol-by-symbol decisions on 43 to recover the transmitted information bits that were encoded in 231a, without the potential for error propagation. In the receiver 20a, 20b, or 20c, the 4-ary pulse-amplitude modulation decision device 44 samples v(t), denoted by 43, at approximately the midpoint of each symbol interval and compares each sample to a set of 3 thresholds to make symbol-by-symbol 4-ary decisions. In FIG. 8h, circles 360 denote these samples, while dashed lines 361a, 361b and 361c denote the 3 thresholds employed by the decision device 44. In FIG. 8i, 50 denotes the recovered information bits at the receiver corresponding to the information bit sequence 21 at the transmitter.

We consider another example of a preferred embodiment of the present invention, which uses the encoder 247, which is shown in FIG. 5c, in conjunction with the modulation subsystem 26b, which is based on a single-drive, push-pull, Mach-Zehnder interferometric intensity modulator, and is shown in FIG. 6b. As in the previous example, this embodiment can use any of the three receiver embodiments that are shown in FIGS. 4a, 4b and 4c, including the direct-detection receiver 20a, the asynchronous homodyne receiver 20b, or the asynchronous heterodyne receiver 20c. We assume that the encoder 247 operates precisely as in the previous example. In this example, we assume that in the modulation subsystem 26b, the driver amplifier 272 has gain $G=V_\pi/3$ (twice the value in the previous example), and that the transmitted optical electric field $E_{trans}(t)$, denoted by 34b, has a peak value of $\sqrt{3}$ (as in the previous embodiment). Finally, we assume that the receiver, whether it be 20a, 20b, or 20c, has gain such that the signal v(t), denoted by 43, has a peak value of 3, as in the previous example. In the present embodiment, all of the electrical and optical signal waveforms are identical to those shown in FIGS. 8a–8i, except that in the present embodiment, values of the signal $V_1(t)$, denoted by 273 in FIG. 6b, are twice as large as those indicated by 264 in FIG. 8f. That is to say, in this embodiment, $V_1(t)$ takes on values between −$V_\pi$ and $V_\pi$.

We will now discuss three alternate embodiments of duobinary M-ary pulse-amplitude modulation signal encoders of the present invention. In order to explain these three alternate embodiments, it is useful to recall some aspects of the embodiments 229, 229a and 247. Embodiments 229 and 229a are applicable for arbitrary $M \geq 2$, whereas embodiment 247 is applicable for M=4, and assumes a specific mapping between pairs of information bits and 4-ary pulse-amplitude modulation symbols. In each of the embodiments 229, 229a and 247, the sequence $D_m$ (denoted by 231, 231 and 231a, respectively, in the three embodiments) is input to the finite-state machine (232, 232a, 232b), which outputs the sequence $B_m$ (233, 233, 233a). The sequence $B_m$ (233, 233, 233a) is related to the sequence $D_m$ (231, 231 and 231a) according to the state-transition diagram 234. The sequence $B_m$ (233, 233, 233a) has the same sign as the sequence $D_m$ (231, 231 and 231a), while the sign of $B_m$ (233, 233, 233a) flips according to 234. In each of the embodiments 229, 229a and 247, the sequence $B_m$ (233, 233, 233a) is lowpass filtered to yield the signal s(t) (236, 236, 236a). Each of the embodiments 229, 229a and 247 can be used with any of the modulation subsystem embodiments 26a, 26b, 26c or 26d. Each of the modulation subsystem embodiments 26a, 26b, 26c, 26d accepts as its input the signal s(t) (236, 236, 236a).

The three alternate encoder embodiments we will now discuss are similar in many respects to embodiments 229, 229a and 247, respectively. The first two of these embodiments (362, FIG. 9a and 362a, FIG. 9b) are applicable for arbitrary $M \geq 2$, and the third embodiment (371, FIG. 9c) is applicable for M=4, and assumes a specific mapping between pairs of information bits and 4-ary pulse-amplitude modulation symbols. In the three alternate embodiments (362, FIG. 9a, 362a, FIG. 9b, 371, FIG. 9c), however, the sequence $B_m$ and the signal s(t) are not formed directly. Instead, in each of these alternate embodiments (362, FIG. 9a, 362a, FIG. 9b, 371, FIG. 9c), the sequence $D_m$ (231, FIG. 9a, 231, FIG. 9b, 231a, FIG. 9c) is lowpass filtered to form a signal |s(t)| (364, FIG. 9a, 364, FIG. 9b, 364a, FIG. 9c), which is the magnitude of the signal s(t), and a bipolar signal $s_m$ (366, FIG. 9a, 366, FIG. 9b, 366a, FIG. 9c) representative of sgn[$B_m$], the sign of $B_m$, is lowpass filtered to form the signal sgn[s(t)] (368, FIG. 9a, 368, FIG. 9b, 368a, FIG. 9c), which is the sign of the signal s(t). Each of the three alternate encoder embodiments (362, FIG. 9a, 362a, FIG. 9b, 371, FIG. 9c) can be used with any one of two alternate embodiments of the modulation subsystem (26f, FIG. 10a, 26g, FIG. 10b). Each of these alternate modulation subsystem embodiments subsystem (26f, FIG. 10a, 26g, FIG. 10b) accepts as its input the two signals |s(t)| (364, FIG. 9a, 364, FIG. 9b, 364a, FIG. 9c) and sgn[s(t)] (368, FIG. 9a, 368, FIG. 9b, 368a, FIG. 9c).

Figure 9A:
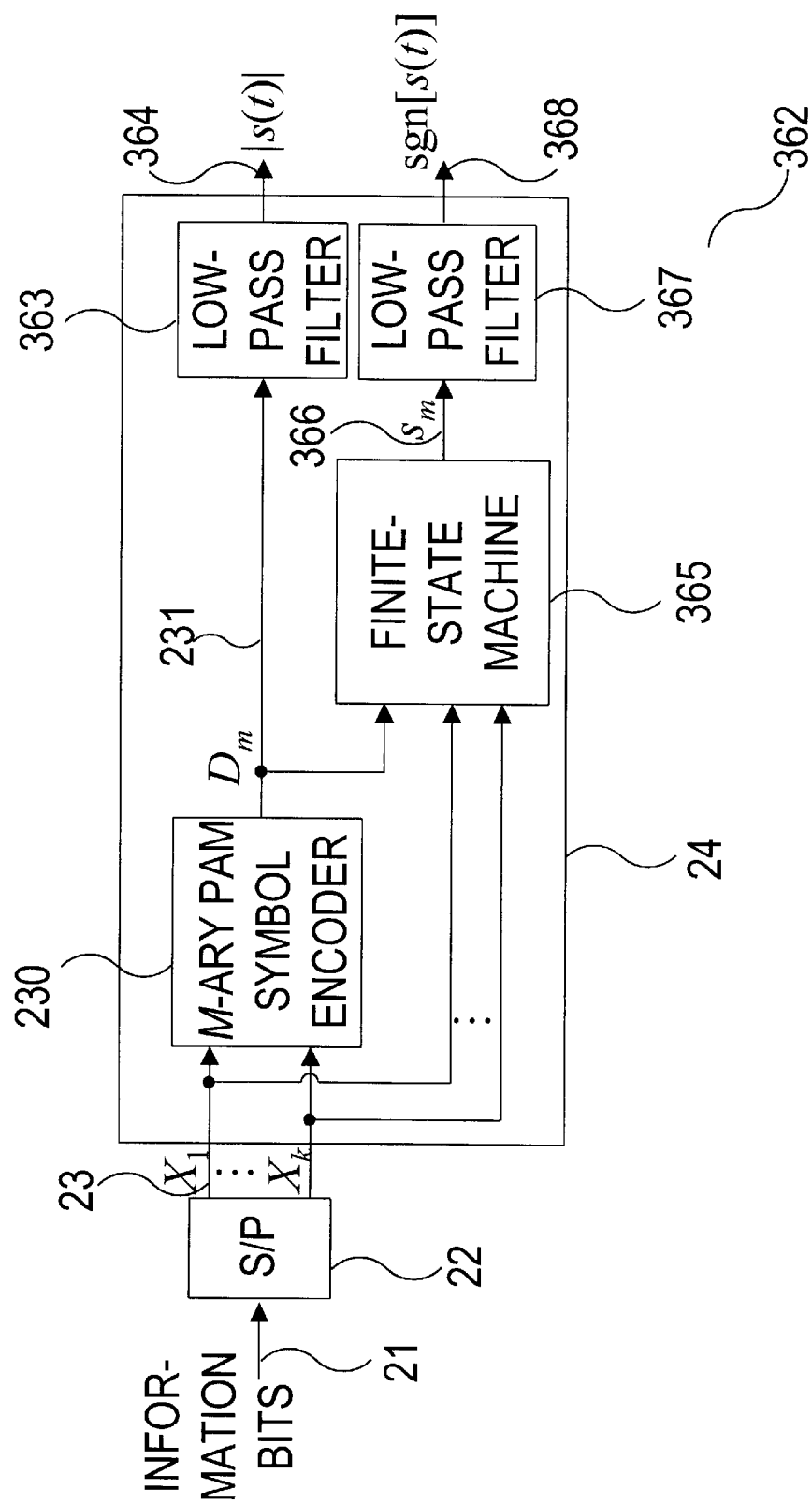
FIGS. 9a and 9b are block diagrams of third and fourth embodiments of a duobinary M-ary pulse-amplitude modulation signal encoder of the present invention.

FIG. 9a is a block diagram of an alternate embodiment of a duobinary M-ary pulse-amplitude modulation signal encoder of the present invention, referred to by the general reference number 362. The encoder 362 is, in many respects, similar to the encoder 229, which is shown in FIG. 5a. In the encoder 362, information bits 21 to be transmitted, if in serial form, are passed to the serial-to-parallel converter 22, which forms parallel blocks of k bits, denoted by 23. Alternatively, if information bits are already in the form of parallel blocks 23, the serial-to-parallel converter 22 may be omitted. Blocks of k information bits 23 are input to the pulse-amplitude modulation signal encoder 24, which corresponds to 24 in FIG. 2. Within 24, the blocks of k information bits 23 enter the M-ary pulse-amplitude modulation symbol encoder 230, which encodes each block of k information bits into a pulse-amplitude modulation symbol taking on one of a set of M levels $\{D^{(i)}, i=0, \ldots, M-1\}$, where $M \geq 2$. The number of levels, M, must satisfy $M \geq 2^k$ with $M=2^k$ being encountered most often in practice. The level $D^{(0)}$ is nominally zero, and the set of remaining M-1 levels are all positive, i.e., $\{D^{(i)}>0, i=1, \ldots, M-1\}$. In some cases, it may be desirable for the encoder 230 to perform its encoding using Gray coding, i.e., so that blocks of k information bits 23 encoded into adjacent levels (e.g., $D^{(i)}$ and $D^{(i+1)}$) differ by only one information bit. The output of the encoder 230 is the M-ary pulse-amplitude modulation symbol sequence Dm, denoted by 231. In the sequence 231, each symbol has interval T, and m is a time index counting symbol intervals. The sequence 231 passes into a lowpass filter 363, whose output is |s(t)| (364), which is the magnitude of the duobinary precoded pulse-amplitude modulation signal s(t). Since the lowpass filter 363 is a linear system, the levels taken on by the signal 364 are proportional to the levels taken on by the sequence 231. Accordingly, the signal 364 takes on a set of M non-negative levels that are proportional to the levels $D^{(0)}, \ldots, D^{(M-1)}$.

In encoder 362, the sequence 231 is input to a finite-state machine, denoted by 365. In some embodiments of 362, the block of k information bits (23) is also input to the finite-state machine 365, as indicated in FIG. 9a. Making the parallel blocks 23 directly available to the finite state machine 365 may simplify the implementation of 365 in some cases. The finite-state machine 365 is similar to the finite-state machine 232 in some respects. Recall that 232 accepts input $D_m$ (231) and yields output $B_m$ (233), which is related to $D_m$ (231) by the state-transition diagram 234. The diagram 234 shows that $B_m$ (233) differs from $D_m$ (231) only in its sign. The finite-state machine 365 accepts an input sequence $D_m$ (231) and yields the two-level output sequence $s_m$ (366), which is representative of sgn[$B_m$], the sign of $B_m$ (233). While 365 need not form the sequence $B_m$ (233), we can fully specify 365 by saying that the sequence $s_m$ (366) is related to the sequence $D_m$ (231) by the relationship between sgn[$B_m$] and $D_m$ (231) implied in the state-transition diagram 234. In encoder 362, the sequence 366 passes into a lowpass filter 367, whose output is sgn[s(t)] (368), which is a two-level signal representative of the sign of the duobinary precoded pulse-amplitude modulation signal s(t).

Figure 10A:
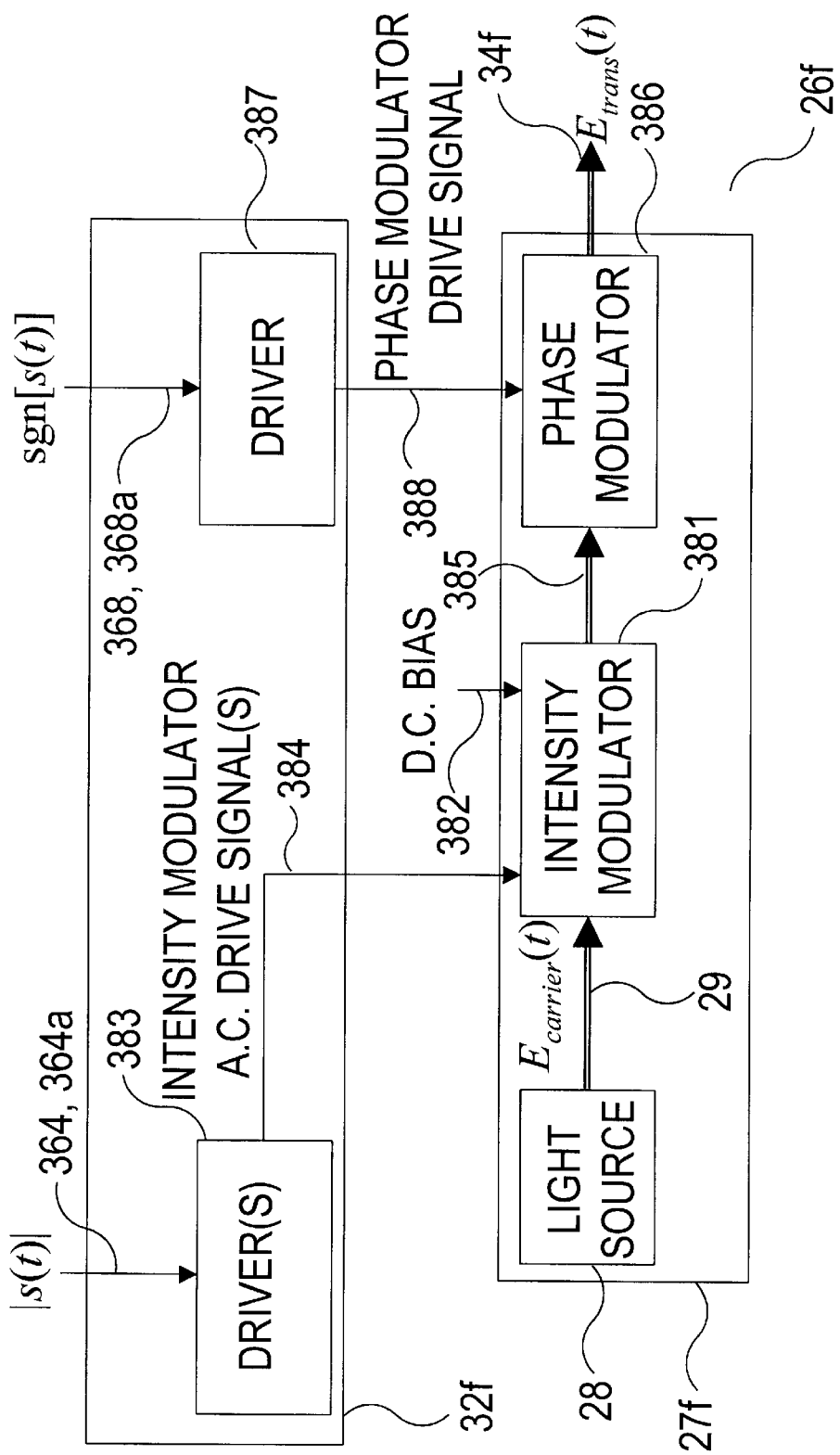
FIGS. 10a and 10b are block diagrams of first and second embodiments of modulation subsystems for modulating an electrical signal from the encoders of FIGS. 9a–c onto an optical carrier electric field for the present invention.
Figure 10B:
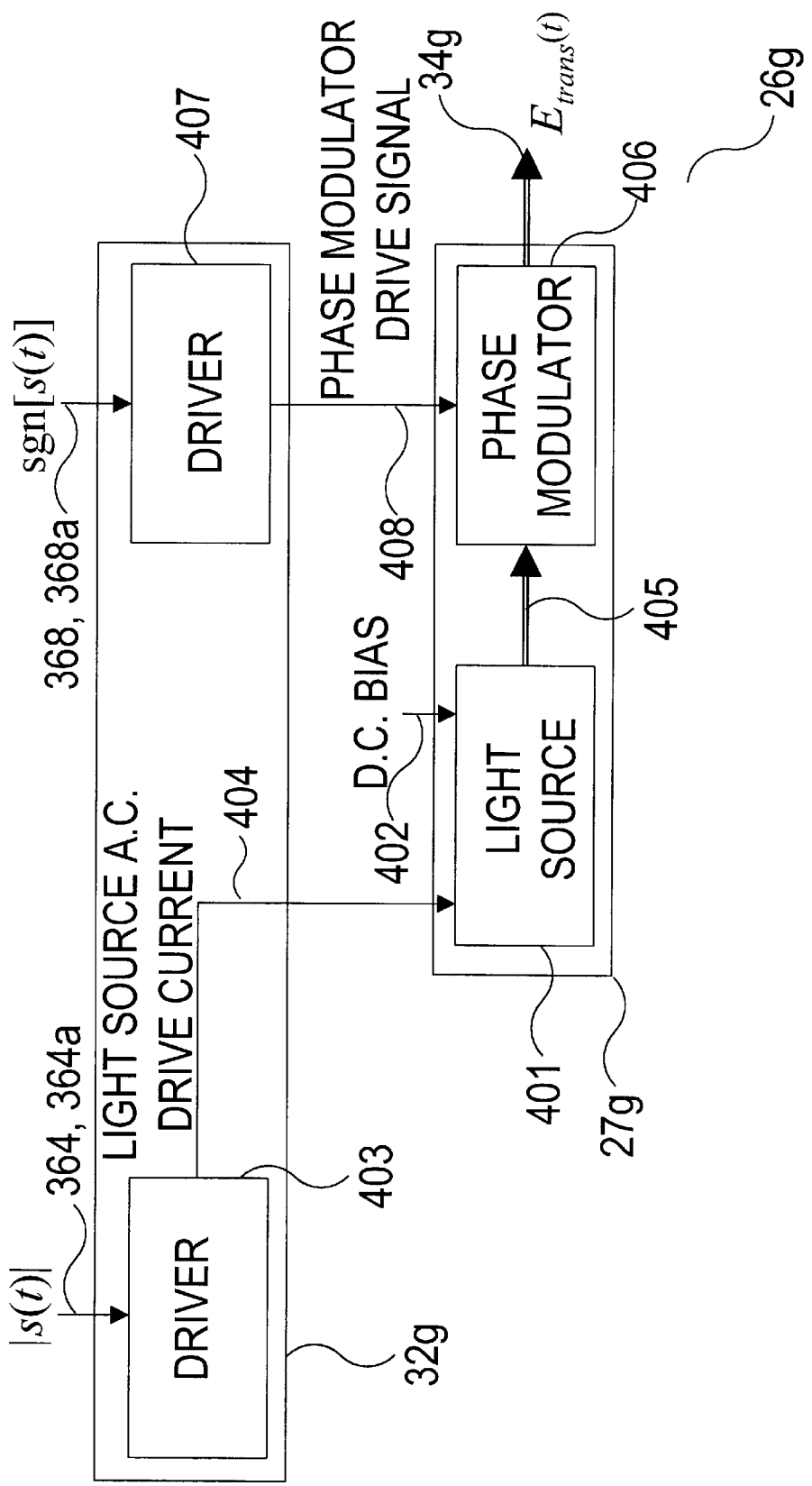

Although in the embodiment 362 we describe the signal 368 as sgn[s(t)] to make clear the relationship between the two encoder embodiments 362 and 229, the signal 368 can take on any two levels that are compatible with the modulation subsystem embodiment (26f, FIG. 10a or 26g, FIG. 10b). Although in the embodiment 362 we show the lowpass filters 363 and 367 as separate components, these lowpass filters may not be present as separate components, and the lowpass filtering function may be performed by other components in the duobinary M-ary pulse-amplitude modulation signal encoder or in the modulation subsystem that follows it.

The encoder 362 can be used with either one of two alternate embodiments of the modulation subsystem (26f, FIG. 10a, 26g, FIG. 10b), which will be described shortly. Note that the signals 364 and 368 correspond to in FIG. 2. The choice of the M levels $D^{(0)}, \ldots, D^{(M-1)}$, and thus the M levels taken on by the signal 364, depends on the characteristics of the modulation subsystem 26, and also depends on the set of levels that are to be taken on by the transmitted optical electric field 34, and thus the transmitted optical intensity $I_{trans}(t)$.

In describing encoder 362, we have assumed that the level $D^{(0)}$ is nominally zero, and that the remaining M-1 levels, $D_{(1)}, \ldots, D_{(M-1)}$, are nonzero and all positive. If we were to assume that the levels $D_{(1)}, \ldots, D_{(M-1)}$, are nonzero and all negative, the encoder 362 would function in an identical manner, except that 364 would represent $-|s(t)|$ and 368 would represent $-\text{sgn}[s(t)]$.

Figure 9B:
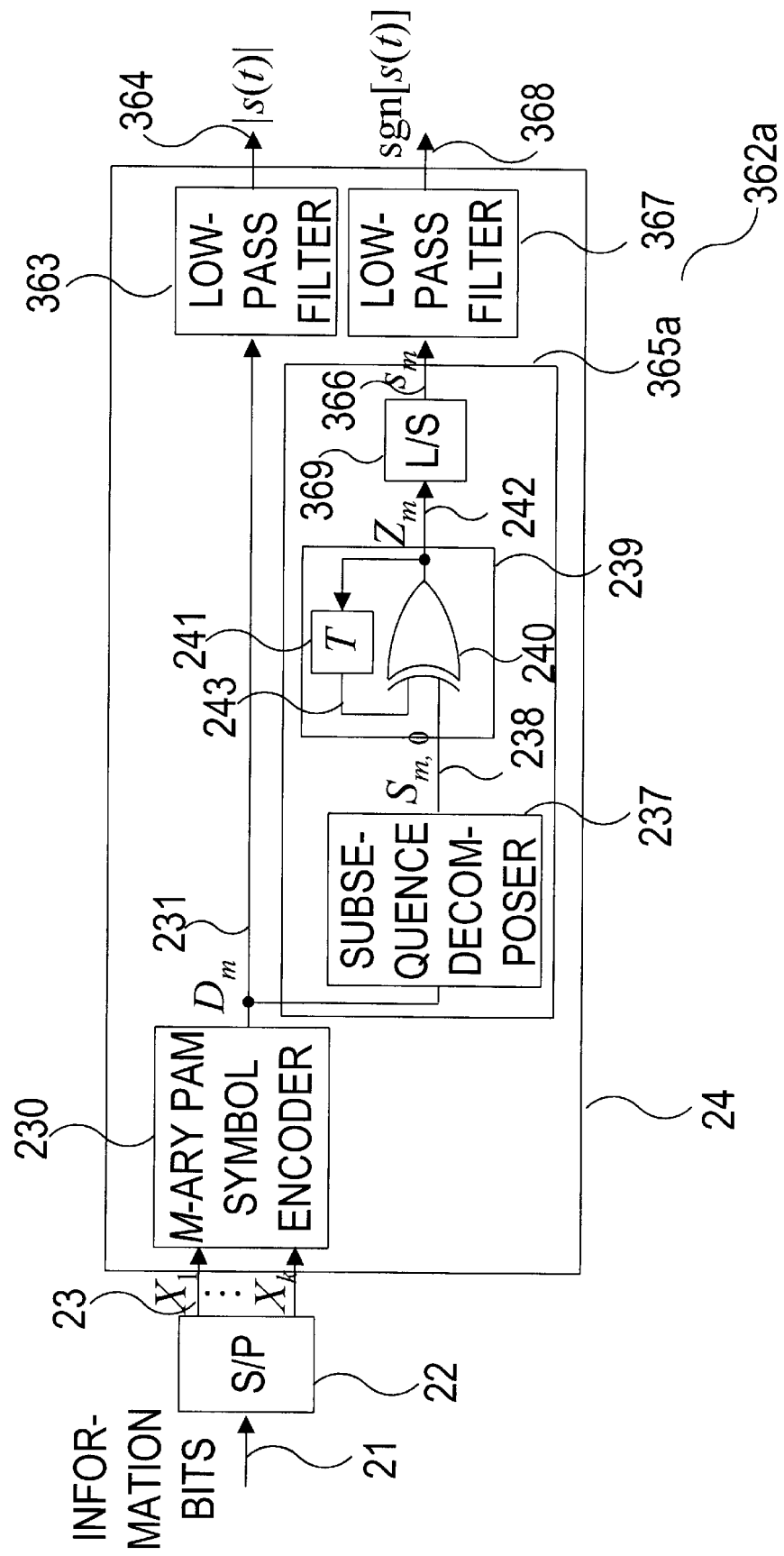

FIG. 9b is a block diagram of an embodiment of a duobinary M-ary pulse-amplitude modulation signal encoder of the present invention, referred to by the general reference number 362a. The encoder 362a performs the same functions as encoder 362, but 362a includes a finite state machine 365a of one particular embodiment of the general finite-state machine 365 included in 362. In the case of embodiment 362a, the descriptions of 21, 22, 23, 230, 231, 363 and 364 are equivalent to those for the more general embodiment 362. In particular, given the sequence of input information bits 21, 362a generates the output 364 equivalent to that generated by 362. Therefore, we will confine ourselves to describing the finite-state machine 365a, lowpass filter 367 and signal 368 that are present in 362a.

In the encoder 362a, the sequence 231 enters the finite-state machine 365a, within which 231 is input to the subsequence decomposer 237, which forms the logical subsequence $S_{m,0}$, denoted by 238. The subsequence 238 is a binary sequence having symbol interval T, and is associated with the level $D^{(0)}$. During each symbol interval, the logical subsequence 238 takes on a logical 0 unless the sequence 231 takes on the level $D^{(0)}$, in which case, the logical subsequence 238 takes on a logical 1. Mathematically, during the mth symbol interval, $S_{m,0}=0$ if $D_m \neq D^{(0)}$ and $S_{m,0}=1$ if $D_m=D^{(0)}$.

The logical subsequence 238 is received by the logical subsequence precoder 239. The precoder 239 includes the exclusive-OR gate (modulo-2 subtractor), denoted by 240, as well as the one-symbol delay, denoted by 241, interconnected in a feedback arrangement. The output of the logical subsequence precoder 239 is the logical precoded subsequence $Z_m$, denoted by 242. The logical precoded subsequence 242 is related to the logical subsequence 238 by the rule that, during the mth symbol interval, $Z_m = S_{m,0} - Z_{m-1}$ (mod 2), where $Z_{m-1}$ (243) is the value of the logical precoded subsequence $Z_m$ (242) during the previous symbol interval, m-1. We note that the precoder 239 is itself a finite-state machine with input $S_{m,0}$ (238), output $Z_m$ (242), and two states, corresponding to the two possible values of $Z_{m-1}$ (243). The operation of 239 is described by the state-transition diagram 234, shown in FIG. 3b. In 234, we have labeled the states 234a and 234b with the corresponding values of $Z_{m-1}$ (243), and have labeled the transitions 234c–234f with the corresponding values of $S_{m,0}$ (238) and $Z_m$ (242) (these labels are given in parentheses). Note that, although the sequence $B_m$ (233, FIG. 5b) is not formed in the encoder embodiment 362a, the sequence $Z_m$ (242) is a logical representation of the sign of $B_m$ (233) in the state-transition diagram 234, i.e., $Z_m=1$ when $B_m>0$ and $Z_m=0$ when $B_m<0$. Note that the sign of $B_m$ (233) is arbitrary when $B_m=0$. While we have described here an implementation of the precoder 239 based on the exclusive-OR gate 240, it is possible to implement equivalent precoders using other logical gates to perform the function of "comparing" 243 to 238.

In the encoder 362a, the logical precoded subsequence 242 is input to a level shifter, which is labeled "L/S" and denoted by 369. The level shifter 369 converts a logical input signal (taking on levels corresponding to logical 0 or logical 1, respectively) to a bipolar input signal (taking on equal and opposite levels, e.g., −1 or 1, respectively). In a practical embodiment of the invention, a level shifter 369 may simply correspond to an a.c.-coupling device, e.g., coupling capacitor. The output of the level shifter 369 is the bipolar precoded subsequence $s_m$, denoted by 366. The bipolar precoded subsequence 366 is related to the logical precoded subsequence 242 according to the rule that, during the mth symbol interval, $s_m=1$ if $Z_m=1$ and $s_m=-1$ if $Z_m=0$. Note that, although the sequence $B_m$ (233) is not formed in the encoder embodiment 362a, the sequence $s_m$ (366) is a representation of the sign of $B_m$ (233) in the state-transition diagram 234, i.e., $S_m=1$ when $B_m>0$ and $s_m=-1$ when $B_m<0$. Note that the sign of $B_m$ is arbitrary when $B_m=0$. In encoder 362a, the sequence $s_m$ (366) passes into a lowpass filter 367, whose output is sgn[s(t)] (368), which is a two-level signal representative of the sign of the duobinary precoded pulse-amplitude modulation signal s(t) (236, FIG. 5b).

In the embodiment 362a, we have included a level shifter 369 that outputs two equal and opposite levels, to allow us to describe the sequence 366 as sgn[$B_m$] and to describe the signal 368 as sgn[s(t)]. In a practical implementation of 362a, it may be possible for 369 to output two levels that are not equal and opposite, or it may be possible to omit 369 altogether, so long as the signal 368 takes on two levels that are compatible with the modulation subsystem embodiment (26f, FIG. 10a or 26g, FIG. 10b). Although in the embodiment 362a we show the lowpass filters 363 and 367 as separate components, these lowpass filters may not be present as separate components, and the lowpass filtering function may be performed by other components in the duobinary M-ary pulse-amplitude modulation signal encoder or in the modulation subsystem that follows it.

The encoder 362a can be used with either one of two alternate embodiments of the modulation subsystem (26f, FIG. 10a, 26g, FIG. 10b), which will be described shortly. Note that the signals 364 and 368 correspond to in FIG. 2. The choice of the M levels $D^{(0)}, \ldots, D^{(M-1)}$, and thus the M levels taken on by the signal 364, depends on the characteristics of the modulation subsystem 26, and also depends on the set of levels that are to be taken on by the transmitted optical electric field 34, and thus the transmitted optical intensity $I_{trans}(t)$.

In describing encoder 362a, we have assumed that the level $D^{(0)}$ is nominally zero, and that the remaining M−1 levels, $D^{(1)}, \ldots, D^{(M-1)}$, are nonzero and all positive. If we were to assume that the levels $D^{(1)}, \ldots, D_{(M-1)}$, are nonzero and all negative, the encoder 362 would function in an identical manner, except that 364 would represent −|s(t)| and 368 would represent −sgn[s(t)].

Figure 9C:
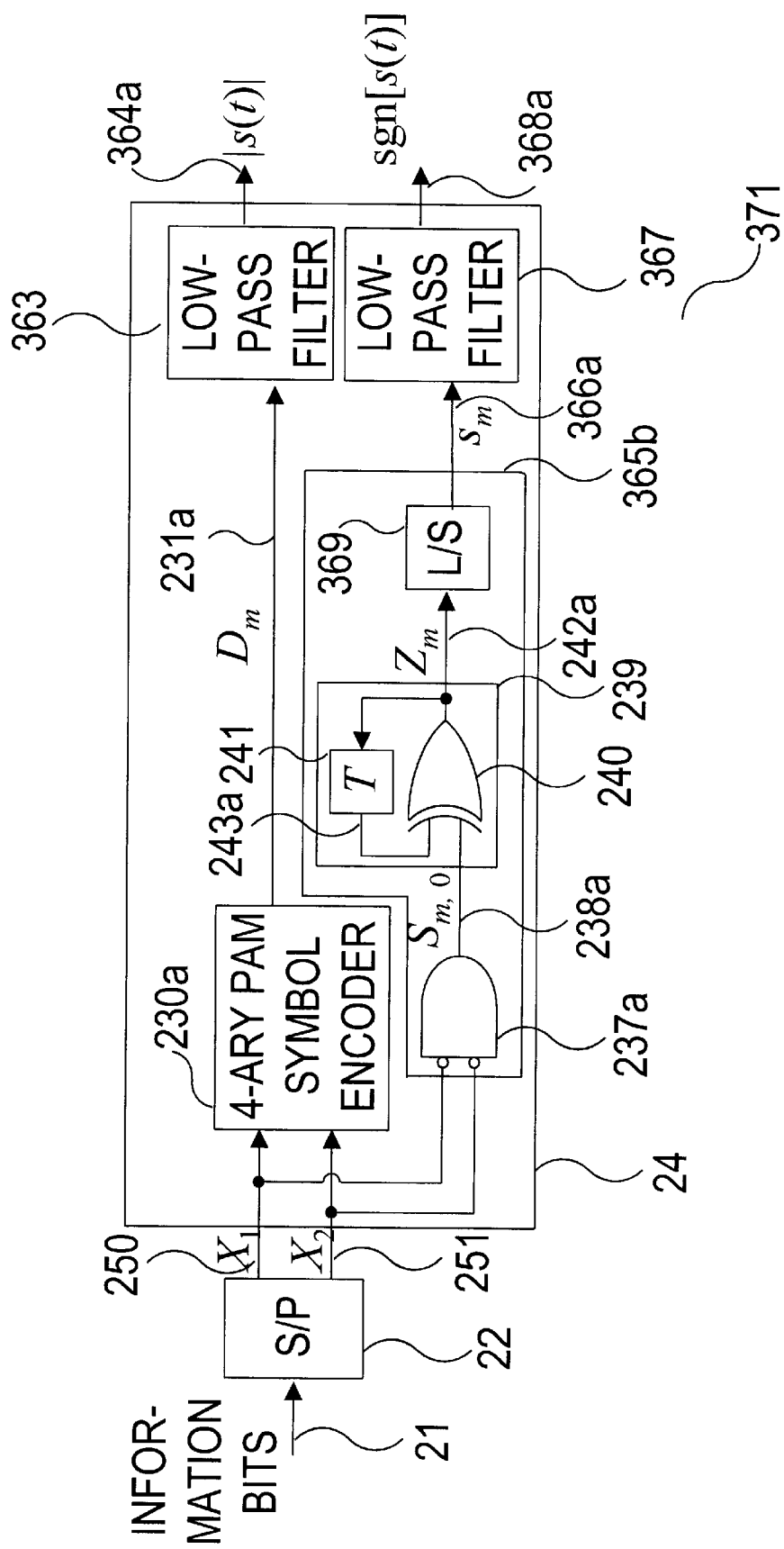

We now provide an example of the alternate embodiment 362 of a duobinary M-ary pulse-amplitude modulation signal encoder for the specific case of M=4, assuming a specific mapping between information bits and 4-ary pulse-amplitude modulation symbols. FIG. 9c is a block diagram of an alternate embodiment of a duobinary 4-ary pulse-amplitude modulation signal encoder of the present invention, referred to by the general reference number 371. The encoder 371 is, in many respects, similar to the encoder 247, which is shown in FIG. 5c. The two encoders differ as follows. In encoder 247, the sequence $B_m$ (233a) is lowpass filtered to obtain the signal s(t) (236a), which is the only output signal from encoder 247. By contrast, in the encoder 371, the sequence $D_m$ is lowpass filtered to form the signal |s(t)| (364a), which is the magnitude of the signal s(t), and the sequence $Z_m$ (242a) is converted to the sequence $s_m$ (366a), which is lowpass filtered to form the signal sgn[s(t)] (368a), which is the sign of the signal s(t). The encoder 371 yields two output signals: |s(t)| (364a) and sgn[s(t)] (368a).

In encoder 371, information bits 21 to be transmitted, if in serial form, are passed to the serial-to-parallel converter 22, which forms parallel blocks of 2 bits $X_1$ and $X_2$, denoted by 250 and 251, respectively. Alternatively, if information bits are already in the form of parallel blocks of 2 bits, the serial-to-parallel converter 22 may be omitted. Blocks of 2 information bits 250 and 251 are input to the pulse-amplitude modulation signal encoder 24, which corresponds to 24 in FIG. 2. Within 24, the blocks of 2 information bits 250 and 251 enter the 4-ary pulse-amplitude modulation symbol encoder 230a, which encodes each block of 2 information bits into the 4-ary pulse-amplitude modulation symbol sequence $D_m$, denoted by 231a. The encoding implemented by 230a is specified in a table 3, below. For our present purposes, we observe that $D^{(0)}=0$ and that $D^{(0)}<D^{(1)}<D^{(2)}<D^{(3)}$, so that this encoding implements Gray coding. Recall that the logical subsequence $S_{m,0}$ takes on a logical 1 when $D_m=D^{(0)}$, and takes on a logical 0 otherwise. As indicated in the table 3, for the particular encoding implemented by 230a, 238a takes on the values $S_{m,0}=1$ when $(X_1, X_2)=(0,0)$ and $S_{m,0}=0$ otherwise.

TABLE 3

| $X_1$ | $X_2$ | $D_m$ | $S_{m,0}$ |
|---|---|---|---|
| 0 | 0 | $D^{(0)} = 0.00$ | 1 |
| 0 | 1 | $D^{(1)} = 1.18$ | 0 |
| 1 | 1 | $D^{(2)} = 1.82$ | 0 |
| 1 | 0 | $D^{(3)} = 3.00$ | 0 |

The sequence 231a passes into the lowpass filter 363, whose output is |s(t)| (364a), which is the magnitude of the duobinary precoded pulse-amplitude modulation signal s(t). Since the lowpass filter 363 is a linear system, the levels taken on by the signal 364a are proportional to the levels taken on by the sequence 231a. Accordingly, the signal 364a takes on a set of 4 non-negative levels that are proportional to the levels $D^{(0)}, \ldots, D^{(3)}$.

In encoder 371, the blocks of 2 information bits 250 and 251 are also input to the subsequence decomposer 237a, which is implemented using an AND gate with inverters on the inputs. The output of 237a is the logical subsequence $S_{m,0}$, which is denoted by 238a.

The logical subsequence 238a is input to a logical subsequence precoder, which is denoted by 239. The precoder 239 includes the exclusive-OR gate (modulo-2 subtractor), denoted by 240, as well as the one-symbol delay, denoted by 241, interconnected in a feedback arrangement. The output of the logical subsequence precoder 239 is the logical precoded subsequence $Z_m$, denoted by 242a. The logical precoded subsequence 242a is related to the logical subsequence 238a by the rule that, during the mth symbol interval, $Z_m = S_{m,0} - Z_{m-1}$ (mod2), where $Z_{m-1}$ (243a) is the value of the logical precoded subsequence $Z_m$ (242a) during the previous symbol interval, m−1. We note that the precoder 239 is itself a finite-state machine with input $S_{m,0}$ (238a), output $Z_m$ (242a), and two states, corresponding to the two possible values of $Z_{m-1}$ (243a). The operation of 239 is described by the state-transition diagram 234, shown in FIG. 3b. In 234, we have labeled the states 234a and 234b with the corresponding values of $Z_{m-1}$ (243a), and have labeled the transitions 234c–234f with the corresponding values of $S_{m,0}$ (238a) and $Z_m$ (242a) (these labels are given in parentheses). Note that, although the sequence $B_m$ (233a, FIG. 5c) is not formed in the encoder embodiment 371, the sequence $Z_m$ (242a) is a logical representation of the sign of $B_m$ (233a) in the state-transition diagram 234, i.e., $Z_m=1$ when $B_m>0$ and $Z_m=0$ when $B_m<0$. Note that the sign of $B_m$ (233a) is arbitrary when $B_m=0$. While we have described here an implementation of the precoder 239 based on the exclusive-OR gate 240, it is possible to implement equivalent precoders using other logical gates to perform the function of "comparing" 243a to 238a.

In the encoder 371, the logical precoded subsequence 242a is input to the level shifter, which is labeled "L/S" and denoted by 369. The level shifter 369 converts a logical input signal (taking on levels corresponding to logical 0 or logical 1, respectively) to a bipolar input signal (taking on equal and opposite levels, e.g., −1 or 1, respectively). In a practical embodiment of the invention, a level shifter 369 may simply correspond to an a.c.-coupling device, e.g., coupling capacitor. The output of the level shifter 369 is the bipolar precoded subsequence $s_m$, denoted by 366a. The bipolar precoded subsequence 366a is related to the logical precoded subsequence 242a according to the rule that, during the mth symbol interval, $S_m=1$ if $Z_m=1$ and $S_m=-1$ if $Z_m=0$. Note that, although the sequence $B_m$ (233a, FIG. 5c) is not formed in the encoder embodiment 371, the sequence $S_m$ (366a) is a representation of the sign of $B_m$ (233a, FIG. 5c) in the state-transition diagram 234, i.e., $S_m^{-1}$ when $B_m>0$ and $S_m=-1$ when $B_m<0$. Note that the sign of $B_m$ (233a) is arbitrary when $B_m=0$.

The sequence 366a passes into a lowpass filter 367, whose output is sgn[s(t)] (368a), which is a two-level signal representative of the sign of the duobinary precoded pulse-amplitude modulation signal s(t) (236a, FIG. 5c).

In the embodiment 371, we have included the level shifter 369 that outputs two equal and opposite levels, to allow us to describe the sequence 366a as sgn[$B_m$] and to describe the signal 368a as sgn[s(t)]. In a practical implementation of 371, it may be possible for 369 to output two levels that are not equal and opposite, or it may be possible to omit 369 altogether, so long as the signal 368 takes on two levels that are compatible with the modulation subsystem embodiment (26f, FIG. 10a or 26g, FIG. 10b). Although in the embodiment 371 we show the lowpass filters 363 and 367 as separate components, these lowpass filters may not be present as separate components, and the lowpass filtering function may be performed by other components in the duobinary M-ary pulse-amplitude modulation signal encoder or in the modulation subsystem that follows it.

The encoder 371 can be used with either one of two alternate embodiments of the modulation subsystem 26 shown in FIG. 2. These two alternate embodiments (26f, FIG. 10a or 26g, FIG. 10b) will be described shortly. Note that the signals 364a and 368a correspond to in FIG. 2. The choice of the 4 levels $D^{(0)}, \ldots, D^{(3)}$, and thus the 4 levels taken on by the signal 364a, depends on the characteristics of the modulation subsystem (26f, FIG. 10a or 26g, FIG. 10b), and also depends on the set of levels that are to be taken on by the transmitted optical electric field 34, and thus the transmitted optical intensity $I_{trans}(t)$.

In describing encoder 371, we have assumed that the level $D^{(0)}$ is nominally zero, and that the remaining 3 levels, $D^{(1)}, \ldots, D^{(3)}$, are nonzero and all positive. If we were to assume that the levels $D^{(1)}, \ldots, D^{(3)}$, are nonzero and all negative, the encoder 371 would function in an identical manner, except that 364a would represent −|s(t)| and 368a would represent −sgn[s(t)].

We will now describe two alternate embodiments of the modulation subsystem 26, either of which can be used in conjunction with encoders 362, 362a or 371. These two alternate modulation subsystem embodiments are very similar to 26c and 26d, which are shown in FIGS. 6c and 6d, respectively. Unlike 26c and 26d, however, each of the two alternate modulation subsystem embodiments omits the magnitude computing device (276 or 294) and the sign computing device (280 or 296).

FIG. 10a is a modulation subsystem that uses an unmodulated laser, or other light source, an intensity modulator, and a phase modulator, and is given the general reference number 26f. Modulation subsystem 26f is very similar to 26c, except that 26f omits the magnitude computing device 276 and the sign computing device 280 that are present in 26c. The modulation subsystem 26f includes an optical signal generator 27f and a signal generator driver 32f. Within 27f, a laser or other light source, designated 28, generates the unmodulated optical carrier described by the optical carrier electric field $E_{carrier}(t)$, denoted by 29. The optical carrier electric field 29 is passed into an intensity modulator 381, which may be an interferometric intensity modulator, an electroabsorption intensity modulator, or may be of some other design. The intensity modulator 381 is biased by a suitable intensity modulator d.c. bias 382. Within 32f, the signal |s(t)|, denoted by 364, 364a, is passed into an intensity modulator driver 383, which generates one or more intensity modulator a.c. drive signal(s), denoted by 384. The drive signal(s) 384 drive(s) the intensity modulator 381, causing 381 to modulate 364, 364a onto the optical carrier electric field 29, resulting in a modulated optical signal 385 at the output of 381. The modulated optical signal 385 is passed into a phase modulator 386. Within 32f, the signal sgn[s(t)], denoted by 368, 368a, is passed into a phase modulator driver 387, which generates a phase modulator drive signal 388. The drive signal 388 drives the phase modulator 386, causing 386 to modulate the sign of 385 by sgn[s(t)], denoted by 368, 368a, by selectively introducing phase shifts of π. Note that 384 and 388 correspond to 33 in FIG. 2. The output of the phase modulator 386 is a transmitted optical electric field $E_{trans}(t)$, denoted by 34f.

FIG. 10b is a modulation subsystem that uses a directly modulated laser, or other light source, and a phase modulator, and is given the general reference number 26g. Modulation subsystem 26g is very similar to 26d except that 26g omits the magnitude computing device 294 and the sign computing device 296 that are present in 26d . The modulation subsystem 26g includes an optical signal generator 27g and the signal generator driver 32g. Within 27g, a laser, or other light source, designated 401, is biased by a suitable d.c. bias current 402. Within 32g, the signal |s(t)|, denoted by 364, 364a is passed into a light source driver 403, which generates a light source a.c. drive current, denoted by 404. The drive current 404 drives 401, causing 401 to emit a modulated optical signal 405, whose amplitude is modulated by |s(t)|, denoted by 364, 364a. The modulated optical signal 405 is passed into a phase modulator 406. Within 32g, the signal sgn[s(t)], denoted by 368, 368a, is passed into a phase modulator driver 407, which generates a phase modulator drive signal 408. The drive signal 408 drives the phase modulator 406, causing 406 to modulate the sign of 405 by sgn[s(t)], denoted by 368, 368a, by selectively introducing phase shifts of $\pi$. Note that 404 and 408 correspond to 33 in FIG. 2. The output of the phase modulator 406 is a transmitted optical electric field $E_{trans}(t)$, denoted by 34g.

Considering the general case M>2, a transmitter that combines encoder 362 or 362a and either of the modulation subsystems 26f or 26g can generate duobinary M-ary pulse-amplitude-modulated optical signals (in the form of the transmitted optical electric field 34f or 34g, respectively) that are equivalent to 34a (generated by encoder 229 or 229a combined with modulation subsystem 26a), 34b (generated by encoder 229 or 229a combined with modulation subsystem 26b), 34c (generated by encoder 229 or 229a combined with modulation subsystem 26c), or 34d (generated by encoder 229 or 229a combined with modulation subsystem 26d). Considering the case M=4 with a particular mapping between information bits and 4-ary pulse-amplitude modulation symbols, a transmitter that combines the encoder 371 and either of the modulation subsystems 26f or 26g can generate duobinary 4-ary pulse-amplitude-modulated optical signals (in the form of the transmitted optical electric field 34f or 34g, respectively) that are equivalent to 34a (generated by encoder 247 combined with modulation subsystem 26a), 34b (generated by encoder 247 combined with modulation subsystem 26b), 34c (generated by encoder 247 combined with modulation subsystem 26c), or 34d (generated by encoder 247 combined with modulation subsystem 26d). In particular, in both the general case M≧2 and the specific case M=4, the transmitted optical electric field 34f or 34g exhibits all of the benefits of a narrowed optical spectrum and lengthened symbol interval that are exhibited by 34a, 34b, 34c and 34d. Also, after transmission through the optical transmission medium 19, the transmitted optical electric field 34f or 34g can be received by any of the three receiver embodiments 20a, 20b, or 20c, like 34a, 34b, 34c and 34d.

The present invention enables information bits to be transmitted via optical signals having a narrowed optical spectrum and lengthened symbol interval, yielding numerous benefits in practical communication systems.

In the present invention, the optical spectrum of the transmitted optical electric field 34 (or 34a–34d and 34f, 34g) depends on several factors, including the information bit rate, the number of levels in the transmitted optical electric field (2M−1), the precise choice of those levels, and the choice of encoder (229, 247, 362 or 371), the design of the lowpass filter(s) (235 or 363 and 367), and the choice of modulation subsystem (26a, 26b, 26c, 26d, 26f or 26g). Nonetheless, for a given information bit rate, for all of the embodiments of duobinary M-ary pulse-amplitude modulation under the present invention, the optical spectrum is narrowed by a factor of approximately 2 as compared to M-ary pulse-amplitude modulation, by a factor of approximately $\log_2 M$ as compared to duobinary 2-ary pulse-amplitude modulation, and by a factor of approximately $2\log_2 M$ as compared to 2-ary pulse-amplitude modulation (on-off keying).

Figure 11:
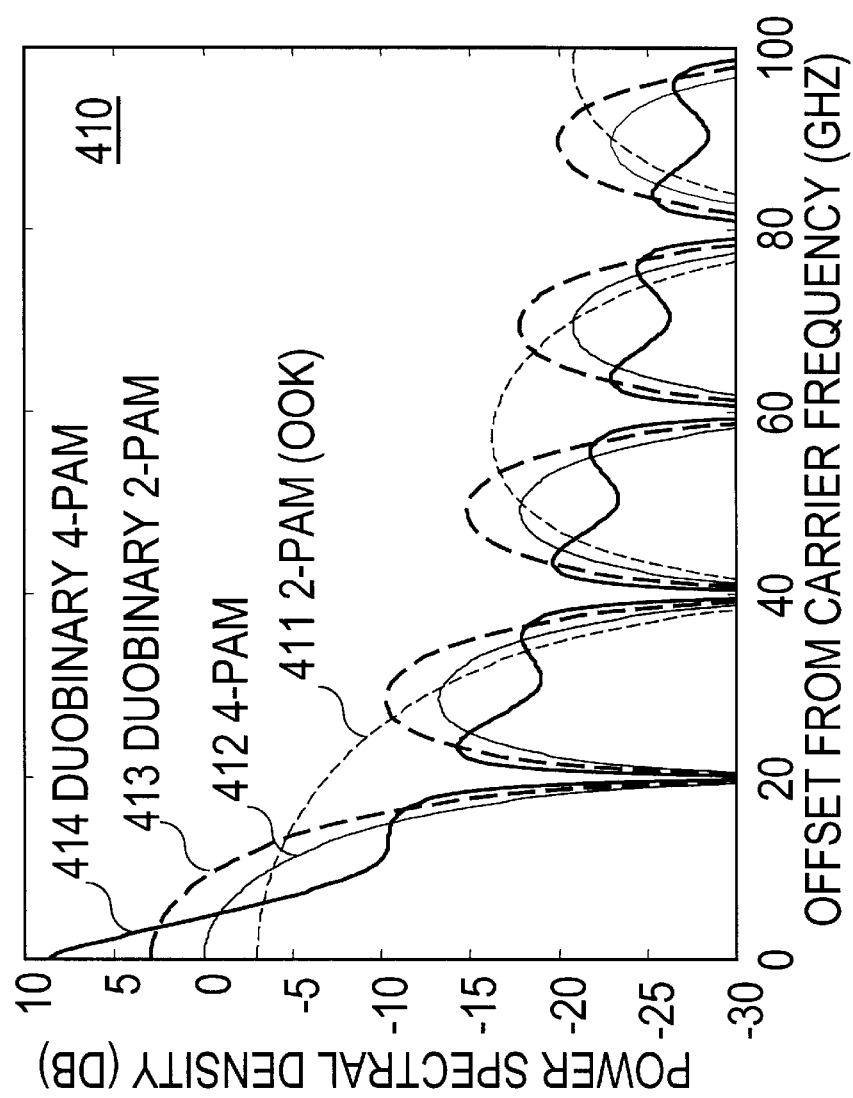
FIG. 11 are optical spectra of the transmitted optical electric field for four encoding techniques: duobinary 4-ary pulse-amplitude modulation following the present invention, duobinary 2-ary pulse-amplitude modulation, 4-ary pulse-amplitude modulation, and 2-ary pulse-amplitude modulation (on-off keying).

In order to illustrate the spectral narrowing achieved by the present invention, FIG. 11 compares the optical spectrum of the transmitted electric field for four different modulation schemes, and is given the general reference number 410. In 410, we assume an information bit rate of 40 Gbps for all four schemes. Note that for all four schemes, the optical spectrum is symmetric about the carrier frequency, so it is only necessary to show frequencies above the carrier frequency in 410. A spectrum illustration 411 represents the optical spectrum for 2-ary pulse-amplitude modulation (on-off keying) using non-return-to-zero pulses. A spectrum illustration 412 represents the optical spectrum for 4-ary pulse-amplitude modulation using non-return-to-zero pulses; we observe that the spectrum illustration 412 is a factor of 2 narrower than the spectrum illustration 411, as is well known. A spectrum illustration 413 represents the optical spectrum for duobinary 2-ary pulse-amplitude modulation; we see that the spectrum illustration 413 is also a factor of 2 narrower than the spectrum illustration 411, as is also well known. Finally, a spectrum illustration 414 represents the optical spectrum for duobinary 4-ary pulse-amplitude modulation following the present invention. We observe that the spectrum illustration 414 is a factor of 2 narrower than either 412 or 413, and is a factor of 4 narrower than 411. In plotting 410, we have omitted impulses that appear at the carrier frequency (i.e. at the origin of 410) in 411 and 412, and we have assumed equal optical power for all four modulation schemes, including these impulses. In plotting the spectrum illustration 414, we have assumed that the transmitted optical electric field takes on 7 equally spaced levels, e.g., {−3, −2, −1, 0, 1, 2, 3}. Modifying the choice of levels to a degree acceptable in practice would only slightly alter the optical spectrum represented by the spectrum illustration 414. In plotting 410, for all four schemes, we have assumed that the transmitter has a very wide bandwidth, so that the transmitted optical signal uses ideal rectangular pulses. In the case of duobinary 4-ary pulse-amplitude modulation following the present invention, this assumption means that the lowpass filter inside 24 has very wide bandwidth. For all four schemes, narrowing the bandwidth of the lowpass filter to a degree acceptable in practice would modify the optical spectra illustrated by 411, 412, 413 and 414 by diminishing the higher-frequency spectral sidelobes, but would not significantly alter our conclusions about the spectral narrowing provided by the present invention.

The narrowed spectrum illustrated by 414 yields several advantages in practice. In wavelength-division-multiplexed systems, which utilize some form of optical or electrical filters to select the desired signal at the receiver, the spacing between carrier frequencies can be reduced subject to some constraints on the tolerable distortion to the desired signal caused by these filters and the tolerable crosstalk from undesired signals not rejected by these filters, thereby increasing the spectral efficiency of the system. Also, the narrowed optical spectrum reduces pulse spreading caused by chromatic dispersion in systems using single-mode fiber as the transmission medium.

The transmitted optical electric field 34 (or 34a–34d and 34f, 34g) can be described as a duobinary M-ary pulse-amplitude-modulated optical signal, which can be described in terms of a sequence of encoded symbols, each having interval T. In the present invention, the symbol interval T is longer than the symbol interval in systems using 2-ary pulse-amplitude modulation (on-off keying) or duobinary 2-ary pulse-amplitude modulation by a factor $\log_2 M$, assuming $M=2^k$. For example, when $M=4$, the symbol interval is lengthened by a factor of 2.

This lengthened symbol interval yields several advantages in practice. The lengthened symbol interval improves a receiver's ability to recover the transmitted information bits in the presence of dispersion (i.e., pulse spreading) originating from several sources, including chromatic dispersion or polarization-mode dispersion in single-mode fiber, modal dispersion in multi-mode fiber, and multipath propagation in free-space links. The lengthened symbol interval also reduces the electrical bandwidth required of electrical-to-optical converters, optical-to-electrical converters and electrical components in the transmitter and receiver. Finally, the lengthened symbol interval reduces the clock speed required in the transmitter and receiver.

In practice, it may be attractive to implement optical communication systems using duobinary 4-ary pulse-amplitude modulation following the present invention. It is of interest to compare such systems to those using 2-ary pulse-amplitude modulation (on-off keying) with non-return-to-zero pulses, which is a modulation technique very widely employed in practice. The use of duobinary 4-ary pulse-amplitude modulation narrows the optical spectrum by approximately a factor of 4, and lengthens the symbol interval by a factor of 2. In dense wavelength-division-multiplexed systems, for a fixed per-channel information bit rate, the narrowed optical spectrum allows the spacing between carrier wavelengths to be reduced by approximately a factor of four, increasing the spectral efficiency of the system by approximately a factor of four.

In a system using single-mode fiber as the transmission medium, the narrrowed spectrum and lengthened symbol interval approximately doubles the uncompensated chromatic dispersion that can be tolerated by the system. For example, in a system not using optical compensation of chromatic dispersion, this can permit a doubling of the chromatic-dispersion-limited transmission distance. Alternatively, if optical dispersion compensation is employed, with duobinary 4-ary pulse-amplitude modulation following the present invention, the fiber chromatic dispersion need not be compensated as accurately as it would need to be in a system using 2-ary pulse-amplitude modulation. Also, the lengthened symbol interval doubles the uncompensated polarization-mode dispersion that can be tolerated by the system; if the system does not use optical compensation of polarization-mode dispersion, this permits a quadrupling of the polarization-mode-dispersion-limited transmission distance.

Additionally, the lengthened symbol interval cuts approximately in half the electrical bandwidth required of electrical-to-optical converters, optical-to-electrical converters and electrical components in the transmitter and receiver. Finally, the lengthened symbol interval reduces the clock speed required in the transmitter and receiver by a factor of two.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:
1. An optical transmission system, comprising:
a finite-state machine having at least one first type finite state machine (FSM) state and at least one second type FSM state, the finite state machine receiving input values of sequential representations of input information bits, and switching from one of said first type FSM state and said second type FSM state to the other of said first type FSM state and said second type FSM state for a particular one of said input values; and
a modulation subsystem for generating an optical electric field having field levels in a first field set and a second field set in response to said first type FSM state and said second type FSM state, respectively, said first field set having an approximately zero level one of said field levels indicative of said particular input value and at least two first non-zero said field levels indicative of other said input values, said second field set having an approximately zero level one of said field levels indicative of said particular input value and at least two second non-zero said field levels redundantly indicative of said other input values, said second non-zero field levels approximately opposite in phase and approximately equal in intensity with said first non-zero field levels, respectively.

2. The system of claim 1, wherein:
for an M of at least three said input values, said optical electric field includes two times said M minus one (2M−1) said field levels including said zero field level, said M minus one (M−1) said first non-zero field levels, and said M minus one (M−1) said second non-zero field levels.

3. The system of claim 1, further comprising:
a receiver for receiving said optical electric field through an optical medium, extracting a received pulse-amplitude-modulation (PAM) signal from an intensity of said received optical electric field, and performing decisions on the received PAM signal for recovering output information bits indicative of said input information bits.

4. The system of claim 3, wherein:
the receiver uses direct detection for extracting said received PAM signal from said intensity of said received optical electric field.

5. The system of claim 3, wherein:
the receiver uses homodyne downconversion for extracting said received PAM signal from said intensity of said received optical electric field.

6. The system of claim 3, wherein:
the receiver uses heterodyne downconversion for extracting said received PAM signal from said intensity of said received optical electric field.

7. The system of claim 1, wherein:
the finite state machine includes a subsequence decomposer for decomposing said representations of said input information bits into a logical sequence having a first logic level for said particular input value and a second logic level for said other input values; and a precoder for providing a precoded sequence switching between two precode levels for said first logic level and not switching between said two precode levels for said second logic level, the finite state machine using said precoded sequence for deriving one of said first type FSM state and said second type FSM state as a current FSM state.

8. The system of claim 7, wherein:
the precoder includes a precode delay for delaying said precoded sequence for providing a delayed precoded sequence; and a logic device for comparing said logical sequence to said delayed precoded sequence for providing said precoded sequence.

9. The system of claim 8, wherein:

said delayed precoded sequence has a first delayed level in response to one of said precode levels for providing said first type FSM state as said current FSM state and a second delayed level in response to the other of said precode levels for providing said second type FSM state as said current FSM state.

10. The system of claim 7, wherein:

the finite state machine further includes a selective inverter for inverting representations of said input values in response to one of said precode levels and not inverting said representations of said input values in response to the other of said precode levels for forming said FSM output sequence; and the modulation subsystem uses said FSM output sequence for generating said optical electric field.

11. The system of claim 1, wherein:

the finite state machine issues an FSM output sequence having FSM output levels switching from one of a first type of said FSM output levels and a second type of said FSM output levels to the other of said first type of said FSM output levels and said second type of said FSM output levels for the finite state machine switching from one of said first type FSM state and said second type FSM state to the other of said first type FSM state and said second type FSM state; and the modulation subsystem uses said FSM output sequence for generating said optical electric field.

12. The system of claim 11, wherein:

for an M of least three said input values of said representations for said input information bits, said first type of said FSM output levels includes a neutral one of said FSM output levels and said M minus one (M−1) first non-neutral said FSM output levels; and said second type of said FSM output levels includes said neutral FSM output level and said M minus one (M−1) second non-neutral said FSM output levels, said neutral FSM output level indicative of said particular input value, said first non-neutral FSM output levels and said second non-neutral FSM output levels mirroring each other about said neutral FSM output level for redundant indications of said other input values.

13. The system of claim 12, wherein:

the modulation subsystem includes a splitter for converting said FSM output sequence into first and second complementary drive signals; and a modulator for modulating an optical signal in a push-pull manner with said first and second drive signals for providing said optical electric field.

14. The system of claim 12, wherein:

the modulation subsystem includes a magnitude converter for converting said FSM output sequence into a magnitude drive signal having amplitudes corresponding respectively to magnitudes of differences between said FSM output levels and said neutral FSM output level; and a sign converter for converting said FSM output sequence into a sign drive signal having amplitudes corresponding respectively to signs of differences between said FSM output levels and said neutral FSM output level.

15. The system of claim 14, wherein:

the modulation subsystem further includes an intensity modulator for receiving said magnitude drive signal and a phase modulator for receiving said sign drive signal, said intensity modulator and said phase modulator disposed in series for receiving said optical signal and issuing said optical electric field.

16. The system of claim 14, wherein:

the modulation subsystem further includes an optical light source for receiving said magnitude drive signal and issuing an intensity modulated optical signal and a phase modulator for receiving said intensity modulated optical signal and said sign drive signal and issuing said optical electric field.

17. The system of claim 11, wherein:

the modulation subsystem includes an intensity driver for deriving an intensity drive signal from representations of said input values and a phase driver for deriving a sign drive signal having a first amplitude for said first type of said FSM output levels and a second amplitude for said second type of said FSM output levels.

18. The system of claim 17, wherein:

the modulation subsystem further includes an intensity modulator for receiving said intensity drive signal and a phase modulator for receiving said sign drive signal, said intensity modulator and said phase modulator disposed in series for receiving an optical signal and issuing said optical electric field.

19. The system of claim 17, wherein:

the modulation subsystem further includes an optical signal source for receiving said intensity drive signal and issuing an intensity modulated optical signal and a phase modulator for modulating said intensity modulated optical signal with said sign drive signal for issuing said optical electric field.

20. An optical transmission method, comprising steps of:

receiving input values of sequential representations of input information bits;

switching from one of a first type state and a second type state to the other of said first type state and said second type state for a particular one of said input values; and generating an optical electric field having field levels in a first field set and a second field set in response to said first type state and said second type state, respectively, said first field set having an approximately zero one of said field levels indicative of said particular input value and at least two first non-zero said field levels indicative of other said input values, said second field set having an approximately zero one of said field levels indicative of said particular input value and at least two second non-zero said field levels redundantly indicative of said other input values, said second non-zero field levels approximately opposite in phase and approximately equal in intensity with said first non-zero field levels, respectively.

21. The method of claim 20, wherein:

for an M of at least three said input values, said optical electric field includes two times said M minus one (2M−1) said field levels including said zero field level, said M minus one (M−1) said first non-zero field levels, and said M minus one (M−1) said second non-zero field levels.

22. The method of claim 20, further comprising steps of:

receiving said optical electric field through an optical medium;

extracting a received pulse-amplitude-modulation (PAM) signal from an intensity of said received optical electric field; and performing decisions on the received PAM signal for recovering output information bits indicative of said input information bits.

23. The method of claim 22, wherein:
the step of extracting said received PAM signal includes using direct detection of said received optical electric field.

24. The method of claim 22, wherein:
the step of extracting said received PAM signal includes using homodyne downconversion of said received optical electric field.

25. The method of claim 22, wherein:
the step of extracting said received PAM signal includes using heterodyne downconversion of said received optical electric field.

26. The method of claim 20, wherein:
the step of switching from one of a first type state and a second type state to the other of said first type state and said second type state includes steps of:
decomposing said representations of said input information bits into a logical sequence having a first logic level for said particular input value and a second logic level for said other input values;
switching between two precode levels for said first logic level and not switching between said two precode levels for said second logic level; and
deriving a current state from one of said first type state and said second type state based upon said precode levels.

27. The method of claim 26, wherein:
the step of switching between two precode levels includes steps of:
delaying said precoded sequence for providing a delayed precoded sequence; and
comparing said logical sequence to said delayed precoded sequence for providing said precoded sequence.

28. The method of claim 27, wherein:
said delayed precoded sequence includes a first delayed level in response to one of said precoded levels and a second delayed level in response to the other of said precoded levels; and
the step of deriving a current state includes a step of providing said first type state as said current state for said first delayed level and said second state type as said current state for said second delayed level.

29. The method of claim 26, wherein:
the step of switching from one of a first type state and a second type state to the other of said first type state and said second type state further includes steps of:
inverting representations of said input values in response to one of said precode levels and not inverting said representations of said input values in response to the other of said precode levels for forming an output sequence, said output sequence used for generating said optical electric field.

30. The method of claim 20, further comprising a step of:
issuing an output sequence having output levels switching from one of a first type of said output levels and a second type of said output levels to the other of said first type of said output levels and said second type of said output levels for the finite state machine switching from one of said first type state and said second type state to the other of said first type state and said second type state; and wherein:

the step of generating said optical electric field includes using said output sequence for generating said optical electric field.

31. The method of claim 30, wherein:
for an M of least three said input values of said representations for said input information bits, said first type of said output levels includes a neutral one of said output levels and said M minus one (M−1) first non-neutral said output levels; and said second type of said output levels includes said neutral output level and said M minus one (M−1) second non-neutral said output levels, said neutral output level indicative of said particular input value, said first non-neutral output levels and said second non-neutral output levels mirroring each other about said neutral output level for redundant indications of said other input values.

32. The method of claim 31, wherein:
the step of generating said optical electric field includes steps of:
converting said output sequence into first and second complementary drive signals; and
modulating an optical signal in a push-pull manner with said first and second drive signals for providing said optical electric field.

33. The method of claim 31, wherein:
the step of generating said optical electric field includes steps of:
converting said output sequence into a magnitude drive signal having amplitudes corresponding respectively to magnitudes of differences between said output levels and said neutral output level; and
converting said output sequence into a sign drive signal having amplitudes corresponding respectively to signs of differences between said output levels and said neutral output level.

34. The method of claim 33, wherein:
the step of generating said optical electric field further includes steps of:
receiving said magnitude drive signal in an intensity modulator;
receiving said sign drive signal in a phase modulator; and
disposed said intensity modulator and said phase modulator in series for receiving said optical signal and issuing said optical electric field.

35. The method of claim 33, wherein:
the step of generating said optical electric field further includes steps of:
receiving said magnitude drive signal in an optical light source;
issuing an optical signal from said light source having intensity modulation based upon said magnitude drive signal;
receiving said intensity modulated optical signal and said sign drive signal in a phase modulator; and
issuing said optical electric field from said phase modulator.

36. The method of claim 30, wherein:
the step of generating said optical electric field includes steps of:
converting representations of said input values into an intensity drive signal; and
deriving a sign drive signal having a first amplitude for said first type of said output levels and a second amplitude for said second type of said output levels.

37. The method of claim 36, wherein:

the step of generating said optical electric field further includes steps of:

receiving said intensity drive signal in an intensity modulator;

receiving said sign drive signal in a phase modulator; and disposed said intensity modulator and said phase modulator in series for receiving said optical signal and issuing said optical electric field.

38. The method of claim 36, wherein:

the step of generating said optical electric field further includes steps of:

receiving said intensity drive signal in an optical light source;

issuing an optical signal from said light source having intensity modulation based upon said magnitude drive signal;

modulating said intensity modulated optical signal with said sign drive signal in a phase modulator; and issuing said optical electric field from said phase modulator.

39. An optical transmission system, comprising:

a modulation subsystem for launching a transmitted optical electric field into an optical transmission medium, said optical electric field having field levels in a first field set having an M said field levels and a second field set having said M said field levels, said M at least three, said first field set including a nominally zero one of said field levels and said M minus one (M-1) first ones of said field levels, said second field set including said zero field level and said M minus one (M-1) second ones of said field levels, said second field levels approximately equal to negatives of said first field levels, respectively, an intensity of said optical electric field representative of input information bits; and a finite state machine assuming during a symbol interval a finite state machine (FSM) state from one of a first state type and a second state type, the finite state machine governing said optical electric field such that said optical electric field assumes one of said first field set for said FSM state in said first state type and said optical electric field assumes one of said second field set for said FSM state in said second state type, said FSM state switching between said first state type and said second state type for said optical electric field assuming said zero field level.

40. An optical transmission method, comprising steps of:

launching a transmitted optical electric field into an optical transmission medium, the optical electric field having field levels in a first field set having an M said field levels and a second field set having said M said field levels, said M at least three, said first field set including a nominally zero one of said field levels and said M minus one (M-1) first ones of said field levels, said second field set including said zero field level and said M minus one (M-1) second ones of said field levels, said second field levels approximately equal to negatives of said first field levels, respectively, an intensity of said optical electric field representative of input information bits;

governing said optical electric field by a finite-state machine (FSM) assuming, during a symbol interval, an FSM state from one of a first state type and a second state type such that said optical electric field assumes one of said first field set for said FSM state in said first state type and said optical electric field assumes one of said second field set for said FSM state in said second state type; and switching said FSM state between said first state type and said second state type for said optical electric field assuming said zero field level.

* * * * *